United States Patent [19]
Tateyama et al.

[11] Patent Number: 5,845,144
[45] Date of Patent: Dec. 1, 1998

[54] INFORMATION PROCESSING APPARATUS WITH INTERNAL PRINTER

[75] Inventors: Jiro Tateyama, Yokohama; Haruhisa Kato, Tokyo; Kenji Maeda, Nagareyama; Masato Sugawara, Tokyo; Jun Oida, Kawasaki; Shuzo Yamaguchi, Yokohama; Naoki Umemura, Yokohama; Hirohide Tachikawa, Yokohama, all of Japan

[73] Assignee: Canon Kabushiki Kaisha, Tokyo, Japan

[21] Appl. No.: 995,206

[22] Filed: Dec. 22, 1992

[30] Foreign Application Priority Data

Dec. 25, 1991 [JP] Japan .................................. 3-343287
Dec. 25, 1991 [JP] Japan .................................. 3-343290

[51] Int. Cl.⁶ .................................................. G06F 15/00
[52] U.S. Cl. ................ 395/800.01; 395/105; 312/223.3; 364/325; 364/338.2; 400/10; 400/719
[58] Field of Search ................................... 395/800, 101, 395/275, 800.01, 105; 364/DIG. 1, 325, 338.2; 312/223.3; 400/10, 719

[56] References Cited

U.S. PATENT DOCUMENTS

| | | | |
|---|---|---|---|
| 4,064,456 | 12/1977 | Baxter | 364/900 |
| 4,637,053 | 1/1987 | Schalkowsky | 382/6 |
| 4,730,947 | 3/1988 | Ikeda et al. | 400/61 |
| 4,777,590 | 10/1988 | Durkos et al. | 364/200 |
| 4,825,405 | 4/1989 | Makino et al. | 400/61 |
| 4,899,182 | 2/1990 | Inoue | 346/153.1 |
| 4,930,017 | 5/1990 | Izawa | 358/296 |
| 4,948,283 | 8/1990 | Imaizumi et al. | 400/647.1 |

FOREIGN PATENT DOCUMENTS

| | | |
|---|---|---|
| 0182554 | 5/1986 | European Pat. Off. . |
| 0266748 | 5/1988 | European Pat. Off. . |
| 0326102 | 8/1989 | European Pat. Off. . |
| 0355203 | 2/1990 | European Pat. Off. . |
| 0412925 | 2/1991 | European Pat. Off. . |
| 0426414 | 5/1991 | European Pat. Off. . |
| A3833854 | 4/1990 | Germany . |
| 62-160543 | 12/1987 | Japan . |
| 2238675 | 6/1991 | United Kingdom . |

OTHER PUBLICATIONS

IBM Technical Disclosure Bulletin, vol. 34, No. 1, Jun. 1991, pp. 463–464.
IBM Technical Disclosure Bulletin, vol. 33, No. 5, Oct. 1990, pp. 30–32.

*Primary Examiner*—Alyssa H. Bowler
*Assistant Examiner*—Dzung C. Nguyen
*Attorney, Agent, or Firm*—Fitzpatrick Cella Harper & Scinto

[57] ABSTRACT

In an information processing apparatus with a main control unit and a printer, a transfer unit transfers commands and data between the main control unit and the printer, a memory temporarily stores the data transferred to the printer, and a detector detects the remaining capacity of the memory. The information on remaining capacity of the memory is supplied to the main control unit to improve the execution efficiency of the main control unit.

11 Claims, 44 Drawing Sheets

TOP VIEW

WHEN FULL KEY CONNECTED

WHEN 10 KEY CONNECTED

| BATTERY PACK TYPE | CHARGE WITH AC ADAPTER | CHARGE WITH QUICK CHARGER |
|---|---|---|
| STANDARD TYPE | 2 HOURS | 1 HOUR |
| HIGH CAPACITY TYPE | 2.4 HOURS | 1.2 HOURS |
| LIGHT WEIGHT TYPE | 1 HOUR | 1 HOUR |

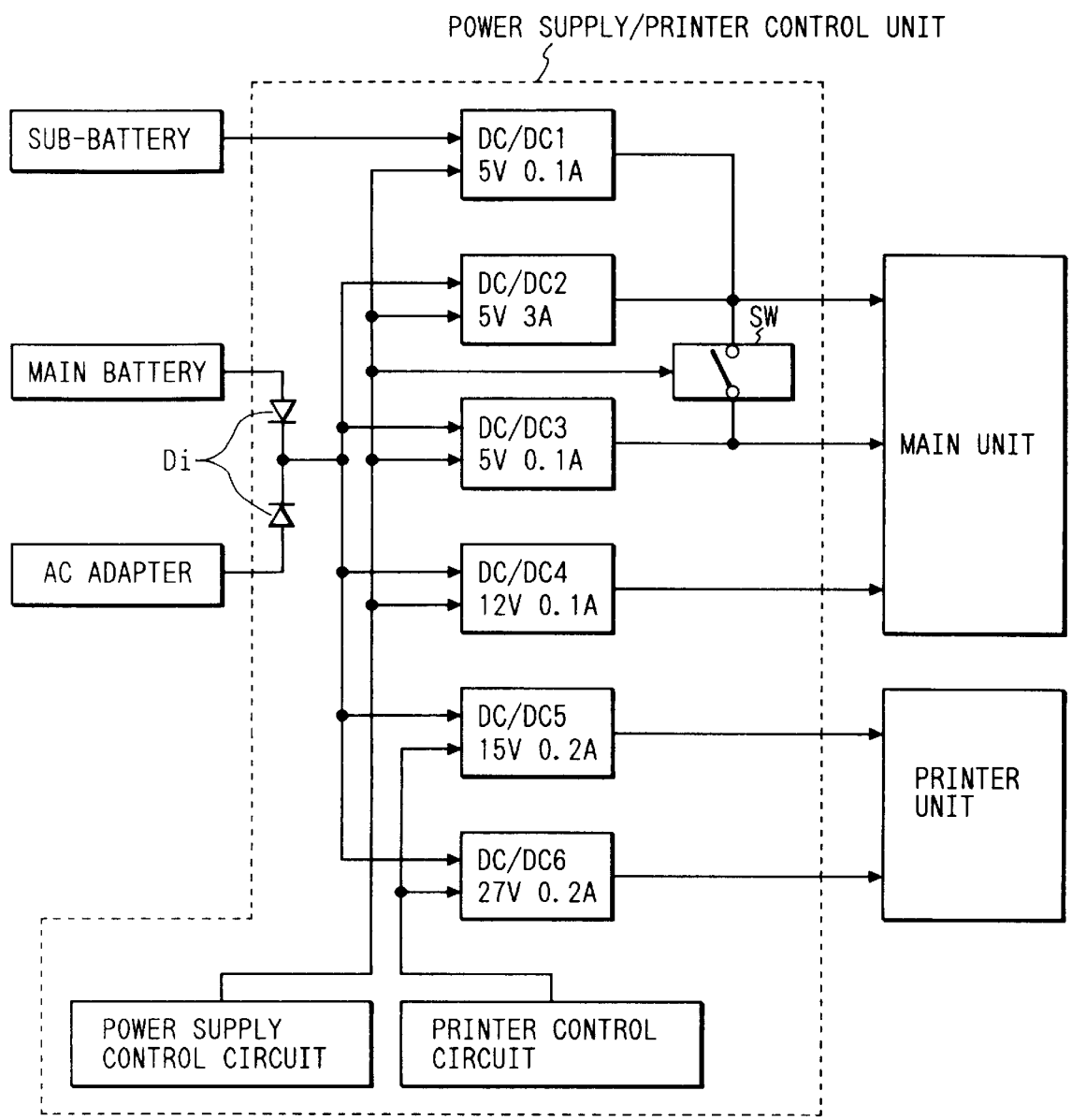

BATTERY CHARGE

BATTERY REMAINDER DETECTION

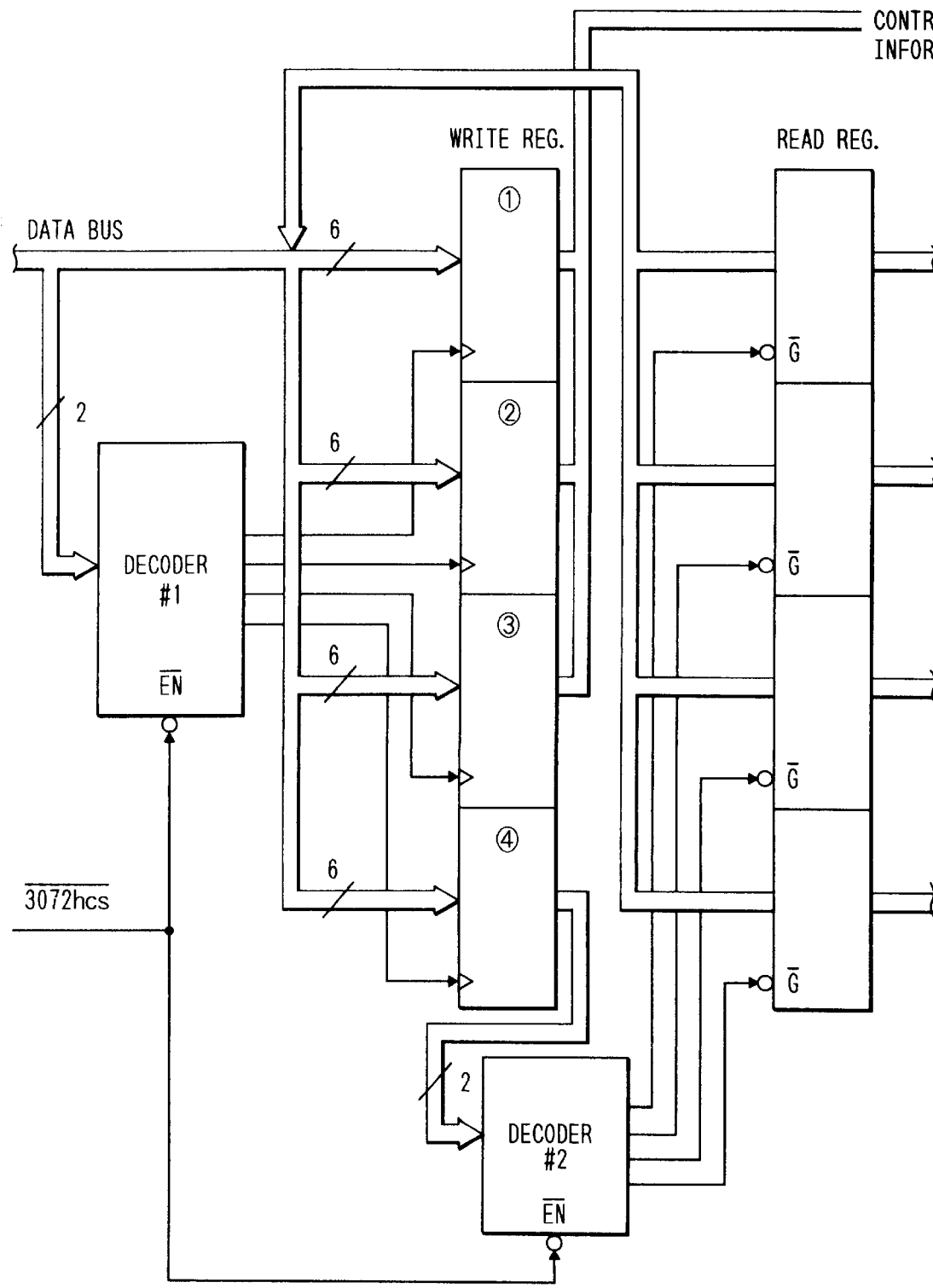

FIG. 28
3.5" FLOPPY DISK
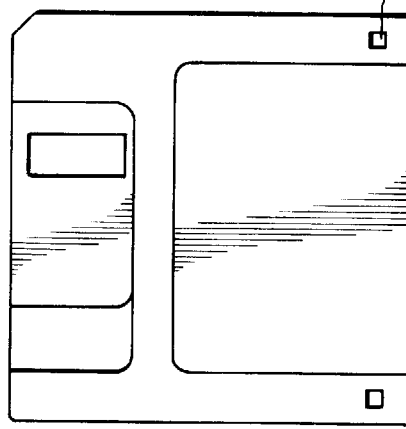
HD IDENTIFICATION HOLE
HIGH DENSITY DISK
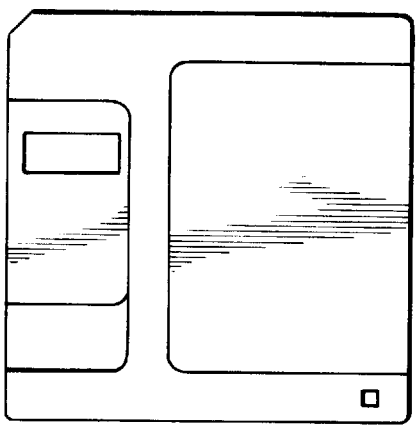
LOW DENSITY DISK

FIG. 36

INFORMATION PROCESSING APPARATUS WITH INTERNAL PRINTER

BACKGROUND OF THE INVENTION

1. Field of the Invention

The present invention relates to a compact information processing apparatus.

2. Related Background Art

Conventional information processing apparatus, for example personal computer, does not contain a printer therein, and has to be connected to a printer for printing for example the prepared data. When connected to a printer and a cable therefor, the entire system requires a large area even though each component is compactized.

Also the conventional personal computer has been compactized and designed to be driven with a battery, but the operable time has been limited.

Also the conventional personal computer has not employed a processor for the power supply control.

Also the conventional personal computer has been designed to be connectable to a sub processor in addition to the main processor contained therein, but such connection has necessitated a complicated procedure.

Also the conventional personal computer has often been equipped with a hard (rigid) disk, but it has not been detachable.

Also the conventional personal computer has been equipped with a floppy disk drive (FDD), but has been inconvenient in the handling of various floppy disks.

Also the conventional personal-computer has not been designed to handle plural IC cards.

Also the conventional personal computer has been equipped with an exclusive keyboard, but has been inconvenient in the handling of expanded keyboard.

Also, because of the improvement in print quality in recent years, there is required printing based on dot matrix graphics, leading to an increased amount of data transfer. The data transfer between a main control unit and a printer in the conventional system equipment has been executed through an interface I/O circuit therebetween.

The printing speed of the printer is usually lower than the data transfer rate, and, in order to prevent overflow of data transfer, there has been conducted data handshake, utilizing control information such as BUSY and ACK.

Also a memory buffer is provided in the printer or in the I/O unit for improving the efficiency of processing of the main control unit and of transfer time.

However, when the main control unit (host computer) transfers the data to the printer unit, the main control unit has to always detect the control signals in order to prevent the overflow.

Even when the BUSY signal is disabled, the control signal has to be detected for every data transfer of one byte, because the empty capacity of memory cannot be known.

For this reason the efficiency of execution of the main control unit has been poor, and the improvement in the processing speed of I/O unit has been meaningless.

SUMMARY OF THE INVENTION

An object of the present invention is to provide an information processing apparatus which incorporates a printer unit therein, whereby the entire system can be compactized and placed in a smaller place, and can print the prepared data immediately.

Another object of the present invention is to provide an information processing apparatus which incorporates a printer unit and an automatic sheet feeding mechanism, thereby capable of printing the prepared data etc. in plural copies.

Still another object of the present invention is to provide an information processing apparatus capable of extending the operable time in battery drive.

Still another object of the present invention is to provide an information processing apparatus utilizing a processor for achieving more precise power supply control.

Still another object of the present invention is to provide an information processing-apparatus utilizing a processor for achieving more precise power supply control and input control.

Still another object of the present invention is to provide an information processing apparatus enabling connection to a sub processor with simple operations, in addition to the main processor.

Still another object of the present invention is to provide an information processing apparatus in which the rigid disk is rendered detachable.

Still another object of the present invention is to provide an information processing apparatus in which the rigid disk is rendered detachable in a simple manner.

Still another object of the present invention is to provide an information processing apparatus in which various floppy disks can be easily attached and detached, and which can make access to these floppy disks under recognitions thereof.

Still another object of the present invention is to provide an information processing apparatus so constructed as to handle plural IC cards and capable of handling IC cards of different formats.

Still another object of the present invention is to provide an information processing apparatus capable of handling an extension keyboard, in addition to the exclusive keyboard.

Still another object of the present invention is to provide an information processing apparatus capable of handling an extension keyboard, a mouse etc. as well as the exclusive keyboard, through a same interface.

The above-mentioned objects can be attained, according to the present invention, by an information processing apparatus comprising information process means for main control; device control means for device control; transfer means for the transfer of data or command between said main control means and said device control means; and memory means for storing data transferred into said device control means, wherein the remaining capacity information, indicating the remaining capacity of said memory means, is transferred to said main control means.

Also the above-mentioned objects can be attained, according to the present invention, by transferring data or command between the main control side and the device control side, and transferring the remaining capacity information, representing the storage capacity for the data to be transferred to said device control side, to said main control side.

Also the above-mentioned objects can be attained, according to the present invention, by an information processing apparatus incorporating a printer for data printing, and provided with an interface connectable to an external printer for printing said data.

Also the above-mentioned objects can be attained, according to the present invention, by an information processing apparatus incorporating a printer for printing data, and provided with a sheet feeding mechanism for sheet feeding to said printer.

Also the above-mentioned objects can be attained, according to the present invention, by an information processing apparatus incorporating a printer with an automatic sheet feeding mechanism, whereby the prepared data etc. can be immediately printed in plural copies.

Also the above-mentioned objects can be attained, according to the present invention, by an information processing apparatus provided with process means for battery control, thereby controlling said battery.

Also the above-mentioned objects can be attained, according to the present invention, by an information processing apparatus provided with a battery, input means, and process means for controlling said input means and said battery, thereby controlling said input means and said battery.

Also the above-mentioned objects can be attained, according to the present invention, by an information processing apparatus provided with a main processor, a connector for making connection to a co-processor in addition to said main processor, and an aperture provided in a part of the main body, for enabling connection of said co-processor to said connector.

Also the above-mentioned objects can be attained, according to the present invention, by an information processing apparatus, provided with means for enabling simple attachment and detachment of various floppy disks and identifying said floppy disks, and capable of making access to said floppy disks.

Also the above-mentioned objects can be attained, according to the present invention, by an information processing apparatus, provided with means for handling an extension keyboard, in addition to an exclusive keyboard.

BRIEF DESCRIPTION OF THE DRAWINGS

FIG. 36 is timing chart for a head driving circuit;

DETAILED DESCRIPTION OF THE PREFERRED EMBODIMENTS

Figure 1:
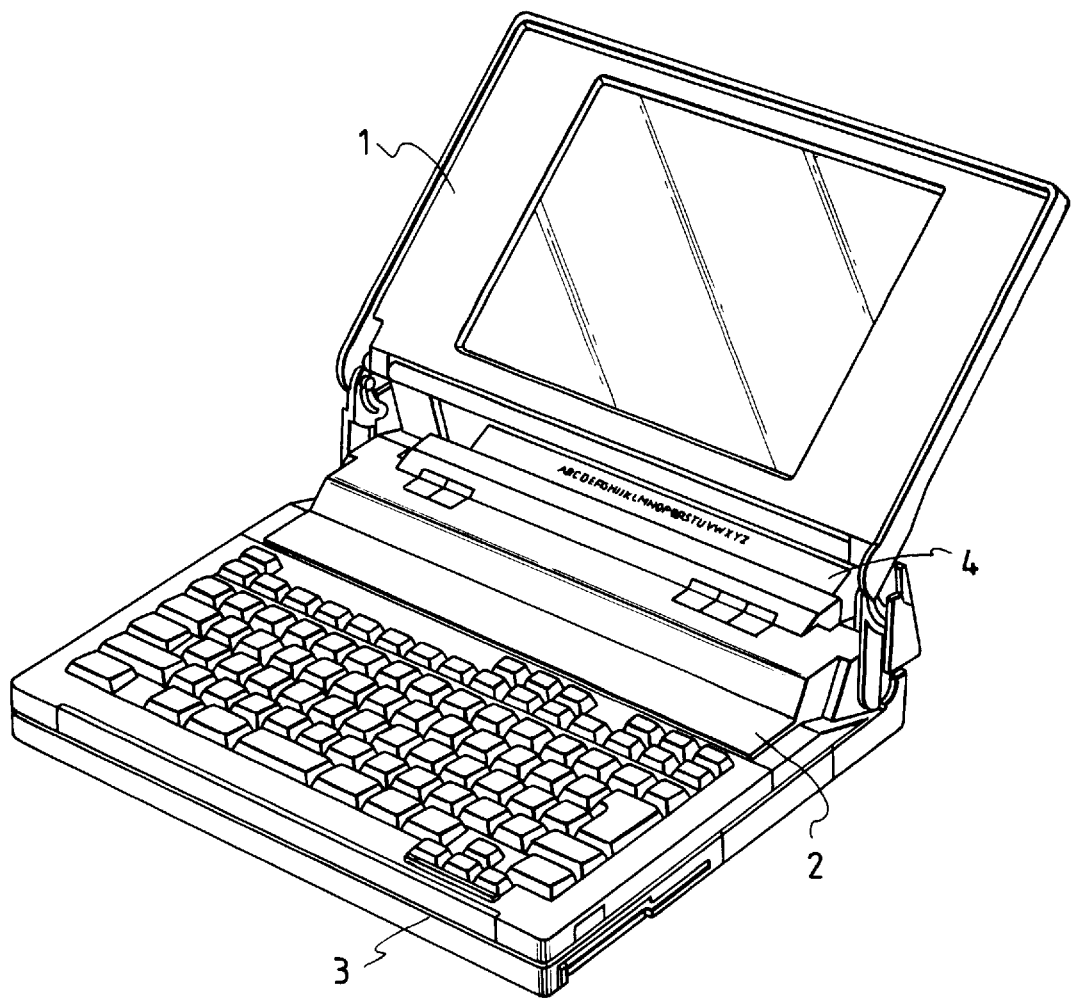
FIG. 1 is a perspective view of the apparatus of the present invention.

FIG. 1 is a perspective view showing an embodiment of the present invention, wherein a display unit 1 is provided with a flat panel display device such as a liquid crystal display device or a plasma display device.

A main body 2 is provided with a keyboard unit 5 for entering characters or functions; an electronic unit (not shown) including for example a memory unit for storing calculating processes and other information, and an output unit for controlling the display, printing and communication; and a printer unit (not shown) for information printing.

Figure 2:
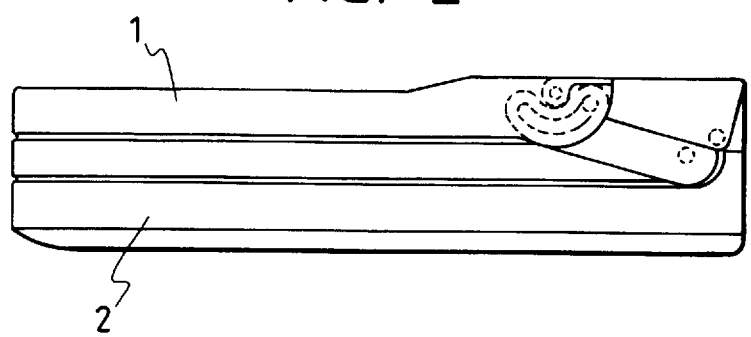
FIGS. 2 and 3 are lateral views of the apparatus of the present invention.
Figure 3:
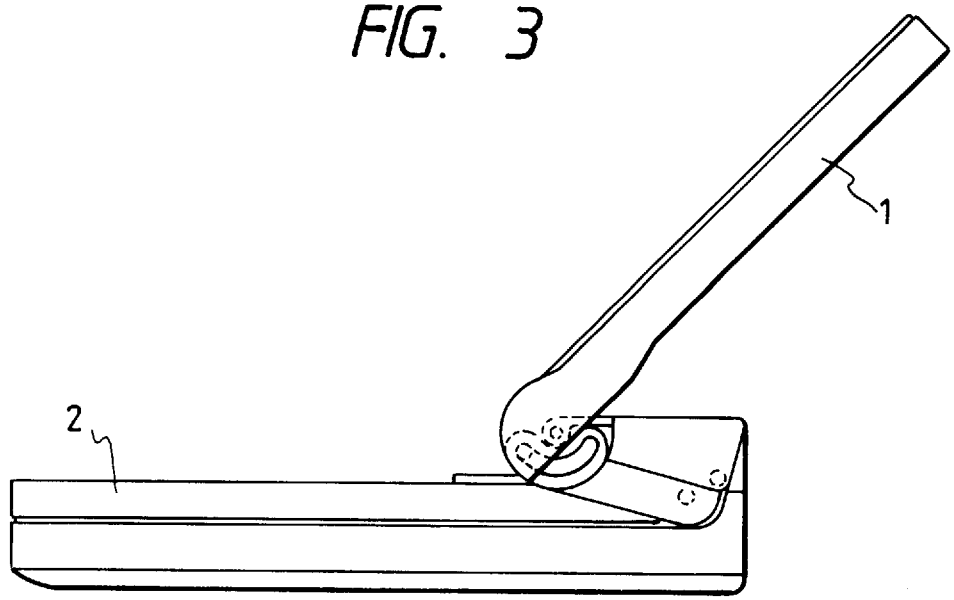

The display unit 1 is rendered foldable with respect to the main body 2, and, when not in use, both units are folded back in a mutually opposed position, as shown in a lateral view in FIG. 2, while, when in use, the display unit 1 is lifted up from the main body 2 as shown in FIG. 3. A slot 3 is provided for inserting a printing sheet 4.

Figure 4:
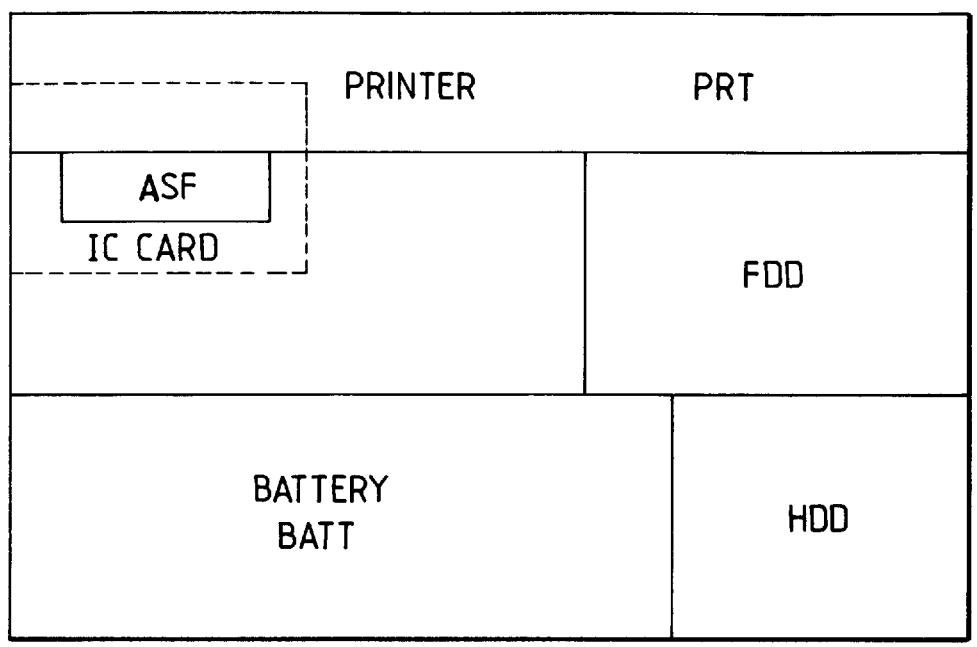
FIG. 4 is a view showing the internal layout of the main body of an embodiment of the present invention.

FIG. 4 shows the internal layout of the main body 2, wherein shown are a battery BATT 40; a hard (rigid) disk HDD (RDD) 41; a floppy disk drive FDD 42; a printer PRT 43; an auto sheet feeder ASF 45; and an IC card ICC 44.

Figure 5:
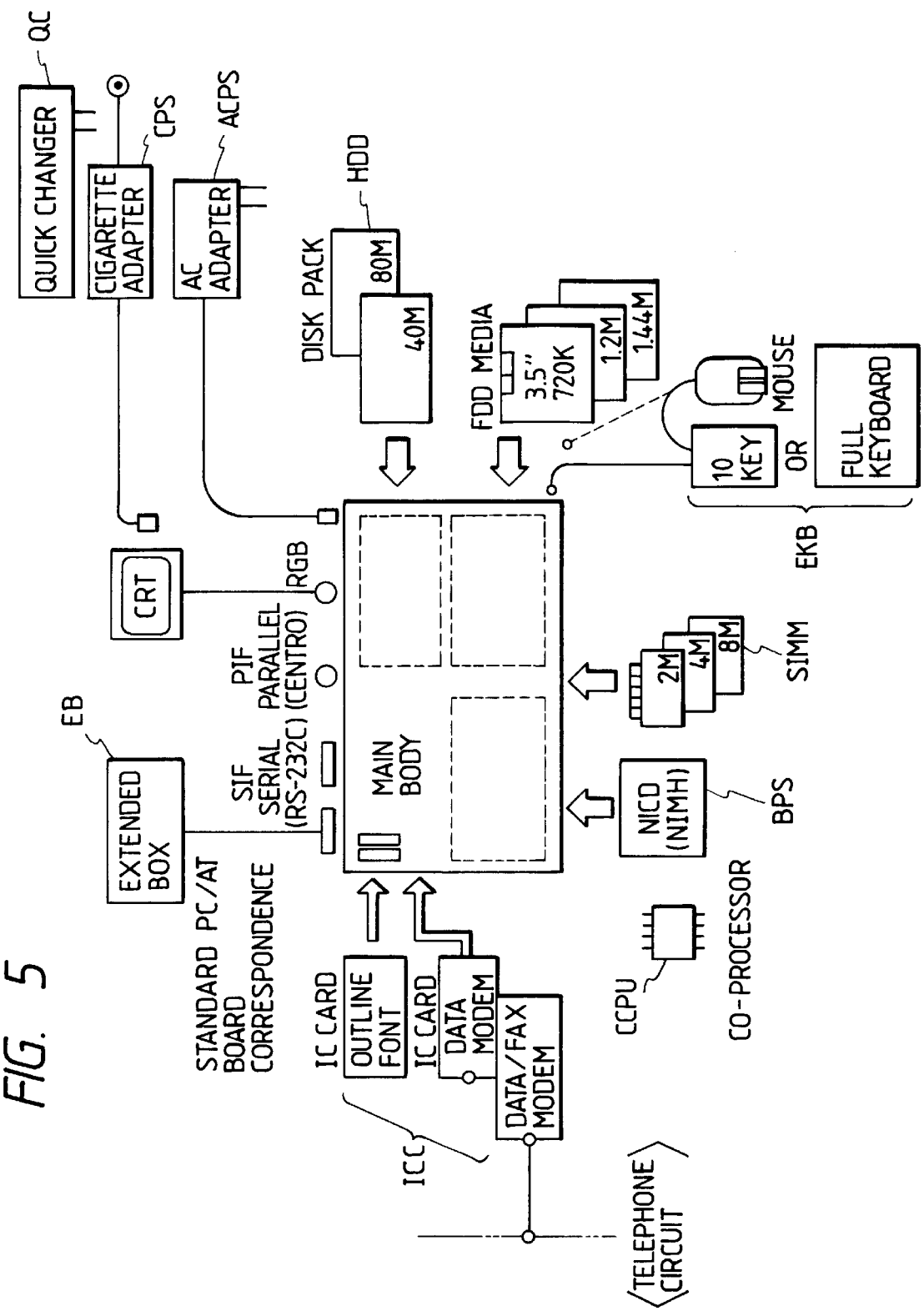
FIG. 5 is a view showing additional and extension units to the main body.

FIG. 5 is a view showing units which can be selectively added or expanded to the embodiment shown in FIG. 1. Such additional or extension units are constructed in the following manner, as shown in FIG. 5.

HDD 51 is a rigid disk drive, utilizing a HDD pack of a capacity of 40M/80M. It can be inserted into a lateral slot of the main body shown in FIG. 22, whereupon a connector said pack is connected with a connector of the main body.

EKB 52 is an extended input device to be connected to a common extension port for 10 key/fully key/mouse.

SIMM 53 is a memory of a capacity of 2M/4M/8M.

BPS 54 are battery packs of two kinds, namely NiCd and NiMH.

CCPU 55 is a co-processor.

ICC 56 is a FAX/data modem card of an internal volume of two slots, to be connected to IC card I/F of two slots, or an outline font card with an internal volume of one slot. The external size of the IC card is defined by JEIDA V4.1. However, some cards, such as the FAX/modem card, cannot be presently realized with the specified thickness, because of the available component parts. In order to incorporate such card in a personal computer, it becomes necessary to have an exclusive interface.

However, because of the limited space available in the personal computer, it is preferable to have a standard interface (JEIDA in this case) and to connect as many cards as possible thereto.

Figure 27:
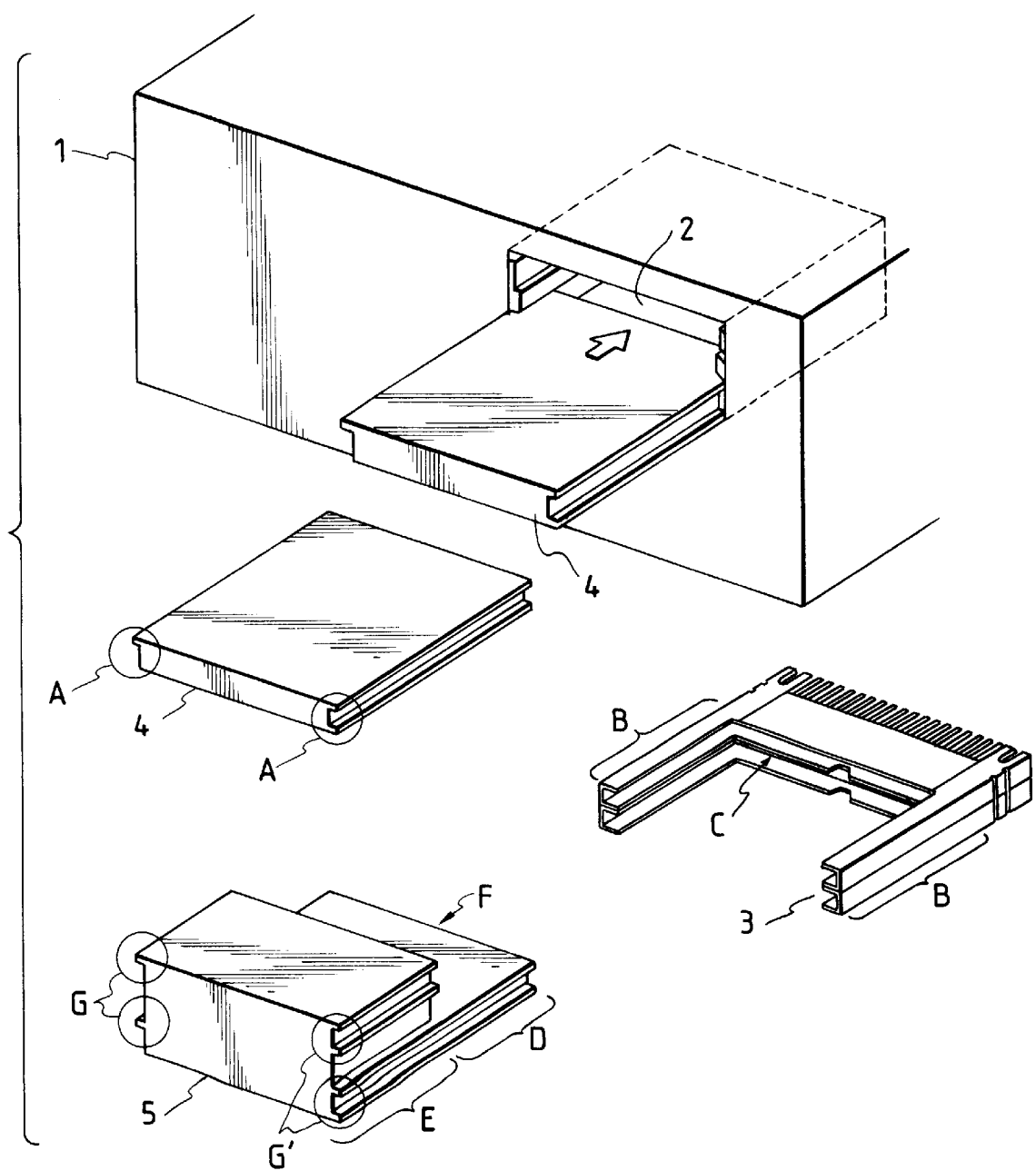
FIG. 27 is a view showing an IC card.

Therefore, as shown in FIG. 27, two IC card connectors defined by JEIDA V4.1 are mounted in overlapping position without the interim partition, thereby accommodating not only the IC cards of JEIDA standards but also the IC cards of which electrical interface matches the JEIDA standards but the external size does not match the JEIDA standards.

In case of the cards of the JEIDA standards, there can be accommodated one or two cards.

The personal computer 271 is provided therein with an IC card connector 273, consisting of two same connectors arranged in two layers, and with an aperture 272, opened on the lateral face of the body, for inserting the IC card into the connector 273. The IC card connector 273 is provided with a partition C in the vicinity of the engaging part, in order to prevent erroneous insertion of the card, but said partition is absent in the vicinity of the insertion opening 272. Also there are provided guides B for guiding the cards. An IC card 274 of the JEIDA standard has different shapes at the lateral ends, as indicated by A, in order to prevent erroneous insertion, and the guides B have the matching shapes. When in use, the IC card 274 is inserted from the opening 272, and is finally fitted along the guides B of the connector 273. If erroneously inserted in the inverted state, the card cannot be fitted because of the different shapes at the lateral ends. The connector 273 is composed of identical connectors arranged in two layers. Consequently the card of the JEIDA standard may be inserted in either of said two connectors.

Also this personal computer can accept in IC card 275 of different format. Said card 5 is same as the card of the JEIDA standard within the area D of the partition provided close to the fitting part with the connector, but, in an area E beyond said partition, it is constructed thicker and equal to two connectors in thickness. Because the area D is longer than the length of partition C from the fitting part of the connectors, the partition C does not hinder the insertion of the IC card 275 of different format.

The card 275 engages with the connector 273 in the lower portion F thereof, but the card 275 occupies the space of two connectors. Consequently only one IC card of such different format can be accommodated. However, a thick card, utilizing components which cannot be used in the cards of JEIDA standard, can also be accommodated within the personal computer. In FIG. 27, said card 275 of different format is represented to have different lateral shapes, for preventing erroneous insertion, in the upper and lower positions G, G', but such shapes in the non-engaging part (G) may be dispensed with.

Figure 32:
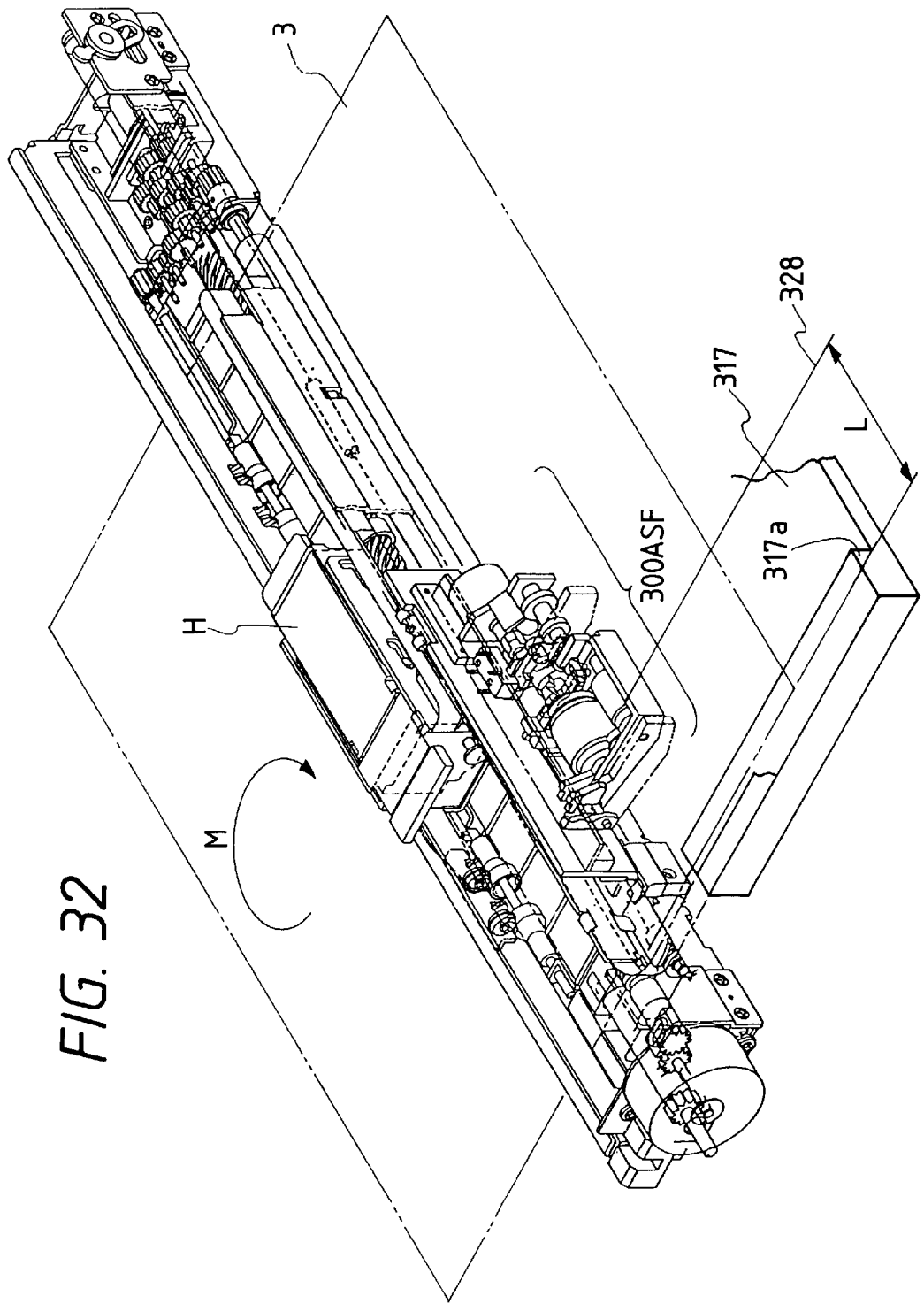
FIG. 32 is a view of an auto sheet feeder.

The auto sheet feeder ASF is positioned, as shown in FIG. 32, in the lower part of the main body, and is so constructed that the sheet is fed by a motor along a guide, while the printing head H effects scanning motion in the lateral direction.

An extension box EB 57 (in FIG. 5) is connected to the extension bus, and enables the use of an AT extension card.

An external parallel port PIF 58 is connected to an external printer.

RGB 59 is an analog RGB I/F corresponding to super VGA.

ACPS 50(a) is an AC adaptor as an external power source.

CPS 50(b) is a cigarette adaptor as another external power source.

QC 50(c) is a quick charger, as another external power source.

Figure 6:
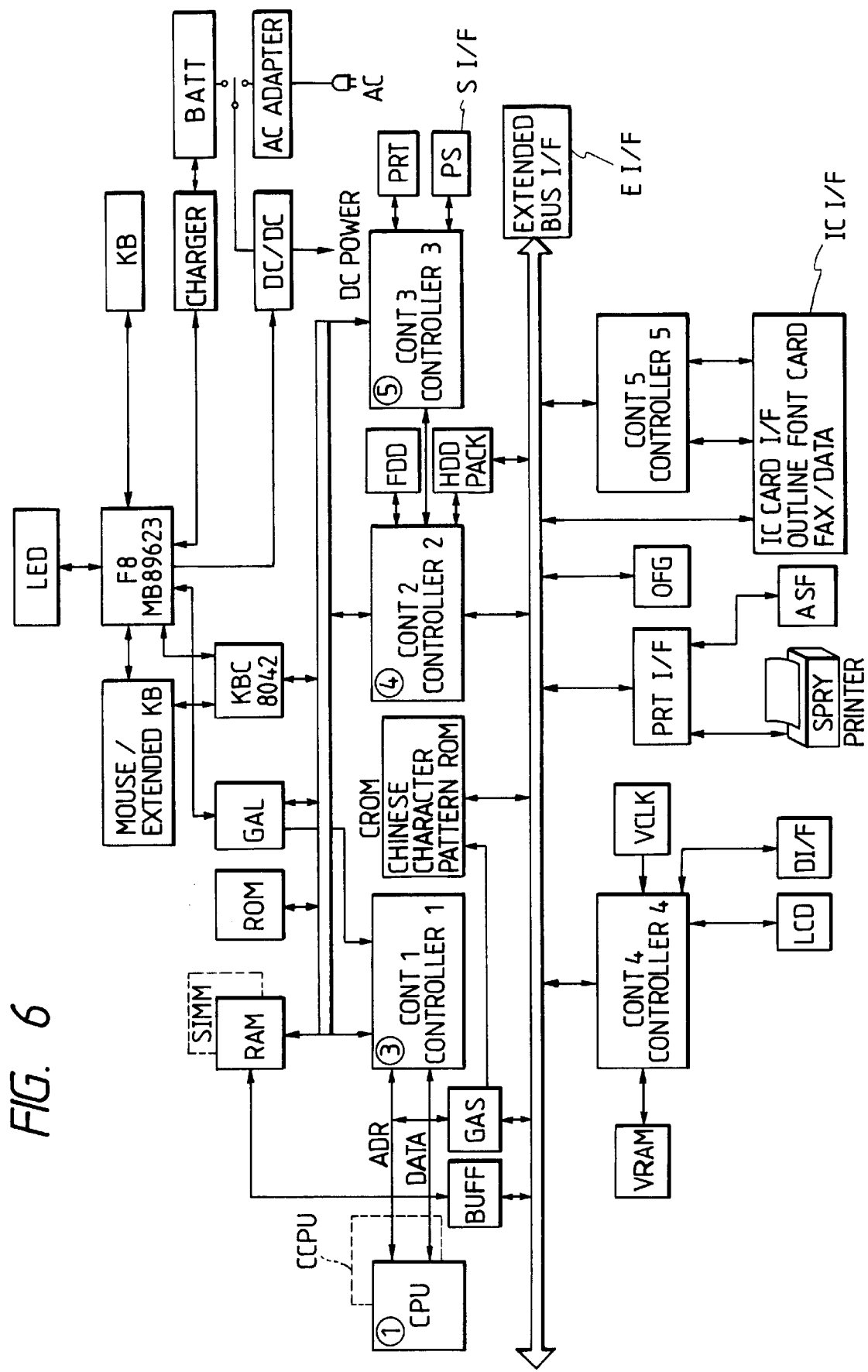
FIG. 6 is a block diagram of the system.

FIG. 6 is a block diagram of the system in which the additional and extension units are added to the main body shown in FIG. 5.

A processing unit CPU 60 effects control and process according to programs.

A controller CONT1 61 effects DRAM control, bus arbitor, and system activity detection.

A controller CONT2 62 has timing generator, IDEI/F, FDC/VFODMAC, PIC, PIT and RTC.

A controller CONT3 63 controls the parallel ports and serial ports.

A controller CONT4 64 controls the display memory VRAM, display LCD and extension CRT.

CROM 66 is a Kanji pattern memory. This ROM is used for enabling high-speed access to the Kanji font data through the font window, in case of Japanese language display.

GAL 67, GAS 68 are gate arrays incorporating glue logics.

KBC 69 is a keyboard controller used as standard in the AT compatible equipment, effecting communication with a scan controller and with a mouse.

F8 70 is a multi-purpose one-chip microcomputer, incorporating a CPU for executing programs, a ROM storing a program for controlling the keyboard and the mouse, a RAM for storing data, etc. and is used for the following purposes:
1) monitoring of battery state and battery charge control;
2) keyboard scanning;
3) discrimination of presence/absence of an external keyboard and control therefor; and
4) key scan data communication with the KBC.

An IC card I/F controller CONT5 65 corresponding to the JEIDA V4.1 is capable of controlling two IC card I/F's.

An outline font generator OFG 71 calculates the font data for display/print at a high speed, in case of use of a software WINDOWS of Microsoft.

HDD 72 is a rigid disk drive pack, having a capacity of 40 MB or 80 MB (with same thickness) in 2.5" size, thus enabling easy increase in capacity. It uses an IDE interface, and has low power consumption modes such as idle mode and sleep mode. It incorporates a R/W cash buffer of 32 KB, and operates with a high average seek time of 19 ms or less.

Figure 29:
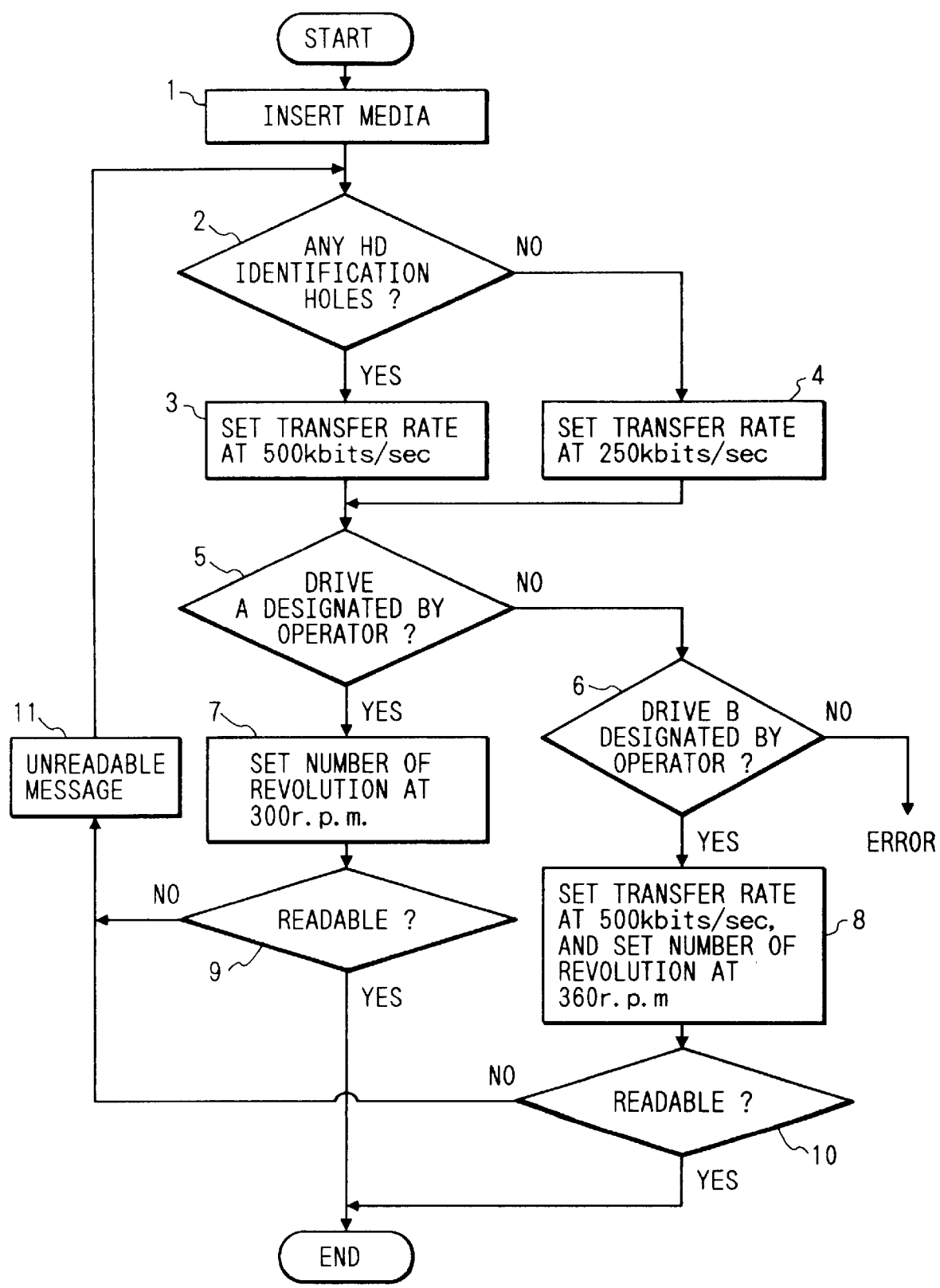
FIG. 29 is a flow chart showing the identification sequence for the floppy disk.
Figure 28:
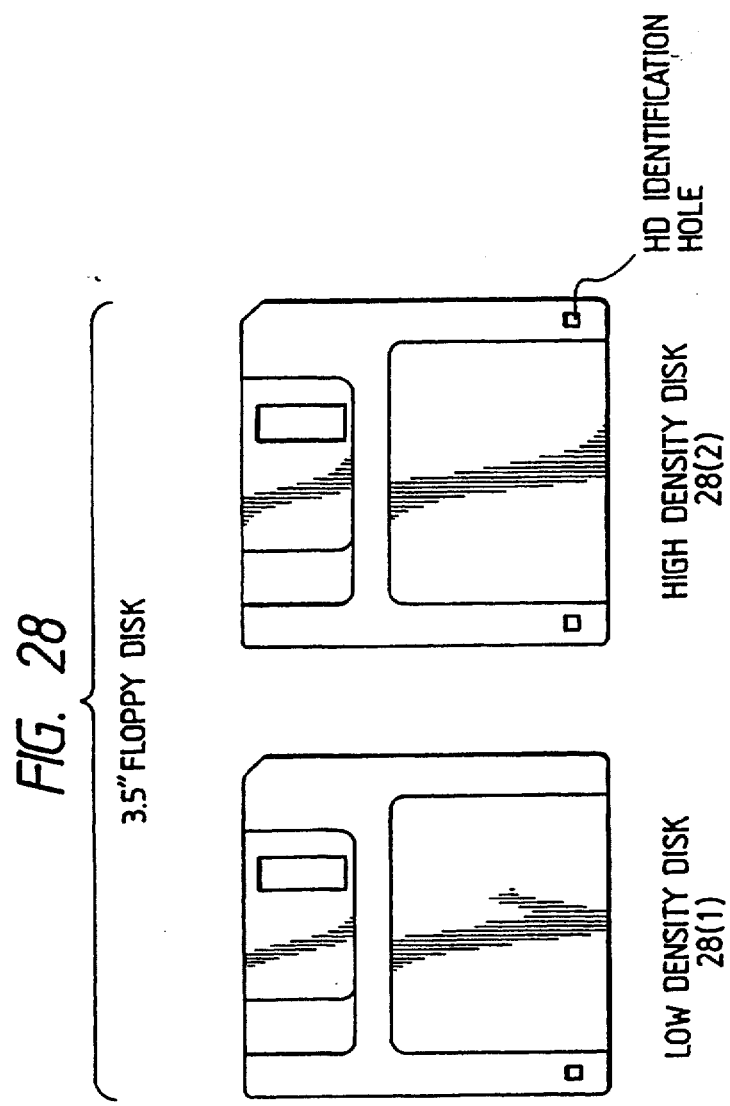
FIG. 28 is a view showing a floppy disk.
Figure 30:
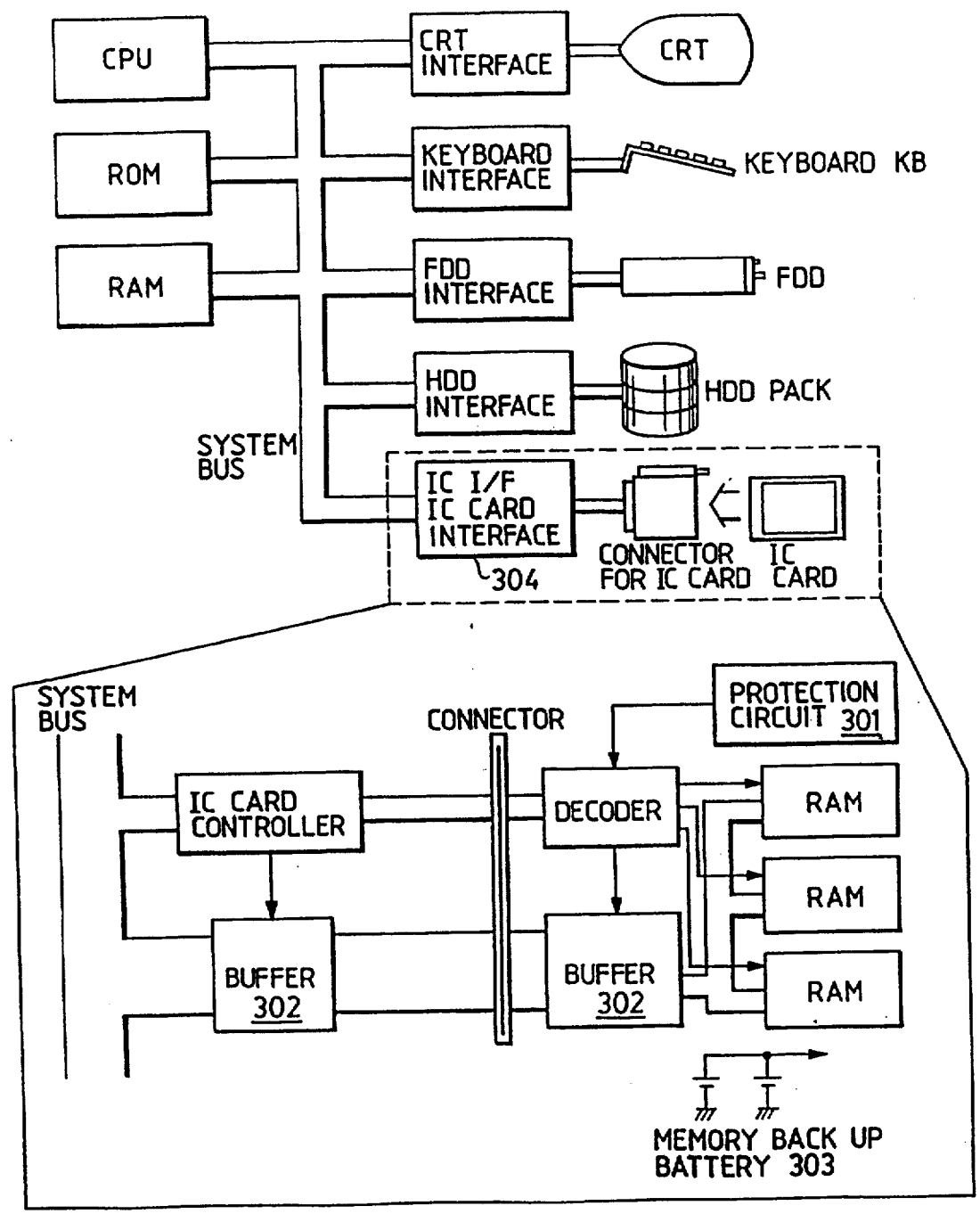
Figure 33:
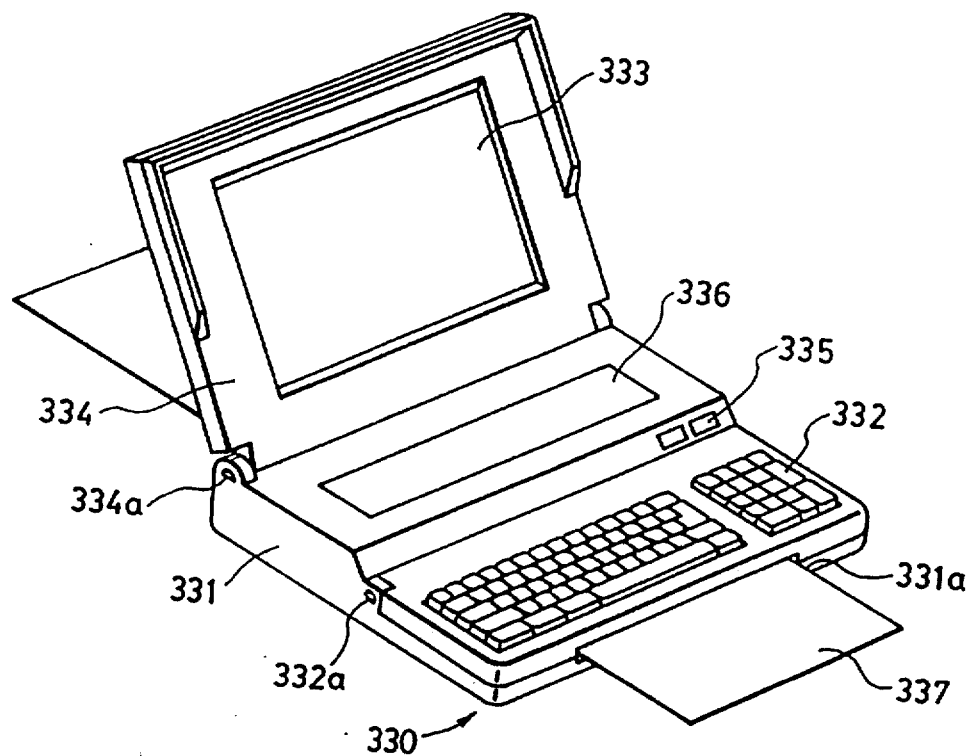
Figure 34:
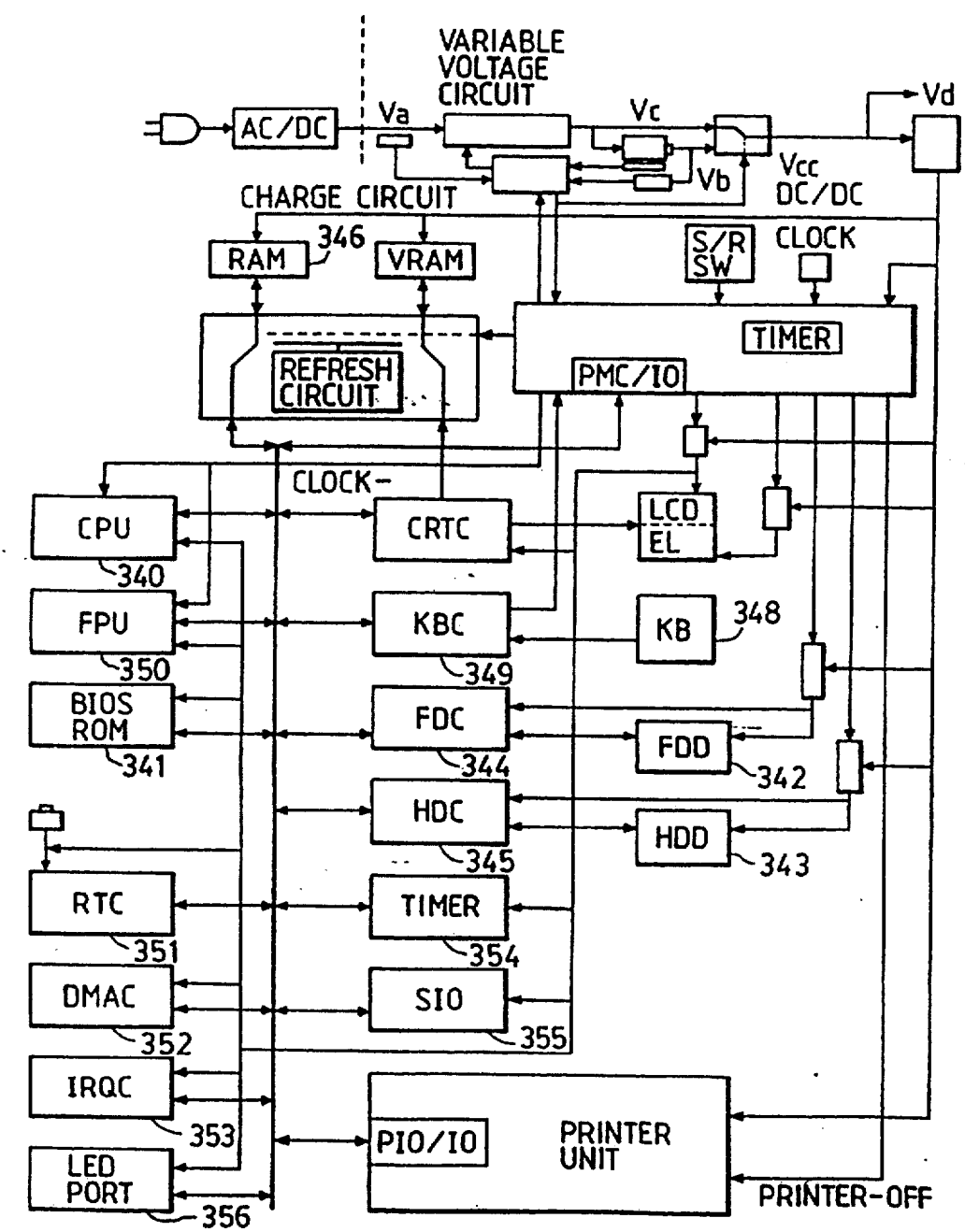
Figure 38:
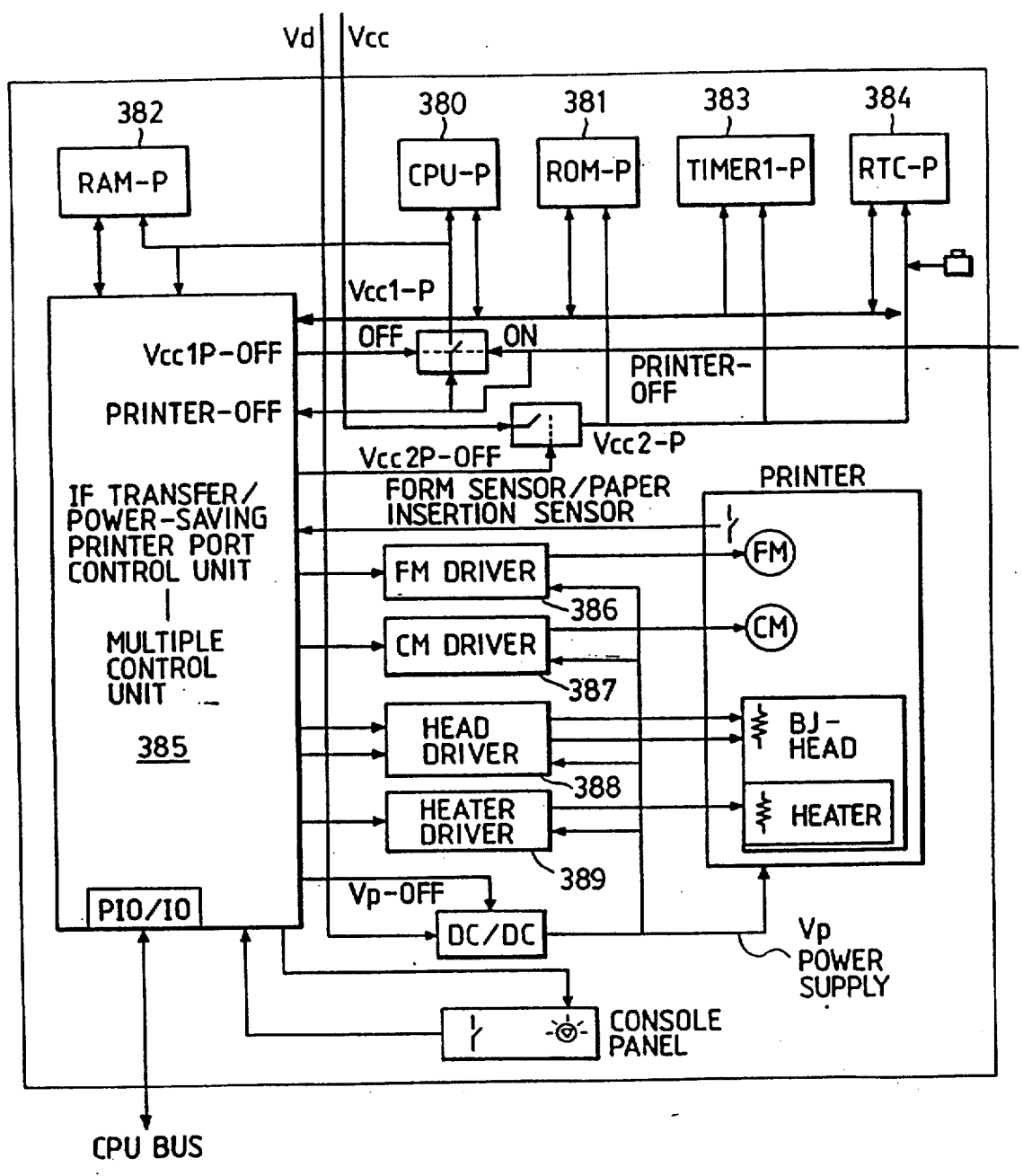
Figure 39:
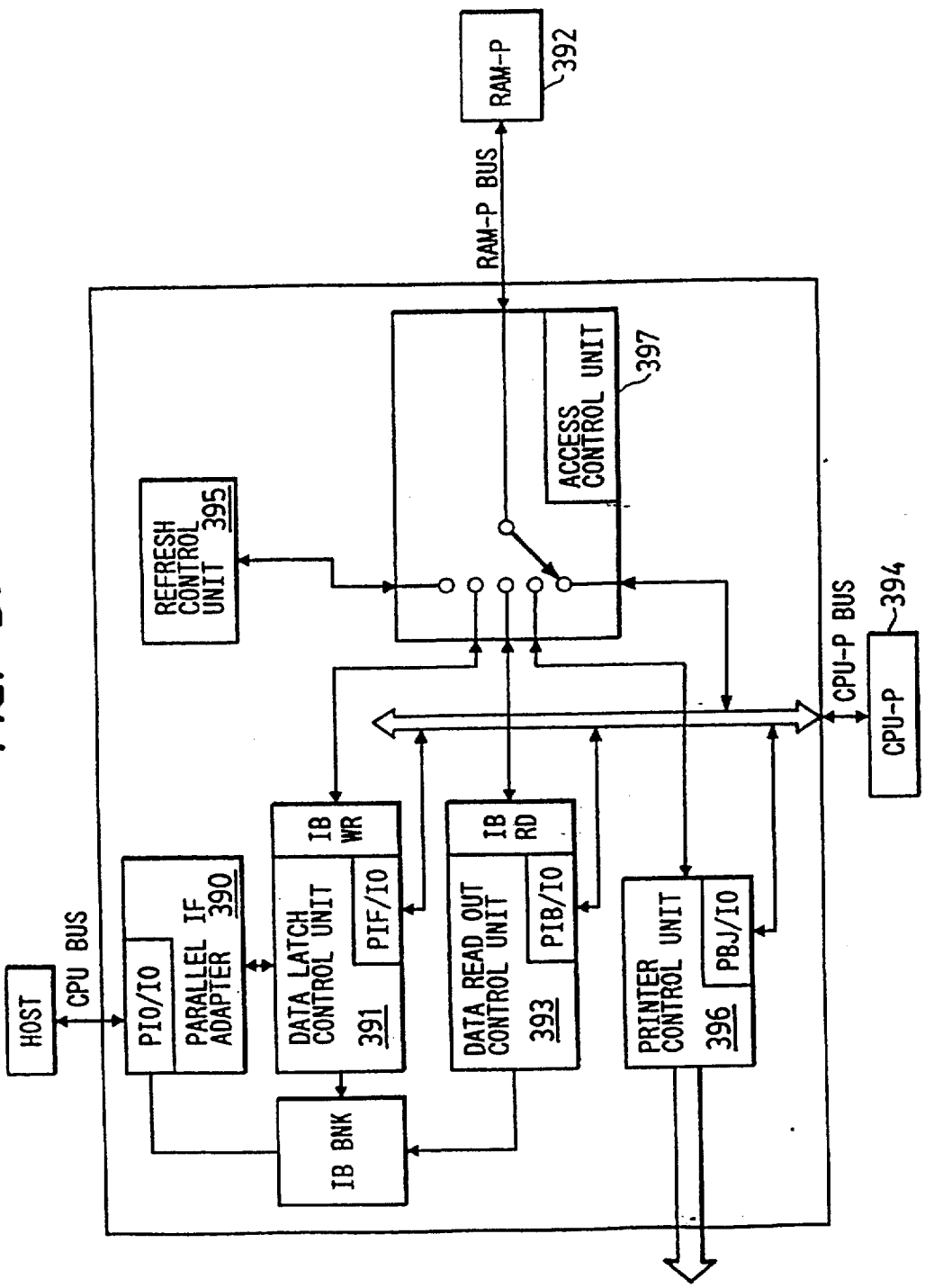
Figure 45:
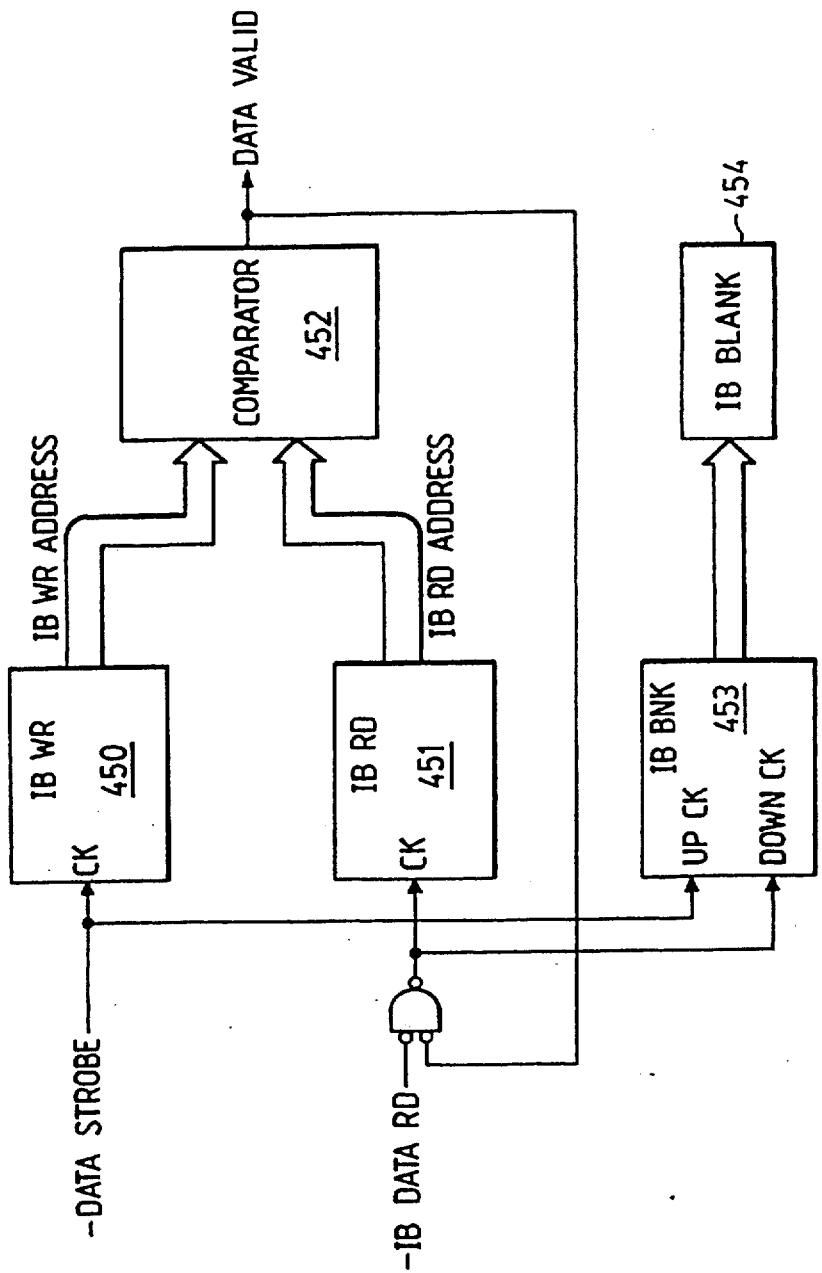
Figure 47:
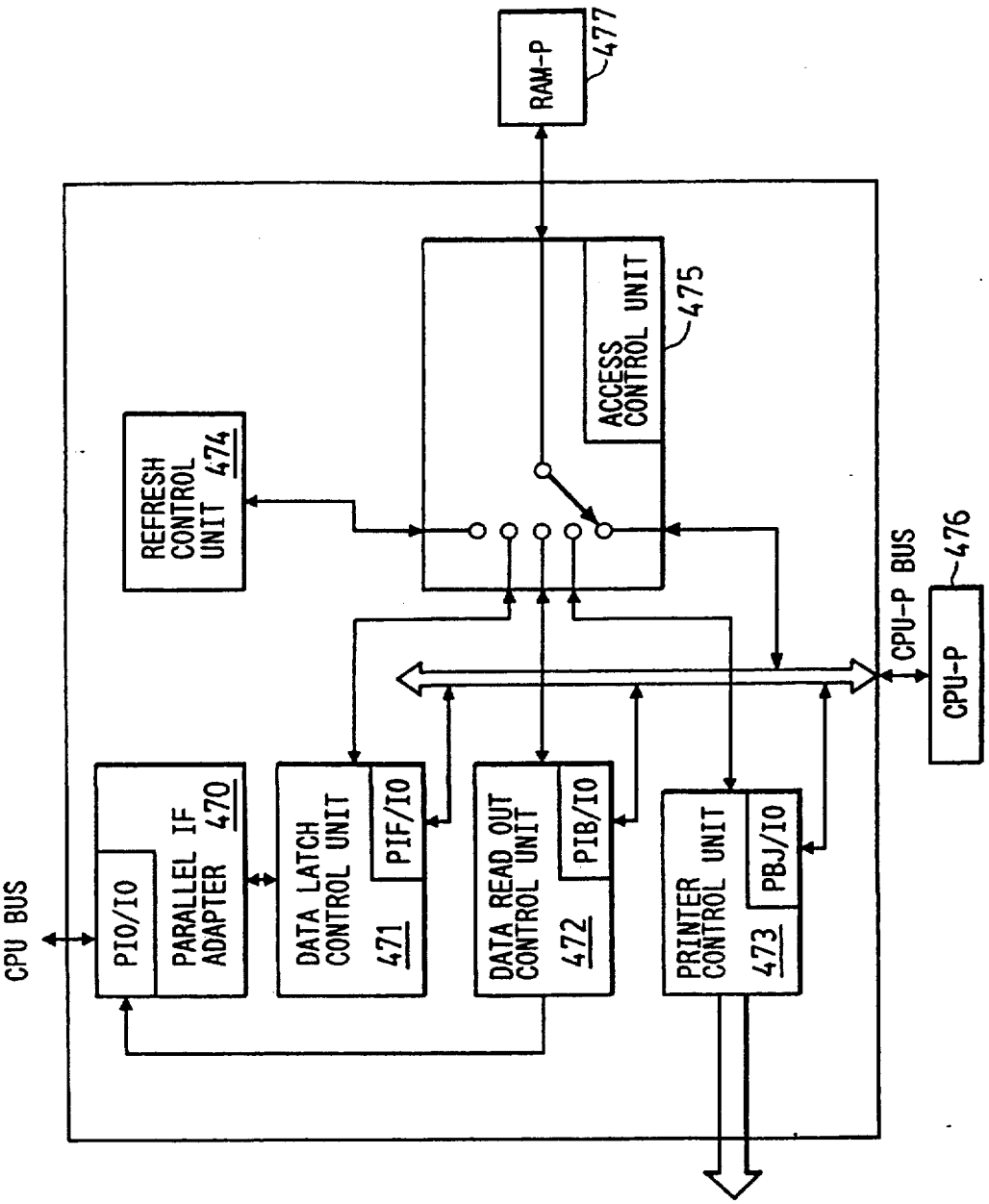
Figure 50:
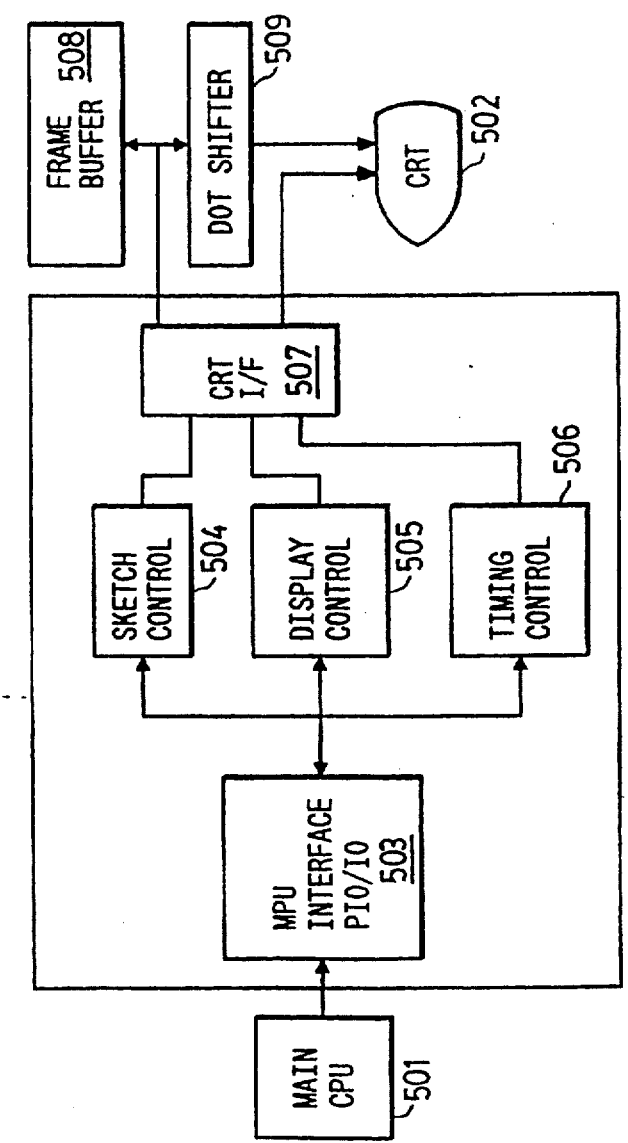
Figure 51:
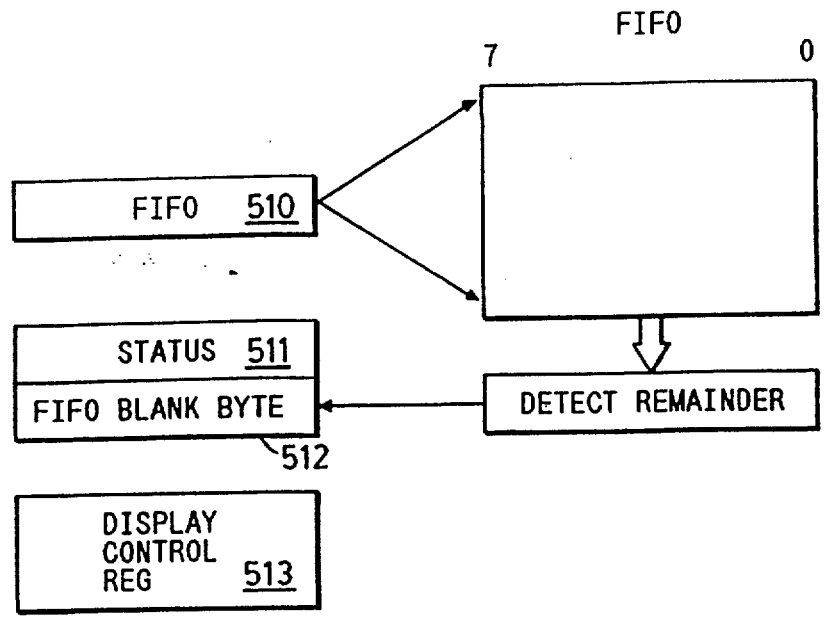
Figure 52:
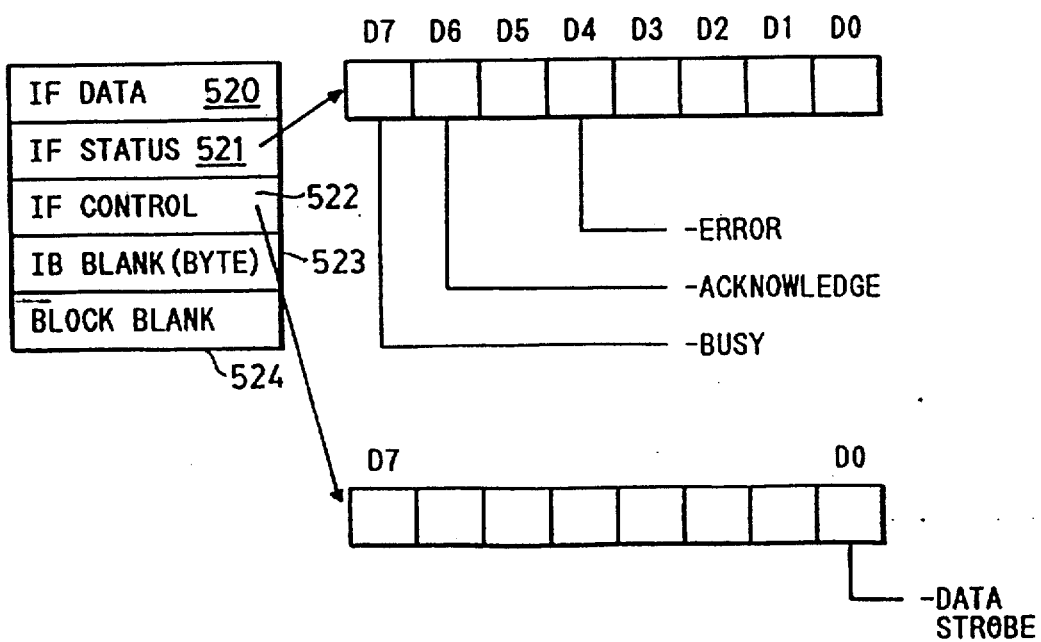
Figure 53:
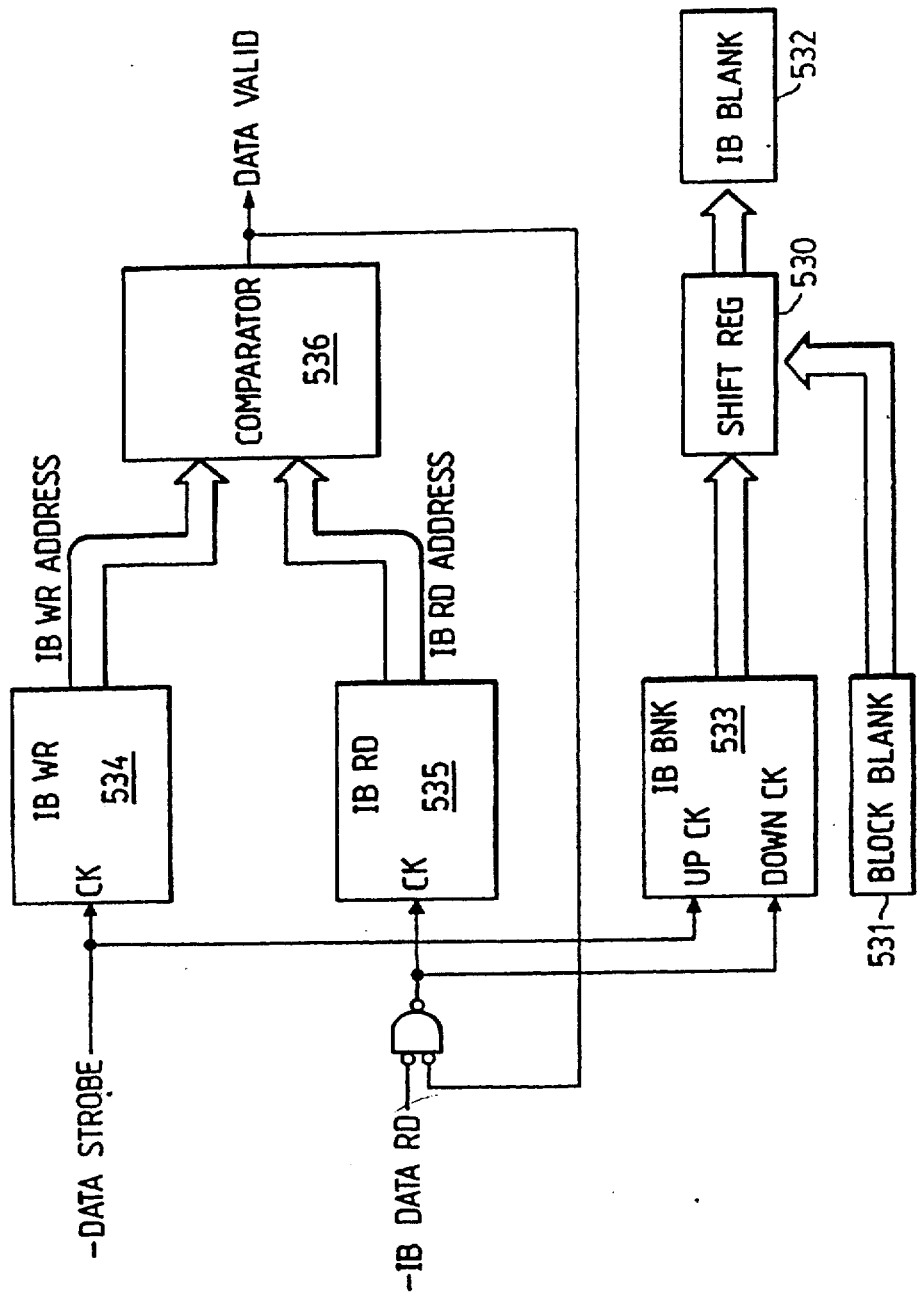

FDD 73 is a floppy disk drive of 3.5", corresponding to 3 modes of 2/1.6/1.0 MB in unformatted state or 2 modes of 2/1.0 MB. The 3-mode FDD effects automatic switches of 2HD/2DD within the FDD, in response to a control signal for 2/1.6 MB supplied from the system when a 2HD media is inserted in the FDD. The controller CONT2 62 effects control shown in FIG. 29. When the operator inserts a media into the drive (1), the drive discriminates whether said media is of low density type 28(1) or high density type 28(2), as shown in FIG. 28, by the presence or absence of the HD identification hole, detected by a photocoupler (2). If said hole is present, a step (3) sets the transfer rate at 500 kbit/sec (for high density), but, if said hole is absent, a step (4) sets the transfer rate at 250 kbit/sec (for low density). (This switching of transfer rate may be automatically conducted by the drive itself according to the presence or absence of said identification hole, or by the system through a device driver.) Then, if the operator designates the drive A, the drive rotates at 300 rpm (7), but, if the operator designates the drive B, the transfer rate is set at 500 kbit/sec and the drive rotates at 360 rpm (8). The sequence is terminated if the inserted media can be read with the revolution and the transfer rate set at the steps 7 and 8, but, if said media cannot be read, a corresponding message is displayed on the display unit.

Upon reading said message that the reading is not possible, the operator designates the other drive (Drive B if media is not readable on the drive A, or drive A if the media is not readable on the drive B). In response the device driver switches the revolution and the transfer rate of the drive and repeats the operations after the step (5) or (6).

For the above-explained operations, there are prepared two device drivers respectively for 2/1 MB and for 1.6 MB. When the drive A or B is designated, there is respectively assigned the driver of 2/1 MB or 1.6 MB. In the flow chart shown in FIG. 29, the readable media in the step (9) is a 2/1 MB media, while that readable in the step (10) is a 1.6 MB media.

An incorporated printer SPRT has a function of turning off the power supply for printer control, except for a host I/F, if there is no access from the personal computer for a predetermined time. In case a request for suspending is received from the host side, there is executed for example an operation for returning the printer head to the capping position, in order to turn off the power supply also for the I/F, thereby preparing for the suspending. In case a request for suspending is received in the course of a printing operation, one of the following operations is executed according to the setting by the user in advance:

The printing operation is immediately interrupted, and the preparation for suspending is executed;

The preparation for suspending is executed after the currently printed data are printed;

The printing operation is immediately interrupted, the sheet is discharged, then the data buffer used for the current printing operation is cleared, and the suspending operation is executed.

An interface SIMM I/F enables memory expansion by SIMM modules of capacities of 2, 4 and 8 MB.

A co-processor CCPU 74 is provided with a co-processor socket, and utilizes a device capable of static operation, since it has a function of actively varying the function clock for the CPU.

A keyboard/mouse interface II/F1 can be connected to the mouse, full-keyboard or ten-keyboard through a 6P mini DIN connector. Since the signal system for mouse is different from that for keyboard, 2 lines among 6 lines are used for VCC and GND, while other 2 lines are used for the mouse and the remaining 2 lines are used for the keyboard. For this reason, the signal system for the mouse is connected to KBC (8042) as in the AT standard equipment, and the signal system for the keyboard is connected to the one-chip microcomputer (MB89625) for effecting the key scanning of the incorporated keyboard. Said one-chip microcomputer identifies the kind of the connected keyboard by reading the identification information ID thereof, and effects a process matching the connected keyboard in the following manner.

In case a 10-keyboard is connected, the internal keyboard is kept enabled, and the key codes transmitted from 10 keys are added to those of the internal keyboard. In this manner keys lacking in the internal keyboard can be replenished.

In case a full keyboard is connected, the scanning of the internal keyboard, and the key codes from said full keyboard alone are supplied to the host computer. In this manner there can be achieved keyboard operations comparable to those in a desk-top personal computer equipped with a full keyboard.

A display interface DI/F 75 is provided with an analog RGB I/F corresponding to super VGA (800×600 16 colors).

A serial interface SI/F 76, corresponding to RS-232C, is provided in one series.

A centro interface DI/F 75 is provided in one unit, in addition to that for the internal printer. Following settings are possible at use:

internal printer: LPT1, centro I/F: LPT2;
internal printer: LPT2, centro I/F: LPT1.

An extension bus interface EI/F of 120 pins is provided in one unit.

An IC card interface ICI/F 78 is provided for the IC card (68 pins) corresponding to JEIDA V4.1. The number of I/F is different depending on the application, and one being provided with a slot while the other being provided with 2 slots. Since said two slots are provided in overlaid fashion, this space can be utilized for accommodating an I/O card (FAX/data modem etc.) which cannot be accommodated in the ordinary IC card I/F.

The IC card is of the JEIDA Ver 4.1, which is taken as the standard by the JEIDA.

The JEIDA Ver 4.1 supports both the memory card and the I/O card, and various cards such as ROM card, RAM card, modem card and LAM card can be replaced in a same IC card slot.

In the following there will be explained, among various IC cards, an IC memory card utilizing a static RAM (hereinafter called RAM card), and the principle for using said card as an imaginary drive similar to FDD or HDD.

[Hardware for RAM card]

Figure 30:
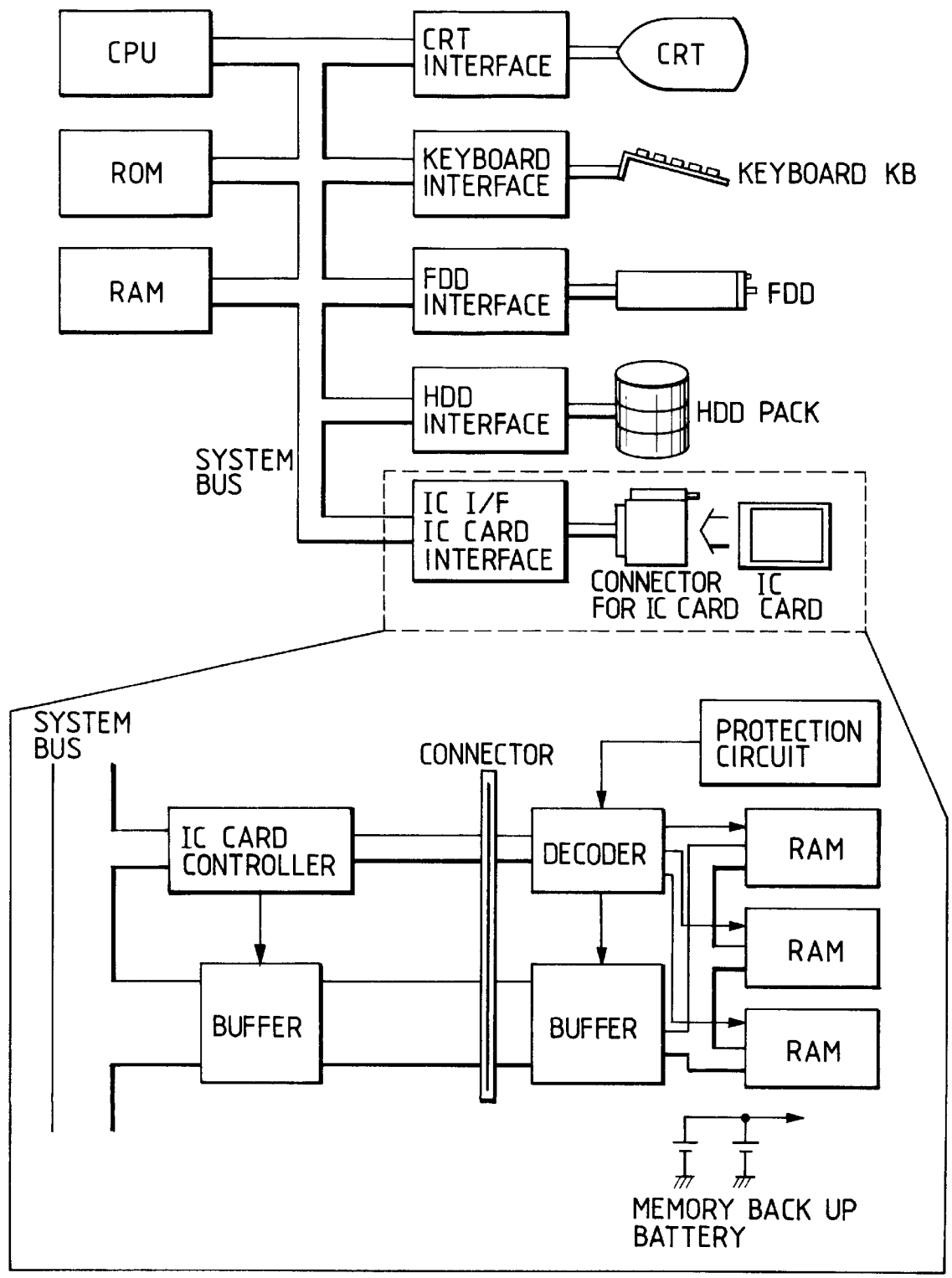
FIG. 30 is a block diagram of an IC card.
Figure 31:
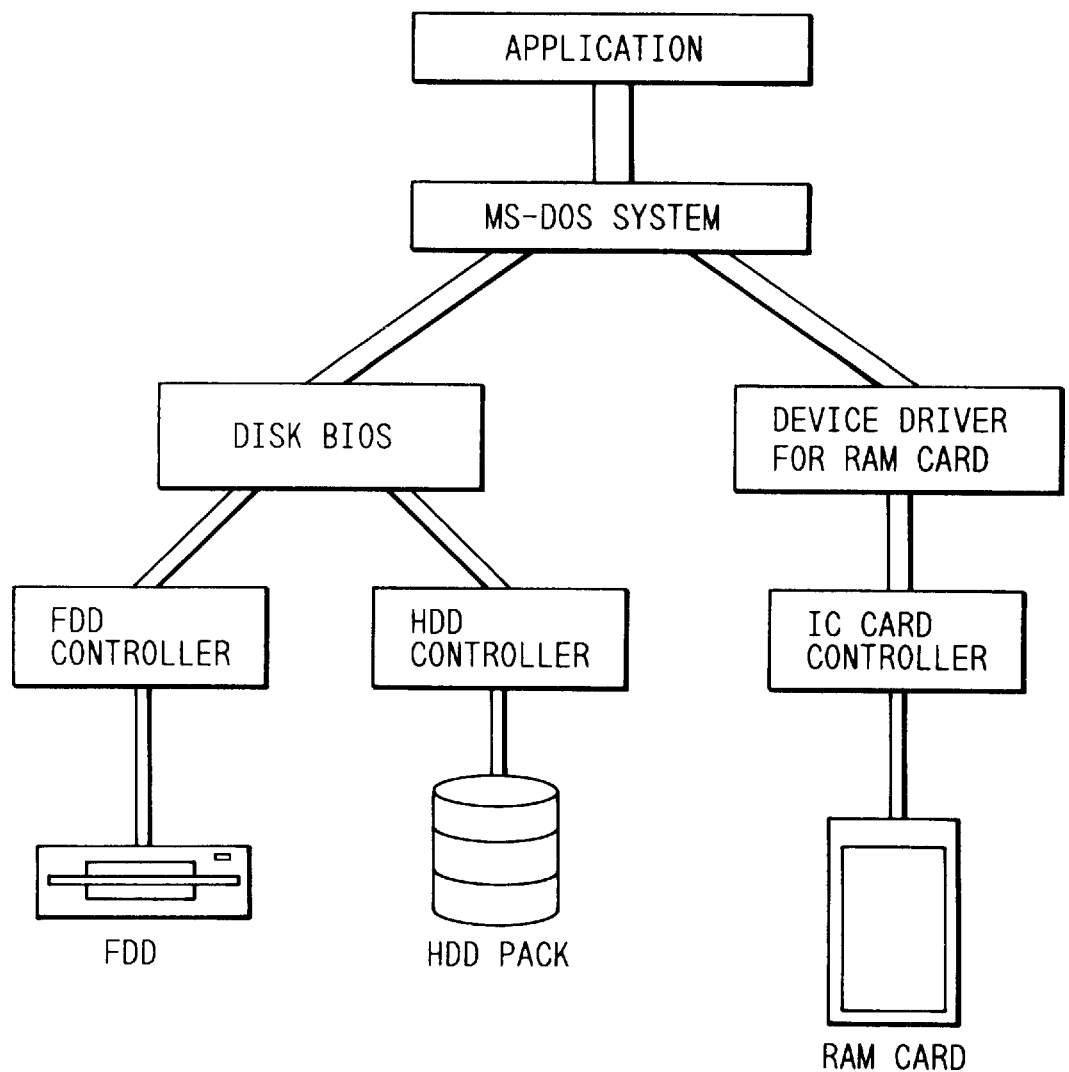
FIG. 31 is a view showing the process of the IC card.

FIG. 30 is a block diagram of a system utilizing the RAM card.

The hardware for the RAM card is similar to that for the ordinary memory, except that it is shaped as a card. However, in consideration of the insertion and extraction operations, there is added a protective logic 301, and a buffer 302 is inserted between the system bus of the main body and the card. There are also provided a battery 303 for retaining the content of memory and an attribute memory for identifying the kind of the IC card, but these are omitted from the description (for details, please refer to references).

In the main body side there is required an interface circuit 304 for connecting the card, and such circuit is usually composed of an exclusive LSI (such as Intel 82365SL or ASCII J6941). Such LSI has, in addition to the card selecting function for controlling the access from the CPU to the card, a mapping function for arranging the addresses of the RAM card seen from the CPU, a protective function for shifting the signal to the card to a high impedance level upon detection of extraction of the card, and an error detecting function at the read/write operation of the RAM card (for details, see references).

Except for these special functions for achieving multiple applications, the RAM card can be regarded as a mere memory from the CPU.

[Imaginary drive]

Imaginary memory means a memory which can be used as a drive, such as a FDD or a HDD. If a RAM card is used as an imaginary drive, access to the data in the RAM card can be easily made by simply designating an exclusive drive number. If the RAM card is registered as a drive D, the copying of a file TEST in a HDD (drive C) into the RAM card can be achieved by a command COPY C: TEST D:. Also the listing of the files in the RAM can be obtained by a command DIR D:.

[Principle for use as imaginary drive]

The principle of using the RAM card as an imaginary drive is same as the ordinary RAM drive (RAM disk) used on MS-DOS. More specifically, an exclusive device driver utilizing the RAM card as a block device is prepared, and is registered in CONFIG. SYS. Thus the MS-DOS system recognizes the RAM card as an additional drive, so that it appears as if FDD or HDD is increased from the standpoint of application.

The device driver exclusive for the RAM card, being dependent on the hardware, has usually to be developed by the hardware manufacturer, but, for the above-mentioned LSI's of Intel and ASCII, supports are available from the software manufacturers.

The outline of the process will be explained in the following, with reference to FIG. 30.

The access of application to the disk usually uses the system call of MS-DOS, MS-DOS confirms the drive number instructed from the application, and, if it is the ordinary FDD or HDD, the parameters required for disk access (drive number, track number, sector number) are transferred to disk BIOS. The disk BIOS further transfers the parameters to an exclusive disk controller, which controls the access to HDD or FDD. If the drive number designated by the application indicates the RAM card, the MS-DOS transfers the necessary parameters to the device driver for the RAM card. The device driver calculates the address on the RAM card from the track number and the sector number, and effects data writing or reading on the RAM card.

Example of calculation:

In case of a RAM card corresponding to 2HD (1.4 MB) with 160 track/disk, 18 sector/track and 512 bytes/sector, the sector address on the RAM card can be calculated by:

Sector address on RAM card =

(track number × 18 + (sector number − 1)) × 512.

Note) Track number starts from 0, and sector number starts from 1.

In the following there will be given an explanation on the aforementioned co-processor CCPU and memory SIMM.

Figure 7:
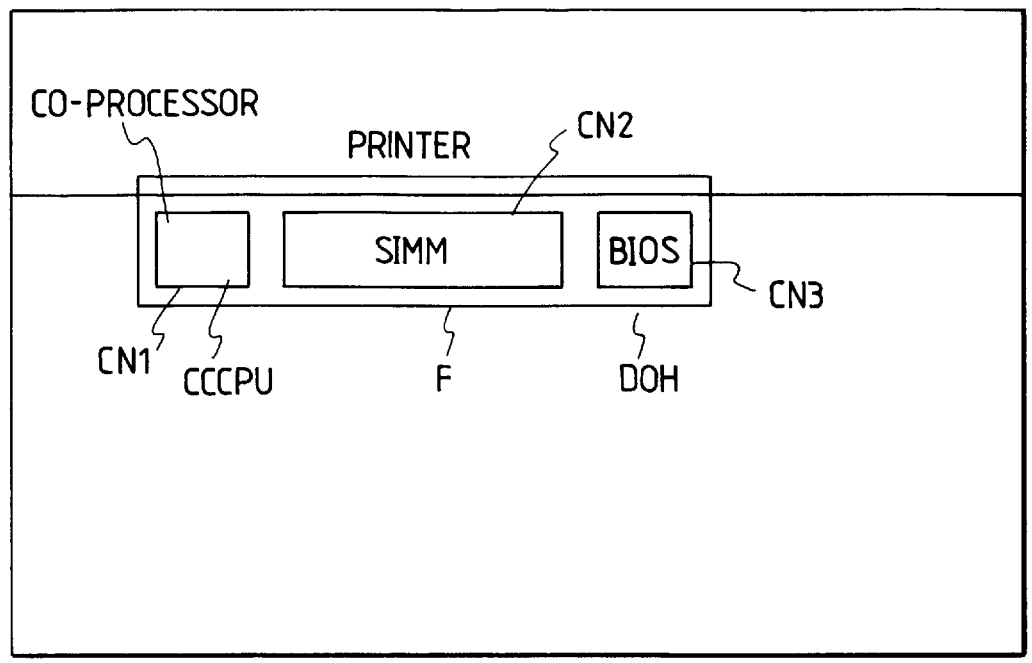
FIGS. 7 and 8 are views showing a co-processor CCPU.

FIG. 7 is the view of the rear side (opposite to the keyboard) of the main body, wherein the main body case is provided with an aperture DOH 700 which is normally closed by a lid F. Under said lid F there are provided connectors CN1, CN2 and CN3 for mounting the co-processor CCPU 701, memory SIMM 702 or BIOS 703. Extension, addition or modification of the system is possible by mounting the co-processor CCPU 701, memories SIMM 702 and BIOS 703 to said connectors.

Figure 8:
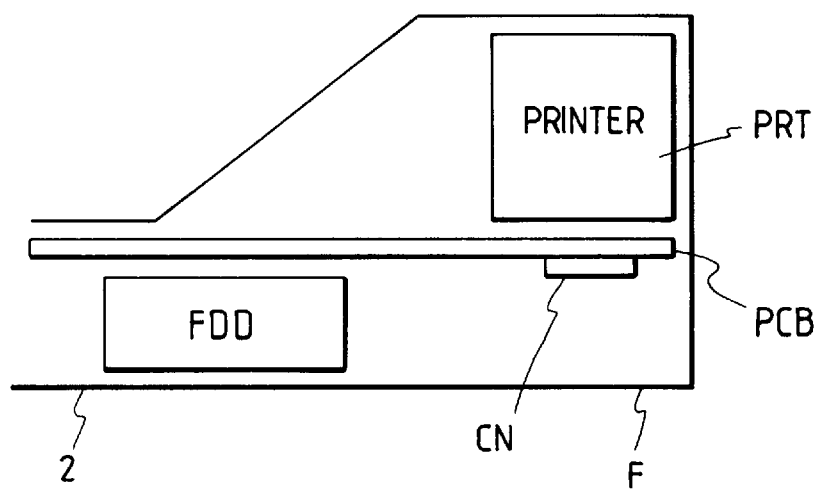

FIG. 8 is a lateral view of the connectors CN1, CN2, CN3 which are mounted on a printed circuit board PCB 80. Around said connectors there are provided the printer PRT 81, floppy disk drive FDD 82 etc.

The above-explained configuration enables easy change of functions.

Figure 9:
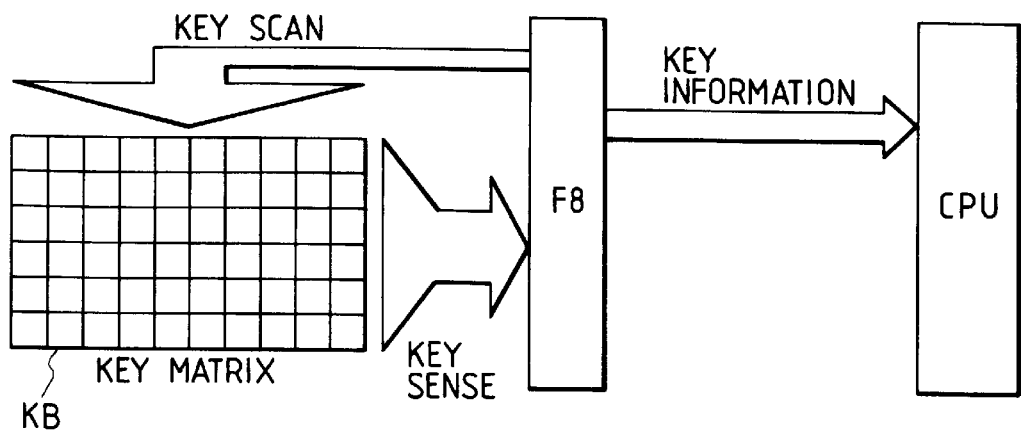
FIGS. 9 to 13 are views for explaining input devices.

In the following there will be given an explanation on the processor F8. As shown in FIG. 9, the processor F8 scans the internal keyboard. A part of the ports of said processor is assigned for scanning and sensing, and said ports are arranged in rows and columns to form a matrix, and key switches are mounted on the crossing points of said matrix. The actuated key switch can be detected by scanning said scanning ports and detecting the state of the sensing ports. The processor F8 generates a key signal corresponding to the actuated key, based on an internal conversion table, and transfers said key signal to the CPU.

[System control utilizing key input]

Figure 10:
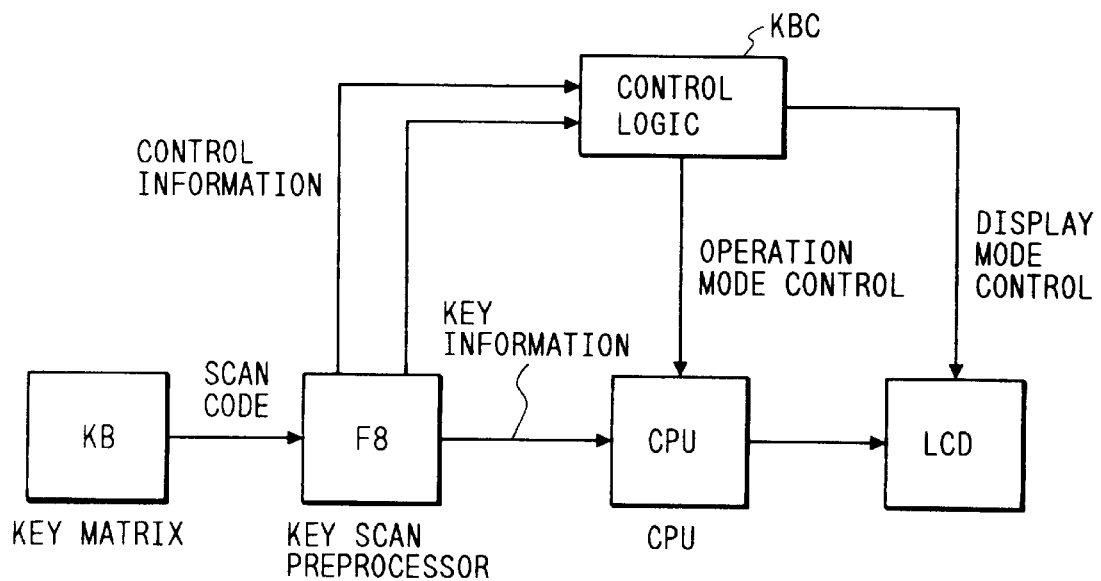

The present personal computers, effecting system control based on the inputs to the keyboard, require more complex signal processing than before, for electric power saving and for achieving a higher speed. Also there have been developed controlling processors of diversified functions. Therefore, additional functions are attained by employing a processor of more diversified functions than before, for keyboard scan control. In response to the inputs of a specified combination of the keys, the controlling processor not only sends the key signal to the CPU but also operates certain output ports which are not present in the conventional controlling processor, thereby effecting additional process. As an example, in response to an input CTRL+ SHIFT+Q, the state of a signal line in the output port is varied as shown in FIG. 10, and this signal is used for inverting the displayed image and switching between the normal operation and the power-saving operation of the personal computer.

[Switching of full keyboard and 10-keys]

Figure 11:
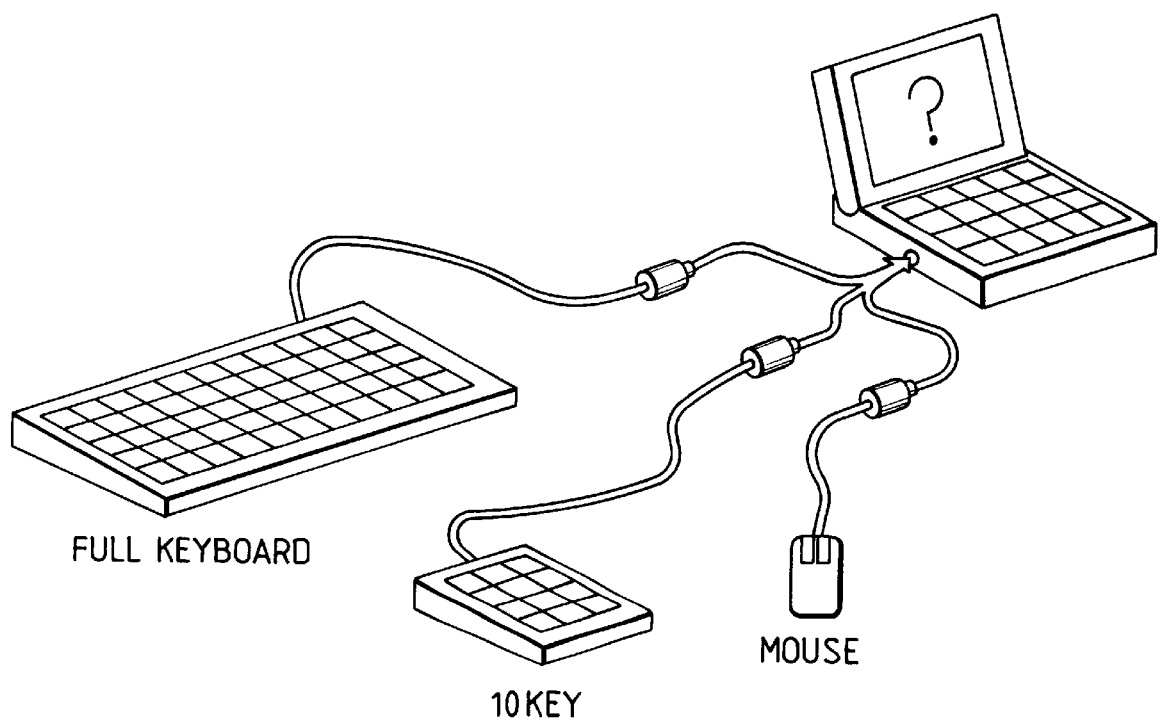
Figure 12:
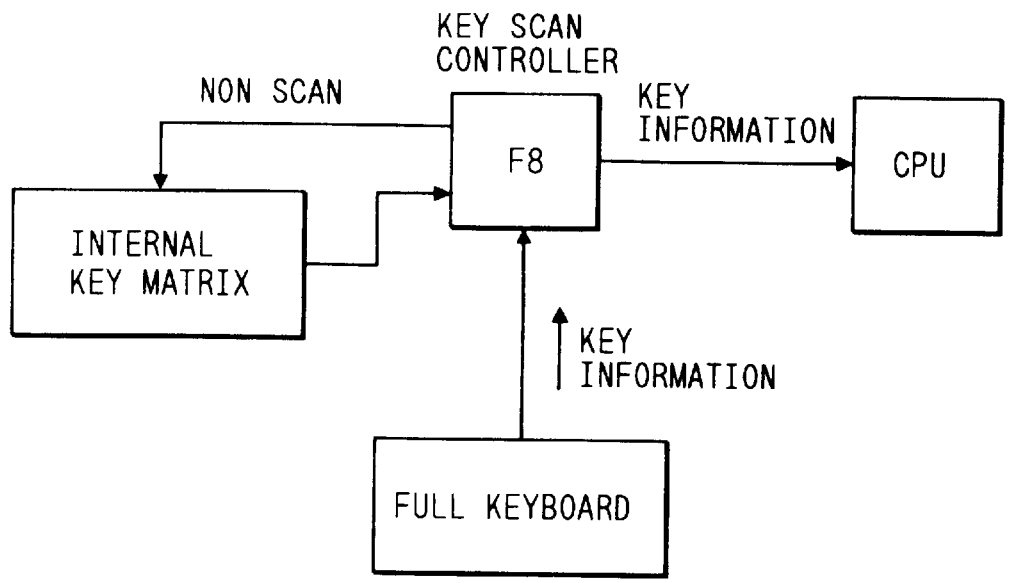
Figure 13:
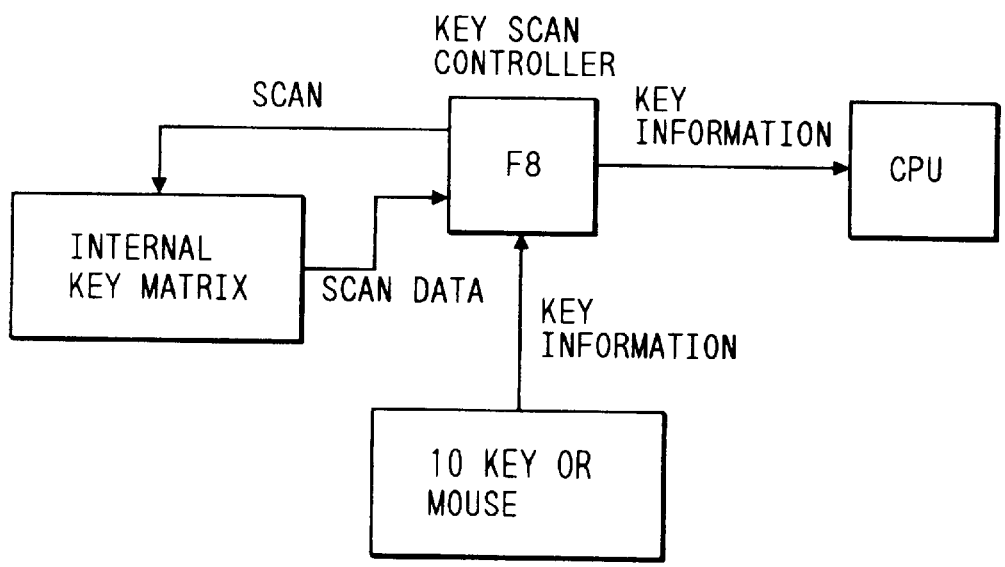
Figure 14:
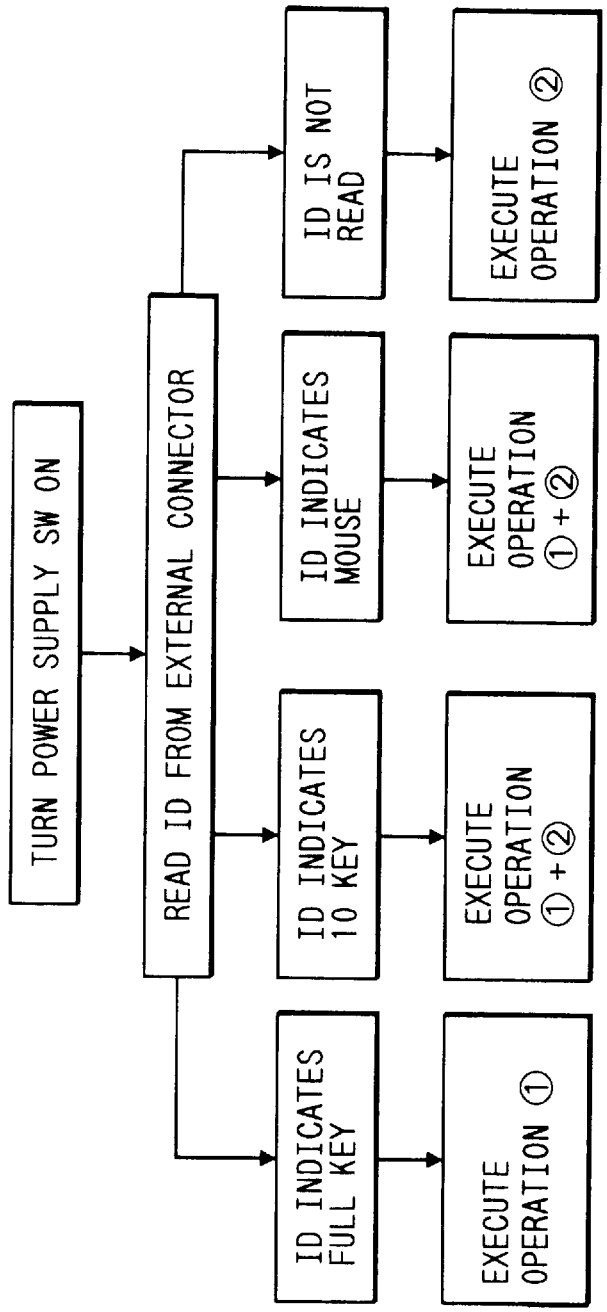
FIG. 14 is a view showing the control sequence for the input devices.

The apparatus is equipped with an external connector II/F, to which, as shown in FIG. 11, a full keyboard, a 10-keyboard and a mouse can be connected. When the full keyboard, 10-keyboard or mouse is connected as shown in FIG. 12 or 13, a sequence shown in FIG. 14 is executed by the processor F8.

At the start of power supply of the apparatus, the key scan control processor F8 receives the ID code from the input device connected to the external connector, thereby identifying whether said connected device is a full keyboard or a 10-keyboard. In the former case, said control processor terminates the scanning of the internal keyboard, and transfers the signals from said connected full keyboard to the CPU. In the latter case, said control processor continues the scanning of the internal keyboard, thereby detecting the position of input, converting it into a control code and sending it to the CPU. Thus the internal keyboard is enabled, while the key signals from the connected 10-keyboard or mouse are merely transferred to the CPU.

The input interface KBC is provided with a processor 8042, for discriminating various keyboards (for examples specifications for different countries).

Figures 15, 16:
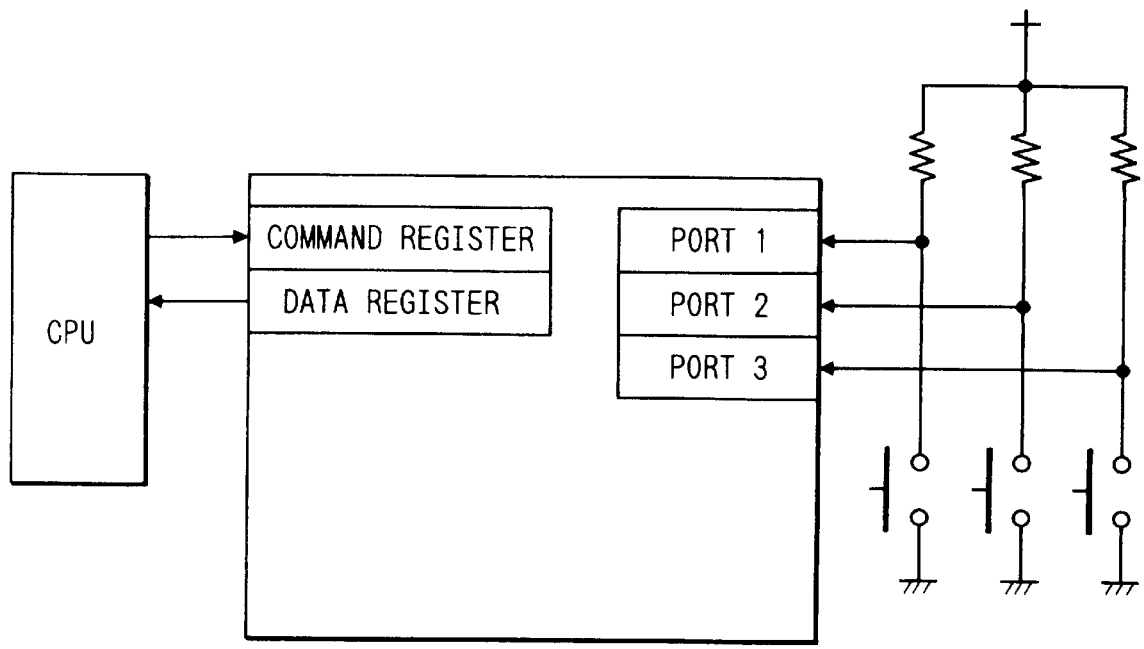
FIG. 15 is a view for explaining the kinds of the input devices.
FIG. 16 is a chart showing the service lives of the battery.

Let us assume that the apparatus is produced for example in four models. In such case, in order to improve the productivity of the software, there is used only one system ROM, and the process is varied according to the model. In order to realize such variation, certain ports (3 bits) of the microprocessor 8042 are maintained at a certain potential, as shown in FIG. 15, for access by the CPU.

The sequence of said access is as follows:
(1) CPU sends an instruction to the processor 8042 to read the values of the ports 1, 2, 3;
(2) The processor 8042 informs the CPU of the completion of reading;
(3) CPU reads the data of the processor 8042 into a register; and
(4) CPU discriminates the model based on thus read data.

Figure 22:
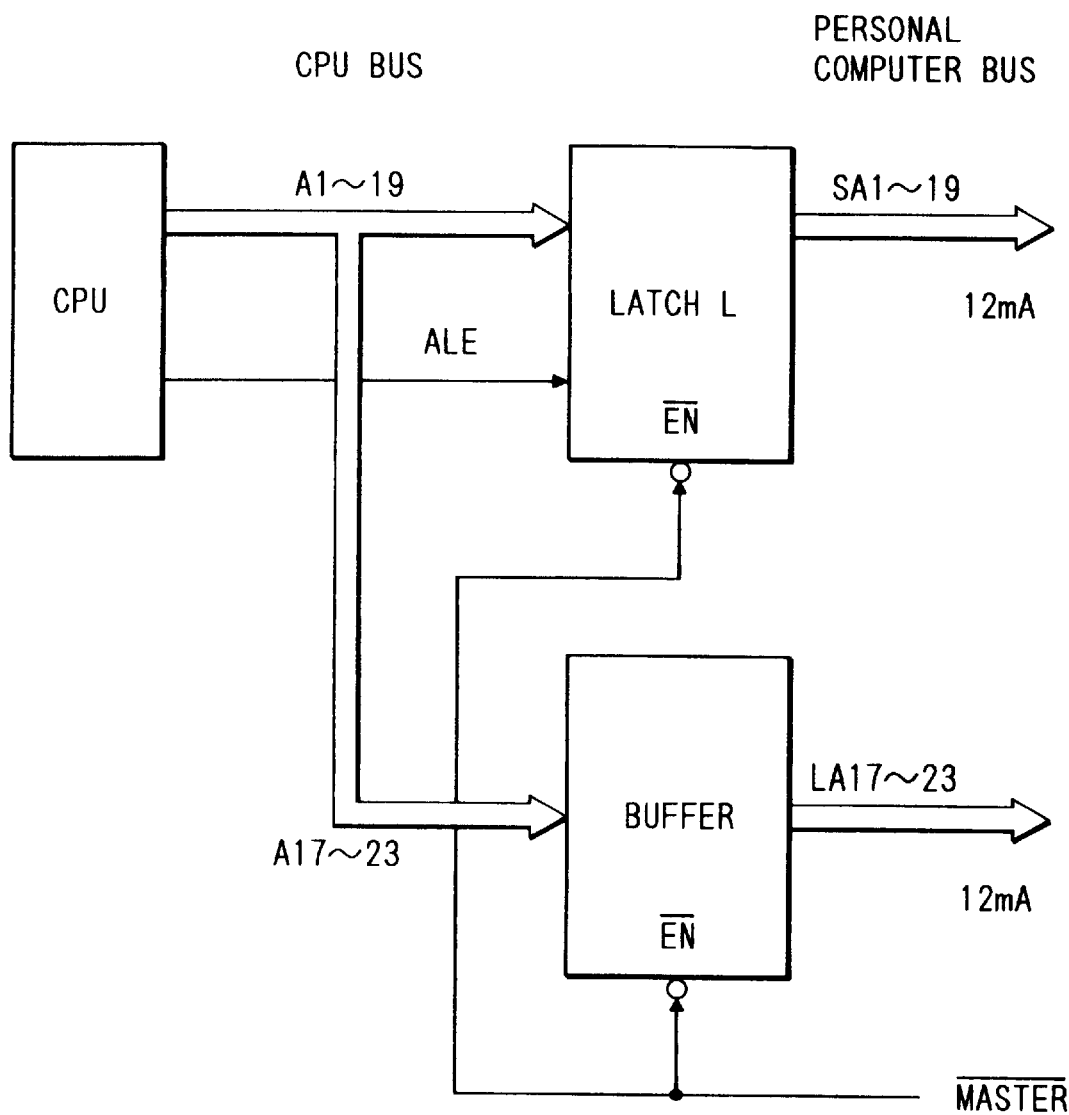
FIGS. 22 to 25 are views for explaining a gate array.
Figure 23:
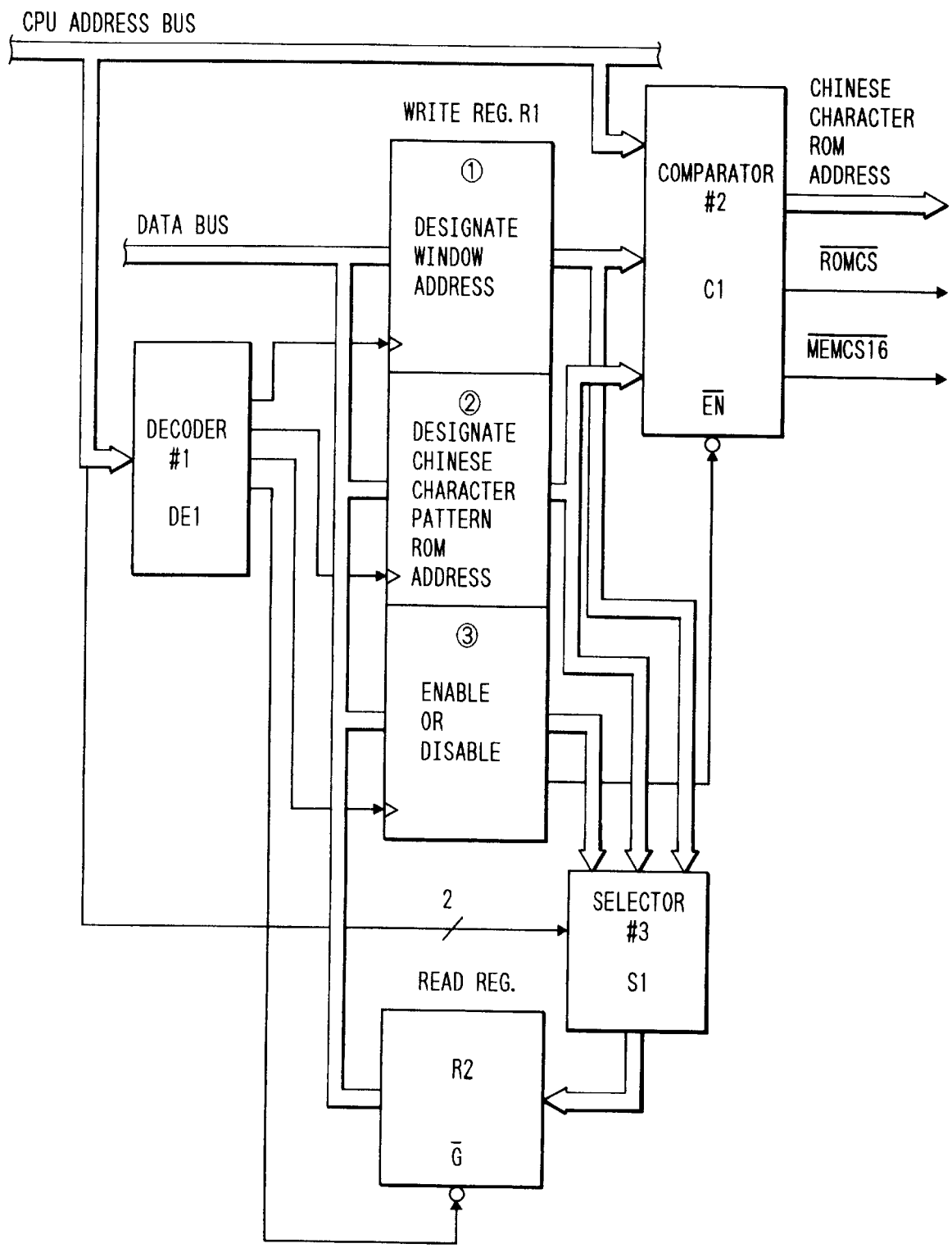

Now there will be given an explanation on the gate array GAS, with reference to FIGS. 22 and 23.
1. Address latching function Addresses released by the CPU 220 are latched, by ALE, in a latch L 221, for use as address signals for the bus of the personal computer. Since various devices are attached to the bus of the personal computer, the driving ability of the signal is selected as 12 mA.

In case another bus master uses the bus of the personal computer, the bus of the CPU is disabled.
2. Addressing function for Kanji ROM (CROM)

When the CPU makes access to a certain address, the decoder DE1 230 generates write-in selection signals for three write registers R1 231 and a read-out signal for the read register, based on the address signal from the address bus.

The information to be written in the three write registers R1 231 are:
(1) designation of window address for memory access to the Kanji ROM 231(1);
(2) designation of address of Kanji ROM 231(2); and
(3) whether to enable or disable the above-mentioned functions (1) and (2) 231(3),
and these information are written into a register selected by the write-in selection signal generated by the decoder DE1.

When the CPU makes an access to the memory, a comparator #2C1 232 compares the current CPU address with the value written in the register 231(1). If these two values coincide each other and the function is enabled by 231(3), signals CS* and MEMCS16* are released from the ROM, whereby the data of the Kanji ROM at the address written in the register R1 (2) are accessed by the CPU.

When the read signal for the read register R2 233 is released, the register R1 231(1)–231(3) are selected by a selector 3S1 234 according to the lower two bits of the address signal, and the value of thus selected register is fetched by the read register into the CPU.

Figure 24:
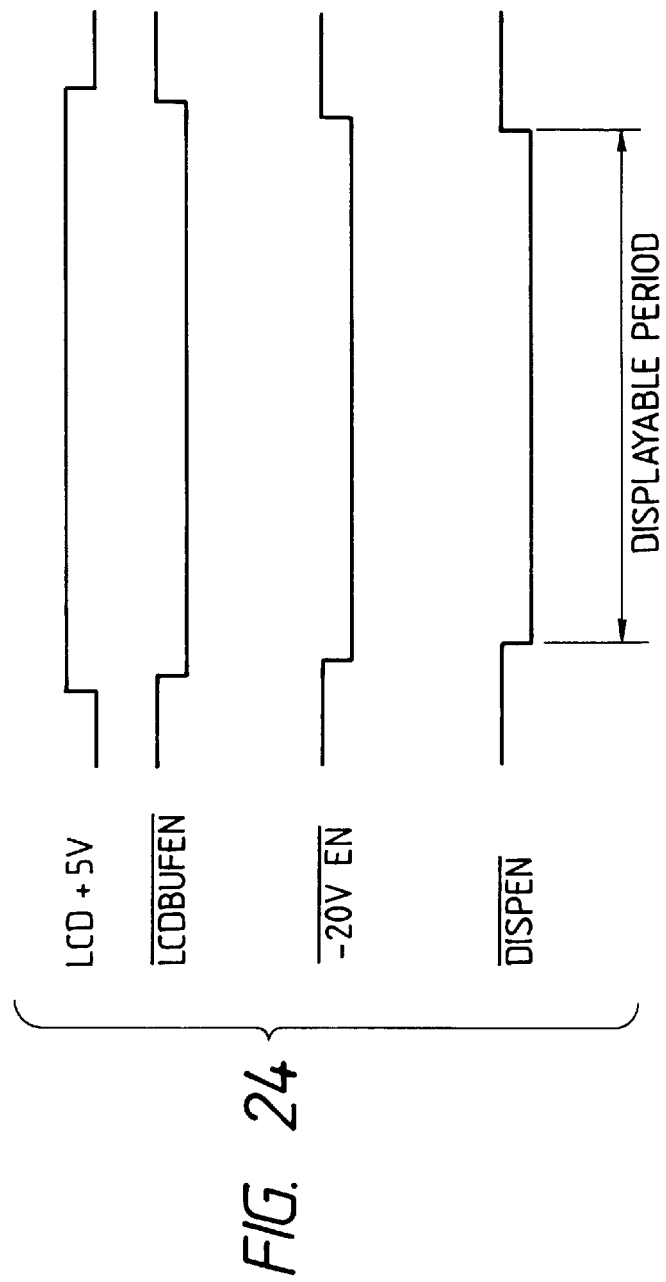
Figure 26:
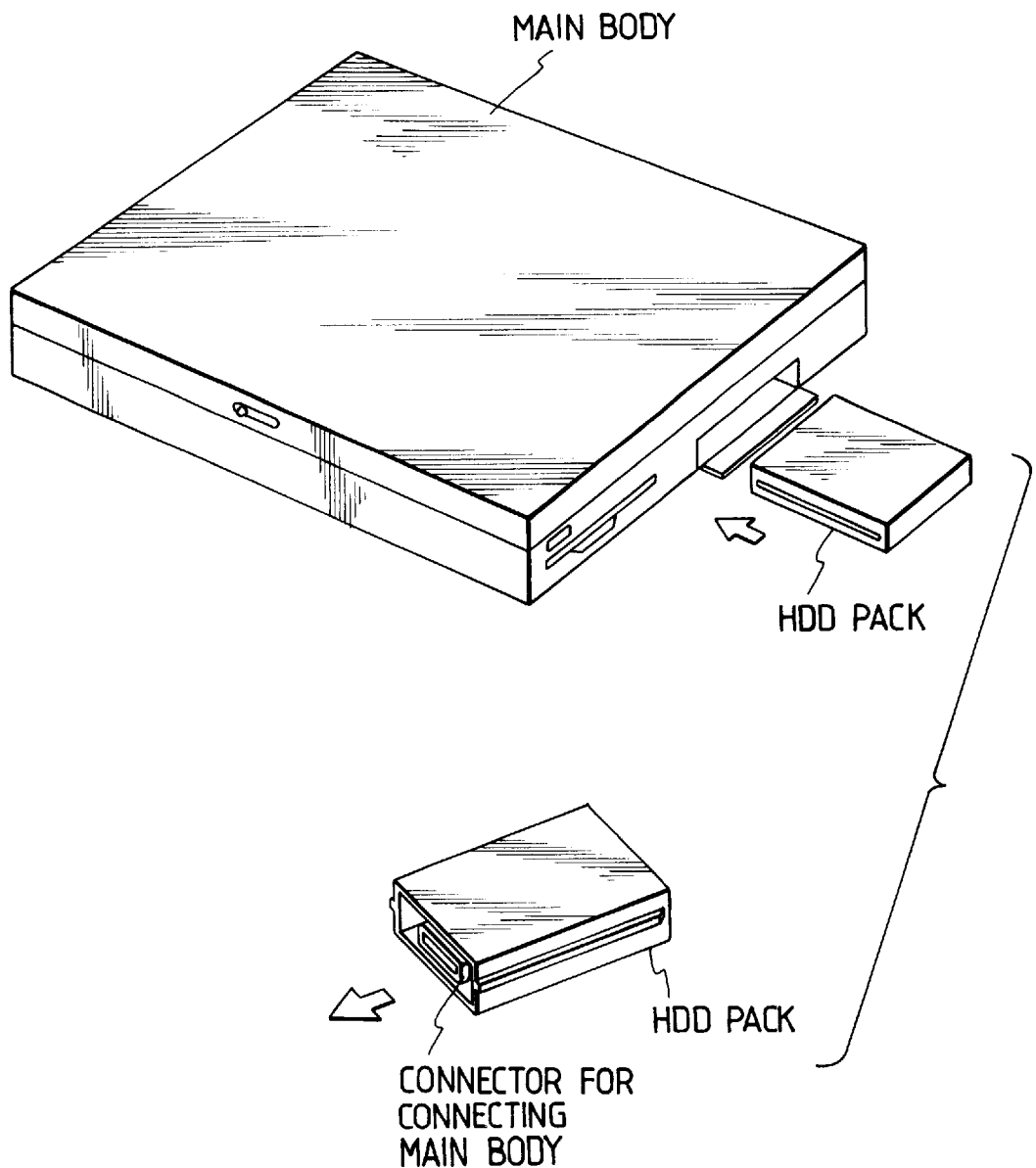
FIG. 26 is a view showing a HDD pack.

In the following there will be explained the gate array GAL with reference to FIG. 24.
Sequence of signals to LCD In the display by LCD, the signals and the power supply to the LCD are given predetermined sequences, and the signals are generated in the following timings, in order to attain proper display and to protect the LCD driver.

Figure 25:
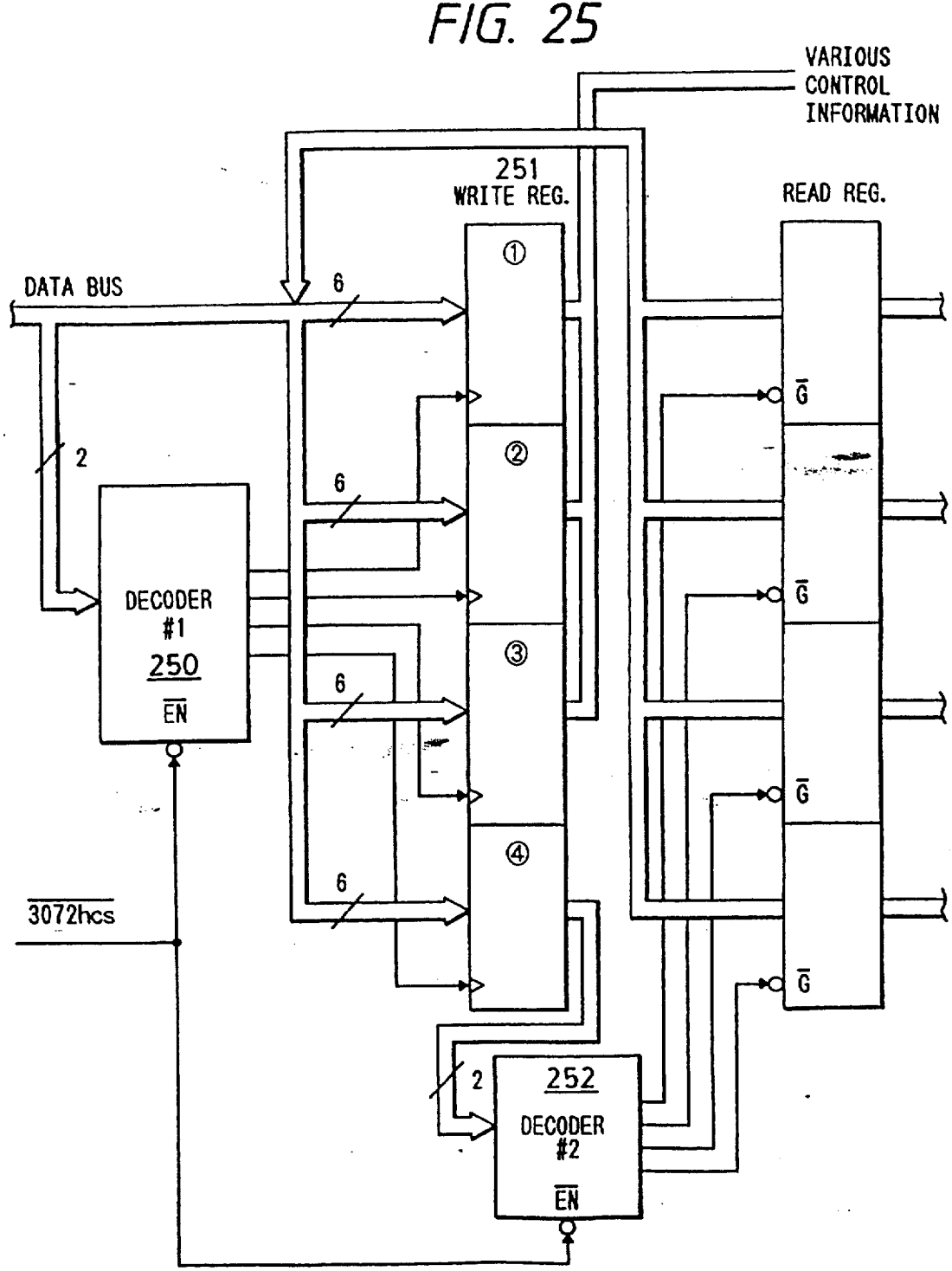
Figure 27:
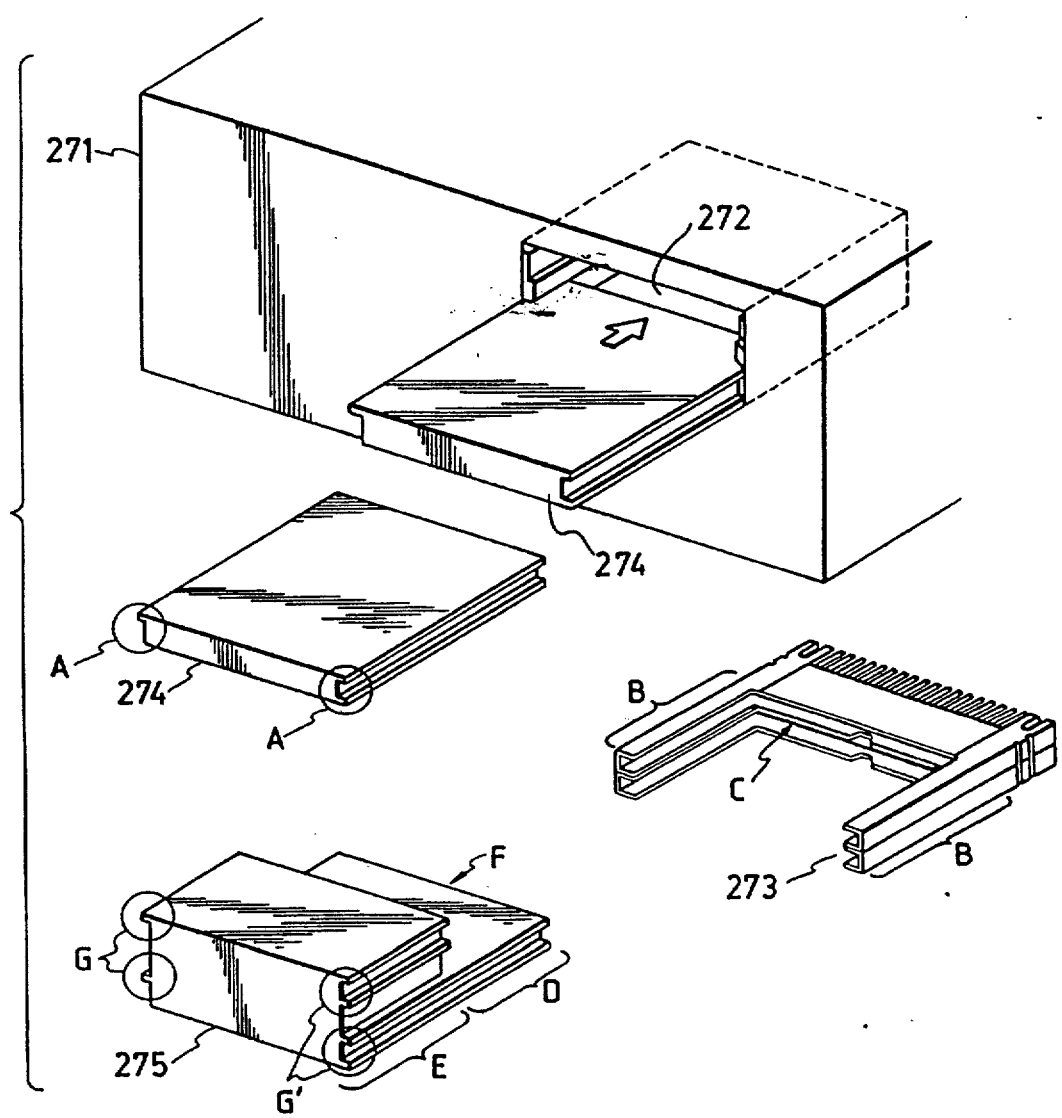

In the following there will be given an explanation on the extension bus interface EI/F, with reference to FIG. 25.
I/O port extension function When the CPU makes an I/O access to an address (for example 3072 h) there is released a chip select signal. When the CPU makes I/O write access to 3072 h, the upper two digits of the written value are decoded by the decoder #1 234, utilizing said chip select signal, to generate write-in selection signals for four 6-bit write registers. Among four write registers, three registers 251(1)–251(3) are used for various controls in the personal computer, and three write-in selection signals are used for data write-in into these registers.

The remaining one is the write-in signal for the write register 251(4). The lower two bits of 6-bit data written into the write register 251(4) are decoded by the decoder #2 252 to generate the read-in selection signals for four read registers.

When the CPU effects the I/O read access to 3072 h, various information in the personal computer are read, through a read register selected, among four read registers, by the read-in selection signal generated by the decoder #2 252.

In the following there will be explained the power supply.
[Power management]

For saving the power consumption and extending the battery life, the state of the system is actively varied in the following five modes:
<Full-on mode>

In this state, all the (1) CPU, (2) co-processor and (3) controller CONT3 operate at the maximum operation frequency. Also the peripheral circuits/devices are enabled or disabled according to the states defined by the user in advance.
<On-mode>

In this state, all the (1) CPU, (2) co-processor and (3) controller CONT3 operate at ⅛ of the maximum operation frequency. Also the peripheral circuits/devices which are in the operation state are automatically disabled after the lapse of a certain time, defined by the user, in a non-operating state.
<DOS mode>

In this state, (1) CPU and (2) co-processor are cut off from the supply of clock pulses, and stop while retaining the internal registers. The peripheral circuits/devices are enabled or disabled according to the states defined by the user in advance.
<Suspend mode>

In this state, all the unimportant peripheral circuits are turned off. The CPU and the co-processor are also turned off after their states are saved in the memory. The peripheral controllers such as CONT1, CONT2 etc. enter the suspend mode for suppressing the electric power consumption. However the hardware effective operation detection circuit, the refreshing circuit for DRAM and the refreshing signal on the extension bus are not turned off and continue to function with a reduced frequency. The system moves to the full-on mode, in response to a request for resuming.
<Off-mode>

This state corresponds to the power-off state in the ordinary AT compatible equipment. In this state the RTC in the controller CONT2 alone is powered.

The operation modes mentioned above are caused by the following triggers:
SE0: Effective hardware operation (operation effective to the system) is detected;
SE1: Effective hardware operation is not detected;
SE2: Transition time to the DOS state expires;
SE3: Transition time to the suspend state expires;
SE5: Power source reaches the normal operating voltage;
SE6: Power source becomes lower than the normal operating voltage (for example at power-off);
SE7: Remaining battery capacity becomes lower than the operable limit value;
SE8: An alarm interruption by RTC is received;
SE9: An interruption request to return to the preceding power saving mode is received;
SE10: A rest state of the software is detected;
SE11: The display unit is closed, or a suspend request by the suspend switch is received;

SE12: The display unit is opened, or a resume request by the resume switch is received;

SE13: An interruption request for power increase, for example by the bell of the modem, is received.

[Batteries]

A main battery, a sub battery and a lithium battery are incorporated in the main body.

<Main battery>

The main battery is used for driving the main body, and is formed as a battery pack which is easily detachable from the main body. Three battery packs are available, with different internal configurations of the pack. One uses nickel-cadmium cells (1.2 V, 1200 mAh).

<Sub battery> (3.6 V, 45 mAh)

This is a back-up battery for retaining the data memorized in the main body, in case the main battery shows a voltage reduction or it is replaced.

<Lithium battery>(3.0 V, 850 mAh)

This is for driving the RTC (real-time clock) while the main body is turned off, and for SRAM back-up.

[Charging methods]

<Main battery>

The main battery can be charged while it is mounted in the main body. An AC adaptor is connected to the main body, and the charging is conducted under the control of the processor F8 while the main body is in the suspended state.

<Sub battery>

The sub battery is charged by the +5 V power supply of the main body through a charging resistor, while the main body is in operation.

[Power supply/printer control unit]

Figure 17:
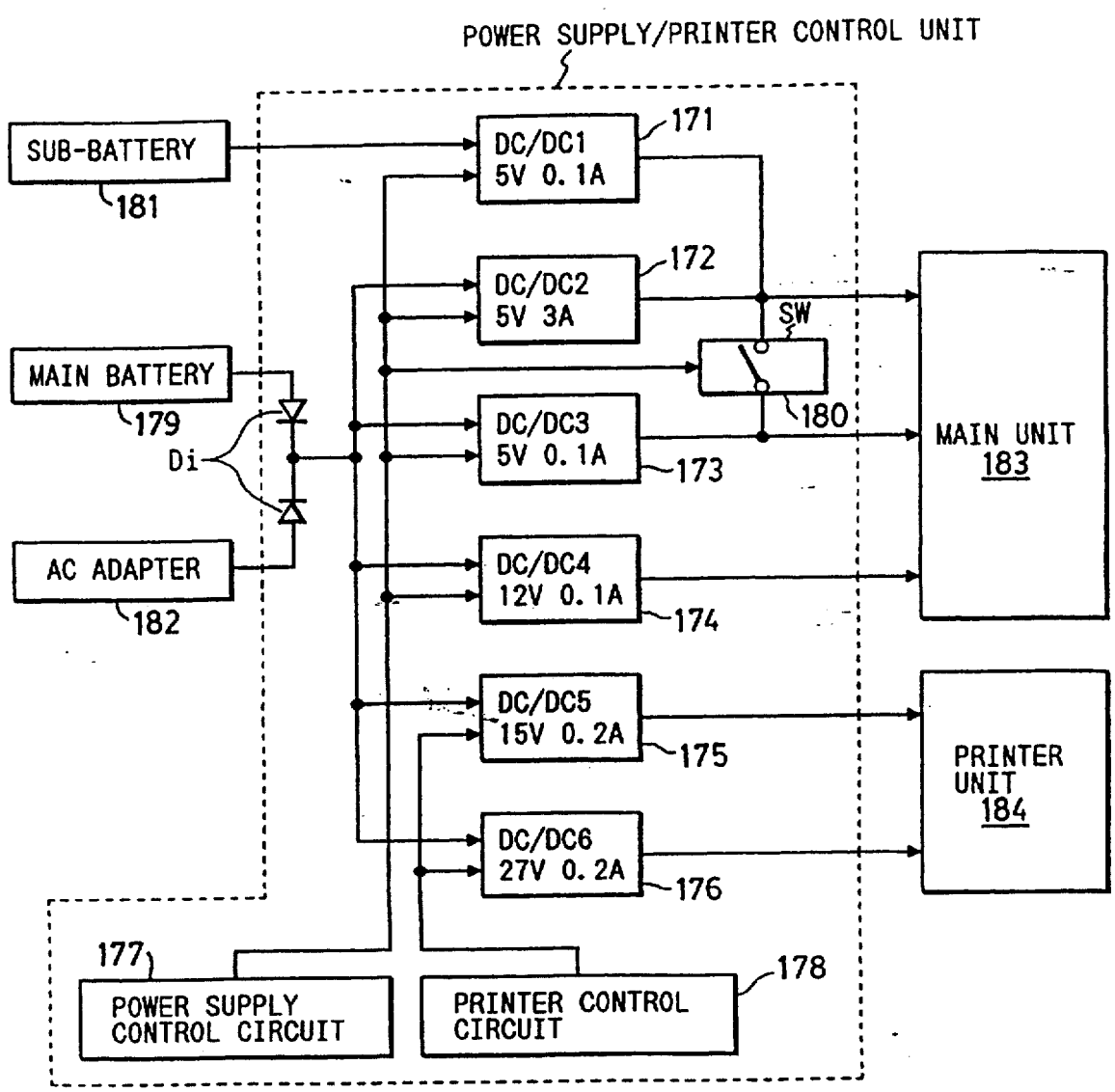
FIG. 17 is a block diagram of a power supply device.
Figure 22:
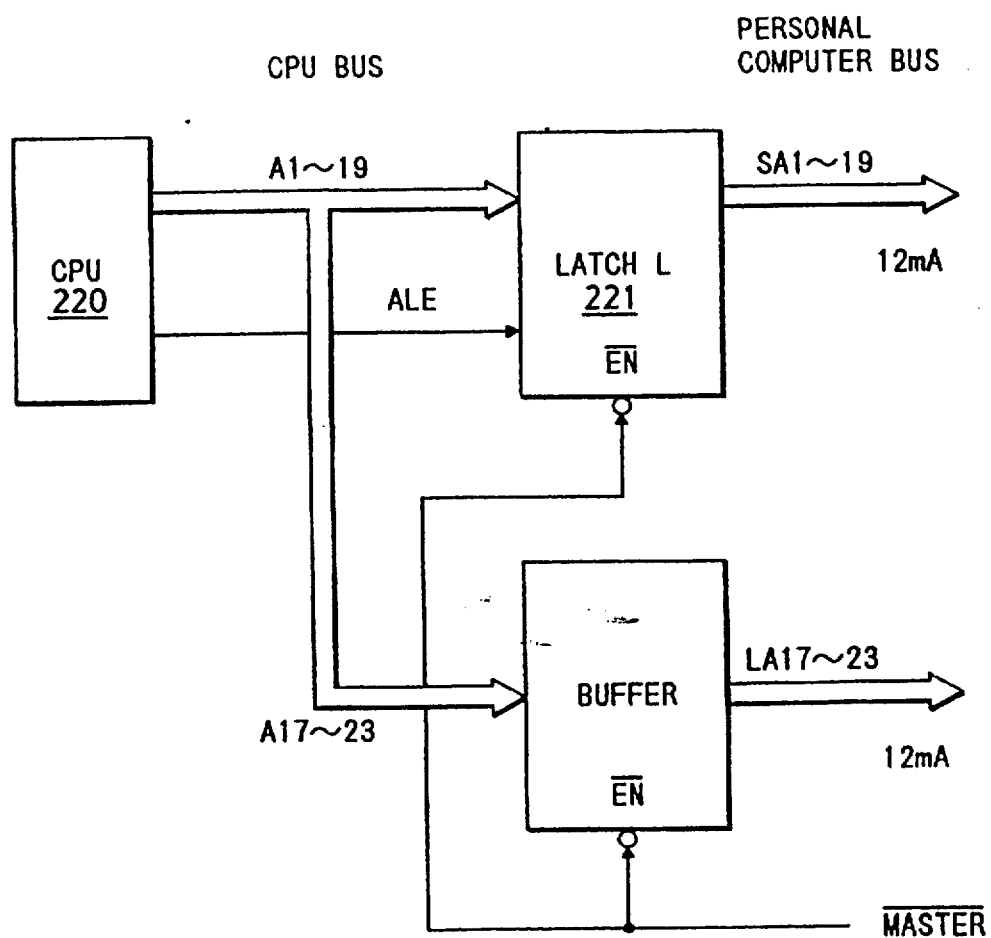
Figure 23:
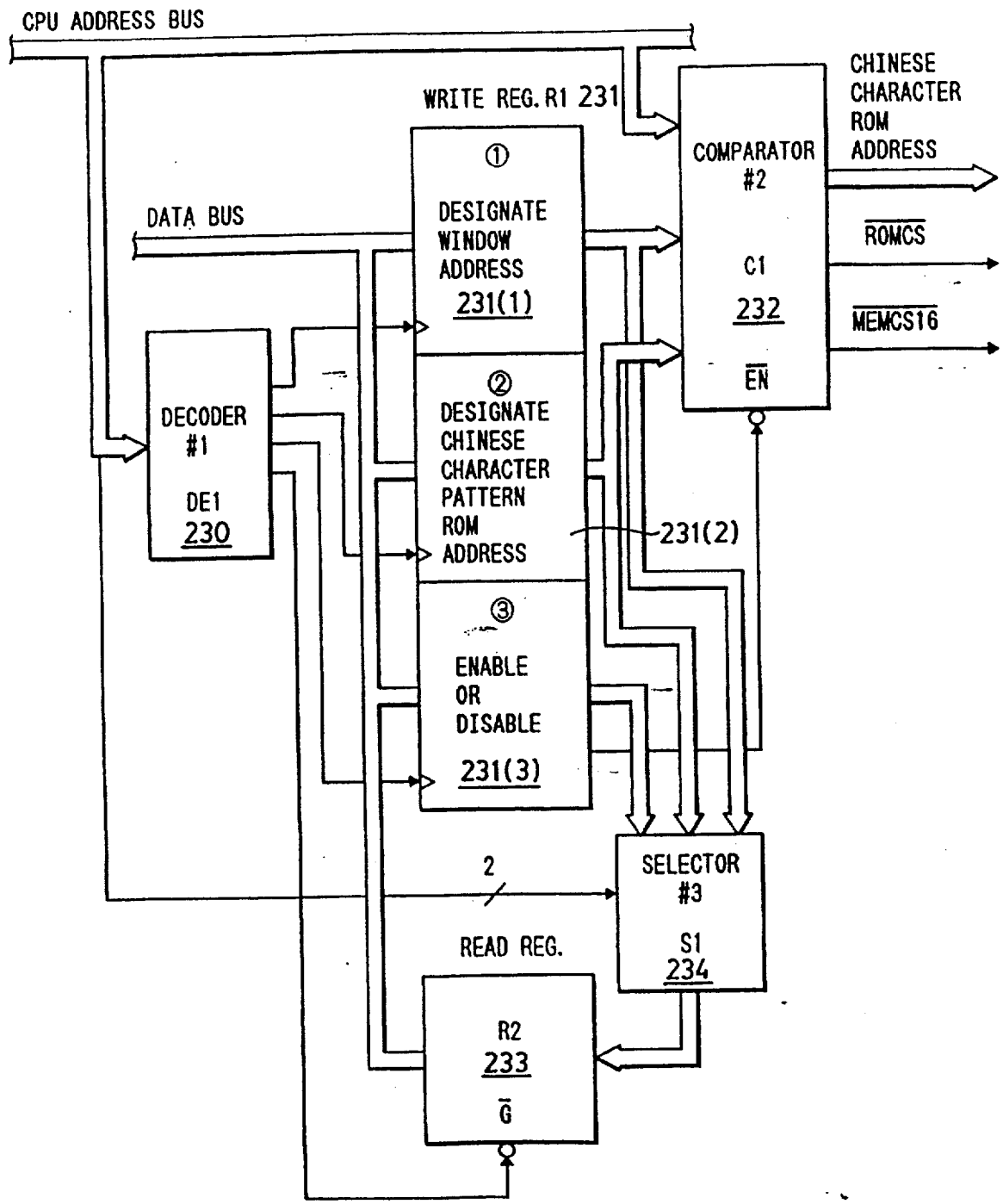

The power supply/printer control unit is composed, as shown in FIG. 17, of six DC/DC converters DC/DC1–6 171–176, a power supply control circuit 177, a printer control circuit 178, diodes Di 179, and a switch circuit Sw 180.

The converter DC/DC1 171 is powered by the sub battery 181, while the converters DC/DC2–DC/DC6 (172–176) are powered by the main battery 179 or by the AC adaptor 182 through the diodes Di 179.

The converters DC/DC1–DC/DC4, 171–714, are controlled by the power supply control circuit 177 and send the outputs to the main unit 183. The converters DC/DC5 175, DC/DC6 176 are controlled by the printer control circuit and send the outputs to the printer unit 184.

The converter DC/DC1 171 is activated in the suspended state or when the power supply by the main battery 179 or AC adaptor 182 is not available (for example at the replacement of the main battery). In this state the switch circuit is closed for the back-up for the memories and registers in the main unit.

The converter DC/DC2 172 is activated in the operation state, for power supply to the CPU, LSI's, I/O's etc. in the main unit.

The converter DC/DC3 173 is activated in the operation state and in the suspended state, and the switch circuit Sw 180 is closed in the suspended state for back-up of memories and registers in the main unit.

The converter DC/DC4 174 is the power source for the IC card, and is controlled by the control signals from the IC card controller, through the power supply control circuit 177.

The converter DC/DC5 175 is the power source for the motor for sheet feeding and carriage movement in the printer unit.

The converter DC/DC6 176 is the power source for driving the head in the printer unit.

[Battery charging]

In this apparatus, the battery-charging can be done in the main body. There may be employed a nickel-cadmium battery or a nickel-hydrogen battery which is to be charged for 2 hours. However, because of the limitation in the capacity of the AC adaptor, the charging is not conducted while the main body is in function. Also when the main power switch is turned off, the apparatus is considered to be in a completely stepped state, and the charging is not conducted. The control processor executes the charging when the main power switch is turned on but the apparatus is not operating as the computer (suspended state). The control processor initiates the charging after confirming the state of the battery, such as the completion of charging or the replacement of the battery. It also discriminates the kind of the battery, and effects the charging with parameters matching the nickel-cadmium battery or the nickel-hydrogen battery.

The charging is executed under the following conditions:

When the battery is replaced, the charging is unconditionally started;

When the battery is not used after the previous charging, the charging is not conducted;

When the battery is used to a certain extent after the previous charging, the charging is conducted.

Under the above-mentioned conditions, the charging is conducted in the following manner:

(1) The battery voltage is measured, and, if it is an over-discharged state, pulsed charging is conducted for a predetermined period;

(2) If the battery voltage is within a certain range, rapid charging is conducted for a predetermined period;

(3) If the battery does not show abnormality in temperature, voltage and current after said rapid charging, the rapid charging is continued with the detection of voltage change;

(4) The charging is interrupted if the battery voltage shows an abnormal drop, or if the temperature exceeds 60° C., or if an abnormal current is observed, in the course of charging;

(5) The charging is terminated upon detection of the completion, based on the measured change in the voltage and in the temperature.

Figure 18:
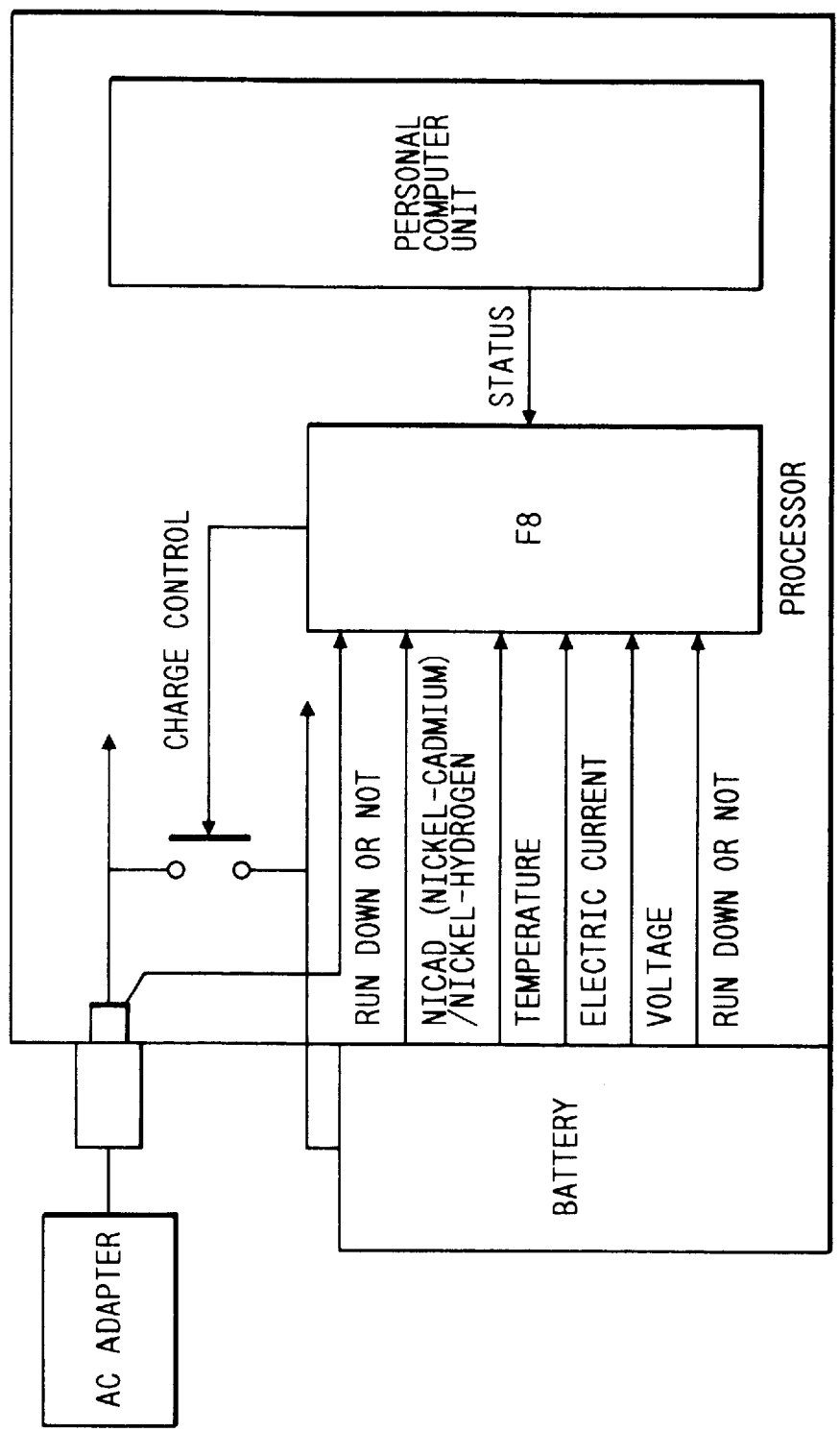
FIG. 18 is a block diagram of a battery power supply device.
Figure 19:
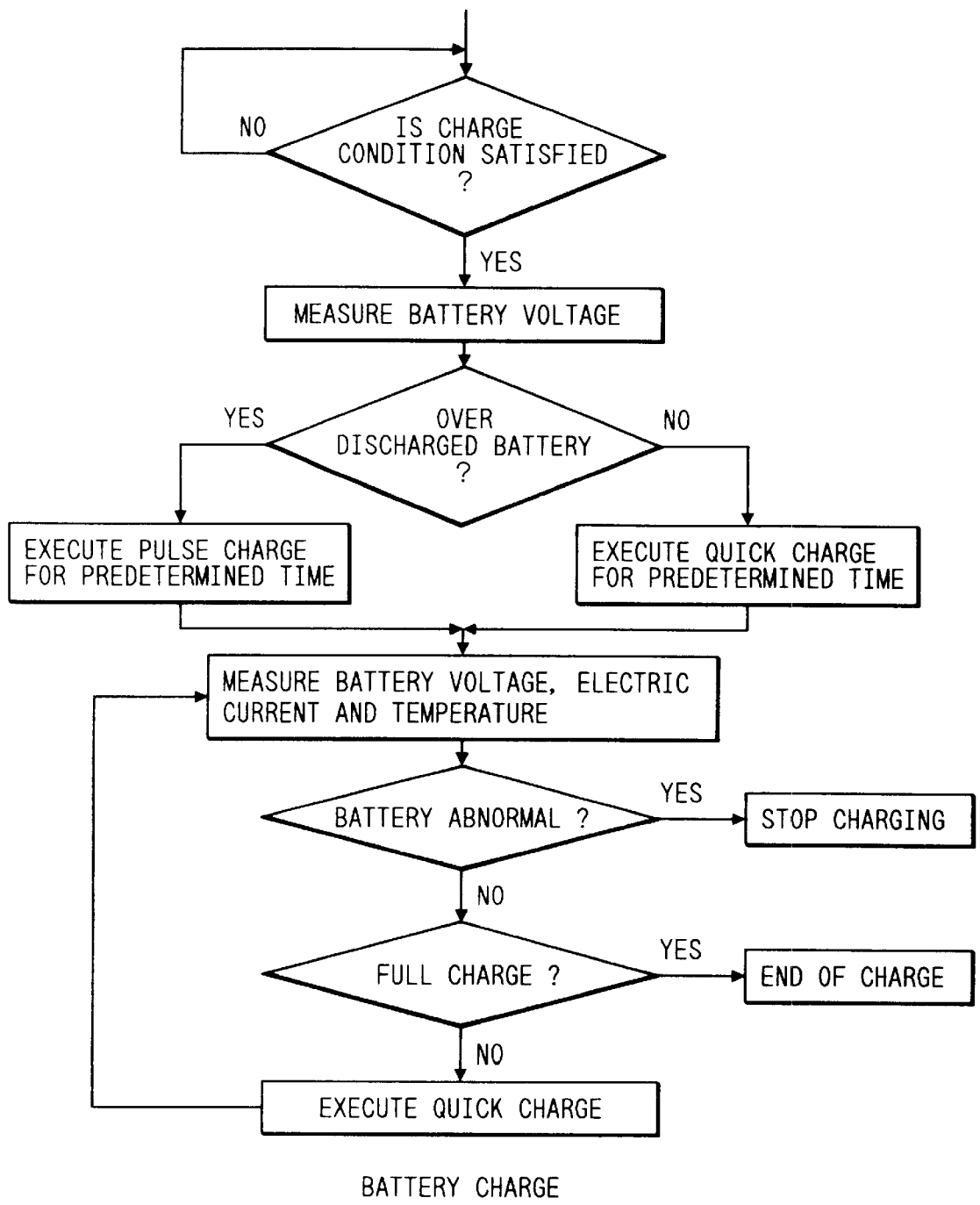
FIG. 19 is a flow chart showing the control sequence of the battery power supply device.

The above-mentioned procedure is achieved by a circuit shown in a block diagram in FIG. 18, and by a control sequence shown in FIG. 19.

[Detection of remaining battery capacity]

While the CPU is in operation or in the data retaining (resume) state, the control processor monitors the remaining battery capacity by measuring the voltage, current and temperature. When the remaining capacity becomes low, the control processor informs the CPU of this fact through the interruption signal line, whereupon the CPU, if in the operation, terminates the current operation and transfers to the data retaining state, and provides a display for requesting the user to effect charging. If the remaining battery capacity becomes low during the data retaining state, the CPU switches to the back-up battery, and provides a display for requesting the user to effect charging.

Figure 20:
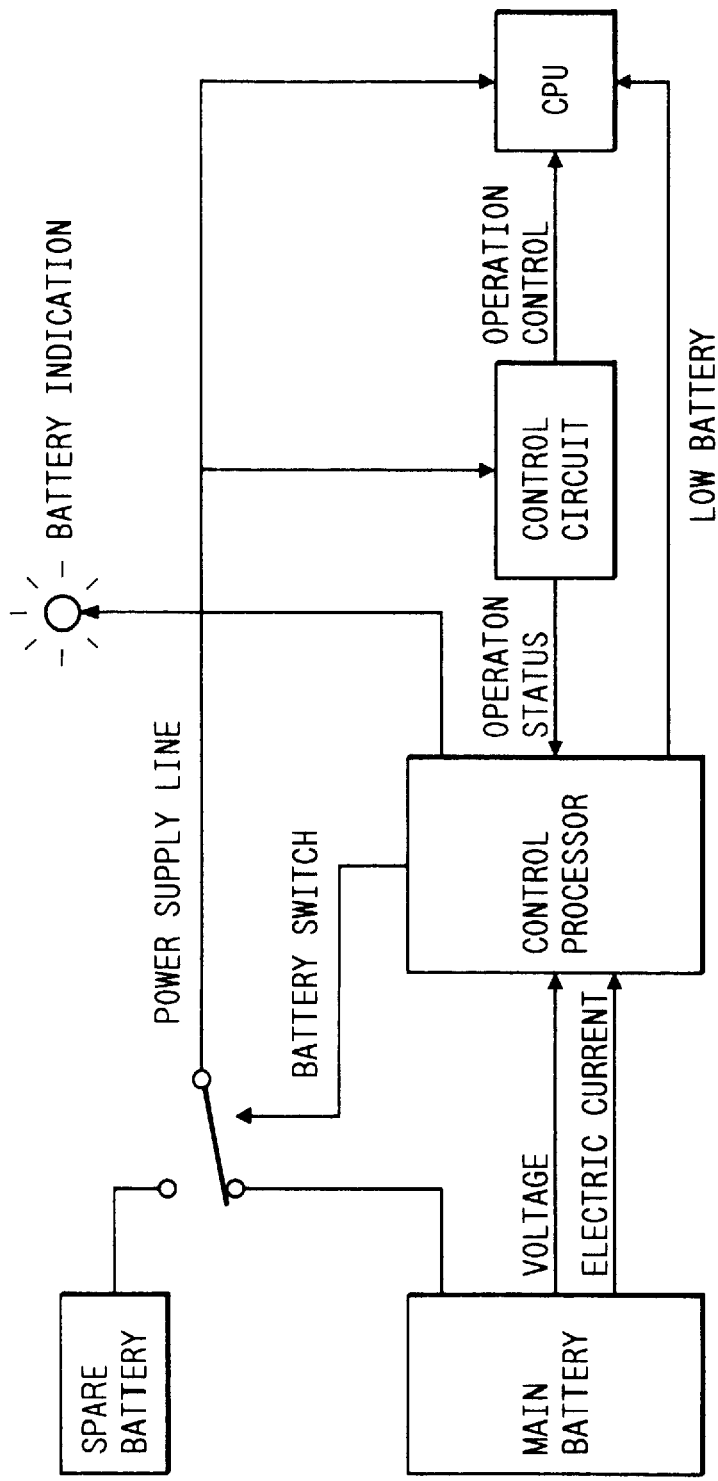
FIG. 20 is a block diagram of the battery power supply device.
Figure 21:
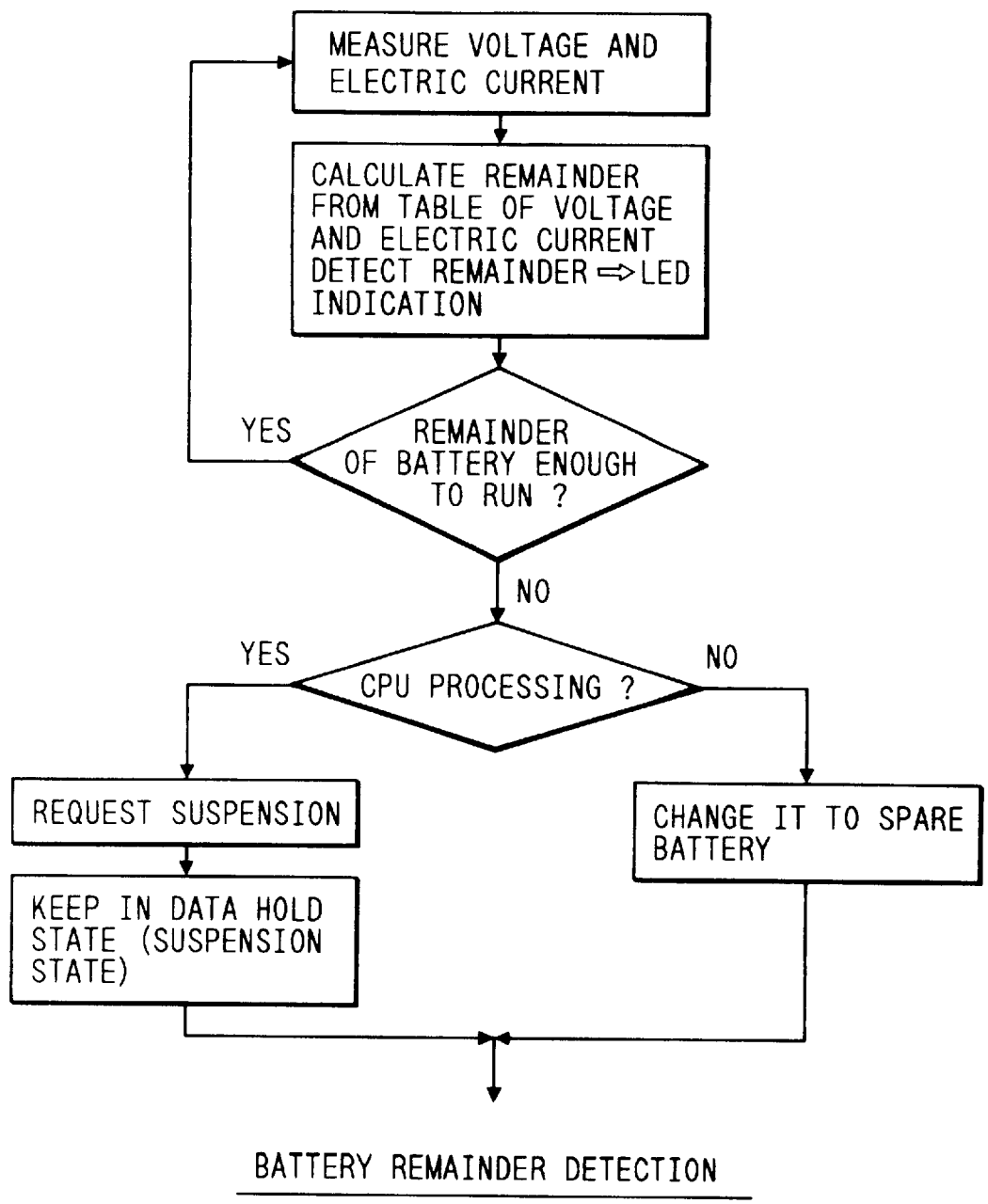
FIG. 21 is a flow chart showing the control sequence of the battery power supply device.

For achieving the above-mentioned process, the processor F8 shown in FIG. 20 executes the control sequence shown in FIG. 21.

As explained in the foregoing, the present invention provides an information processing apparatus incorporating a printer for data printing and provided with an interface connectable to an external printer for printing said data.

Also as explained in the foregoing, the present invention provides an information processing apparatus incorporating a printer for data printing and provided with a sheet feeding mechanism for sheet feeding to said printer.

Also as explained in the foregoing, the present invention provides an information processing apparatus incorporating a printer and an auto sheet feeding mechanism therefor, whereby the prepared data can be immediately printed in plural copies.

Also as explained in the foregoing, the present invention provides an information processing apparatus provided with process means for battery control, thereby effecting control of the battery.

Also as explained in the foregoing, the present invention provides an information processing apparatus provided with a battery, input means, and process means for controlling said input means and said battery, thereby controlling said input means and said battery.

Also as explained in the foregoing, the present invention provides an information processing apparatus provided with a main processor, a connector for increasing a co-processor in addition to said main processor, and an aperture provided in a part of the main body for connecting said co-processor to said connector.

Also as explained in the foregoing, the present invention provides an information processing apparatus provided with means for rendering various floppy disks easily detachable and identifying said floppy disks, thereby enabling access to said floppy disks.

Also as explained in the foregoing, the present invention provides an information processing apparatus provided with means for handling an extension keyboard, in addition to the exclusive keyboard.

[Another embodiment]

Figure 33:
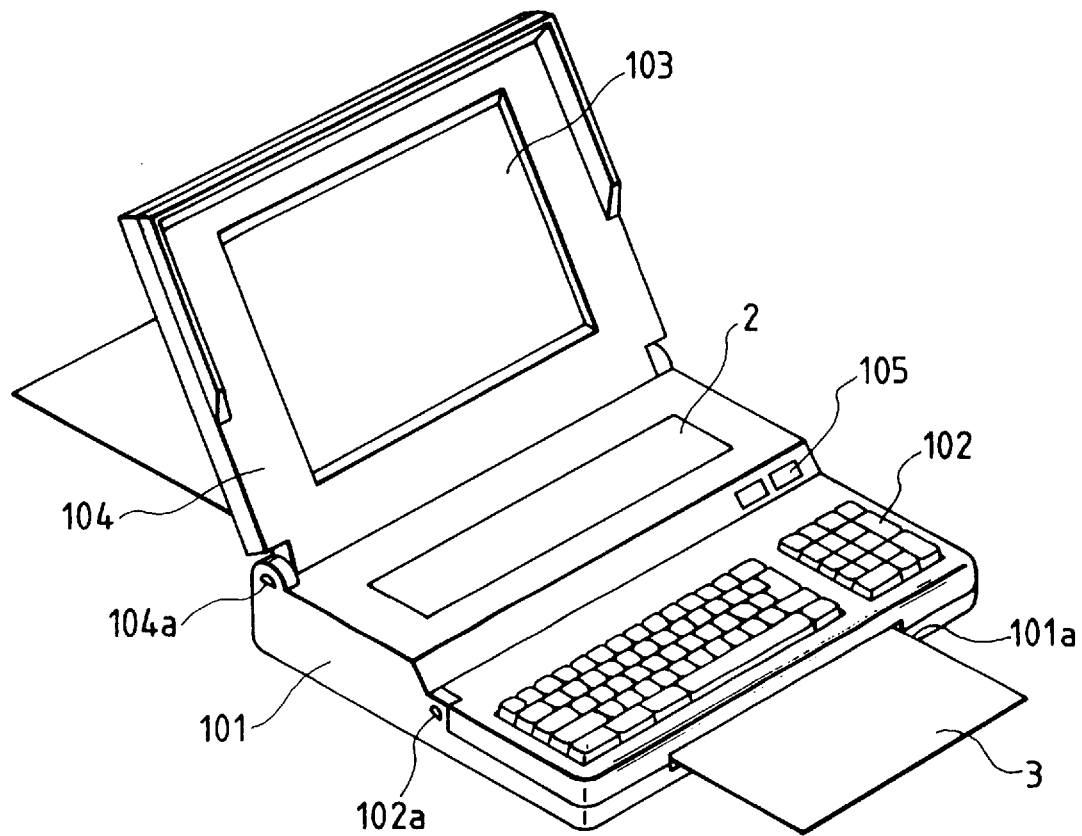
FIG. 33 is a perspective view of a personal computer embodying the present invention.

FIG. 33 is a perspective view of a personal computer, constituting another embodiment of the information processing apparatus of the present invention. The personal computer 330 is composed of a main body 331, a keyboard 332, an upper cover 334 equipped with a display unit 333, and a printer 336. The upper cover 334 is rotatably mounted on the main body 331, by means of hinges 334a provided on both ends of the rear edge thereof. Thus said upper cover 334 is opened by rotation until the display unit 333 reaches an easily observable position at the use of the present apparatus, and is closed and serves as a cover when the apparatus is not in use. The display device of the display unit 103 is for example composed of a liquid crystal display device, because it can realize a thin configuration of the display unit.

The printer unit 336 utilizing an ink jet recording head is positioned in front of the display unit 333, and incorporated in the main body 331. The printer head 336 has an aperture (not shown) that can be opened by the operator, for the replacement of the recording head.

A recording sheet 337 is inserted from a sheet feeding slot 331a positioned below the keyboard 332, transported along a path penetrating through the main body 331 and discharged from a discharge slot (not shown) at the rear. The keyboard 332 is made rotatable about hinges 332a provided at both sides of the main body 331, whereby relatively short recording sheets such as envelopes or postcards can be inserted deeper in the transport path, by lifting the keyboard 332 upwards. Since the transport path for the recording sheet 3 is provided below the keyboard 332, various operations with the keyboard 332, display unit 103 and printer switch 335 are possible while the recording sheet 337 is set.

[Schematic block diagram of host computer and printer]

Figure 34:
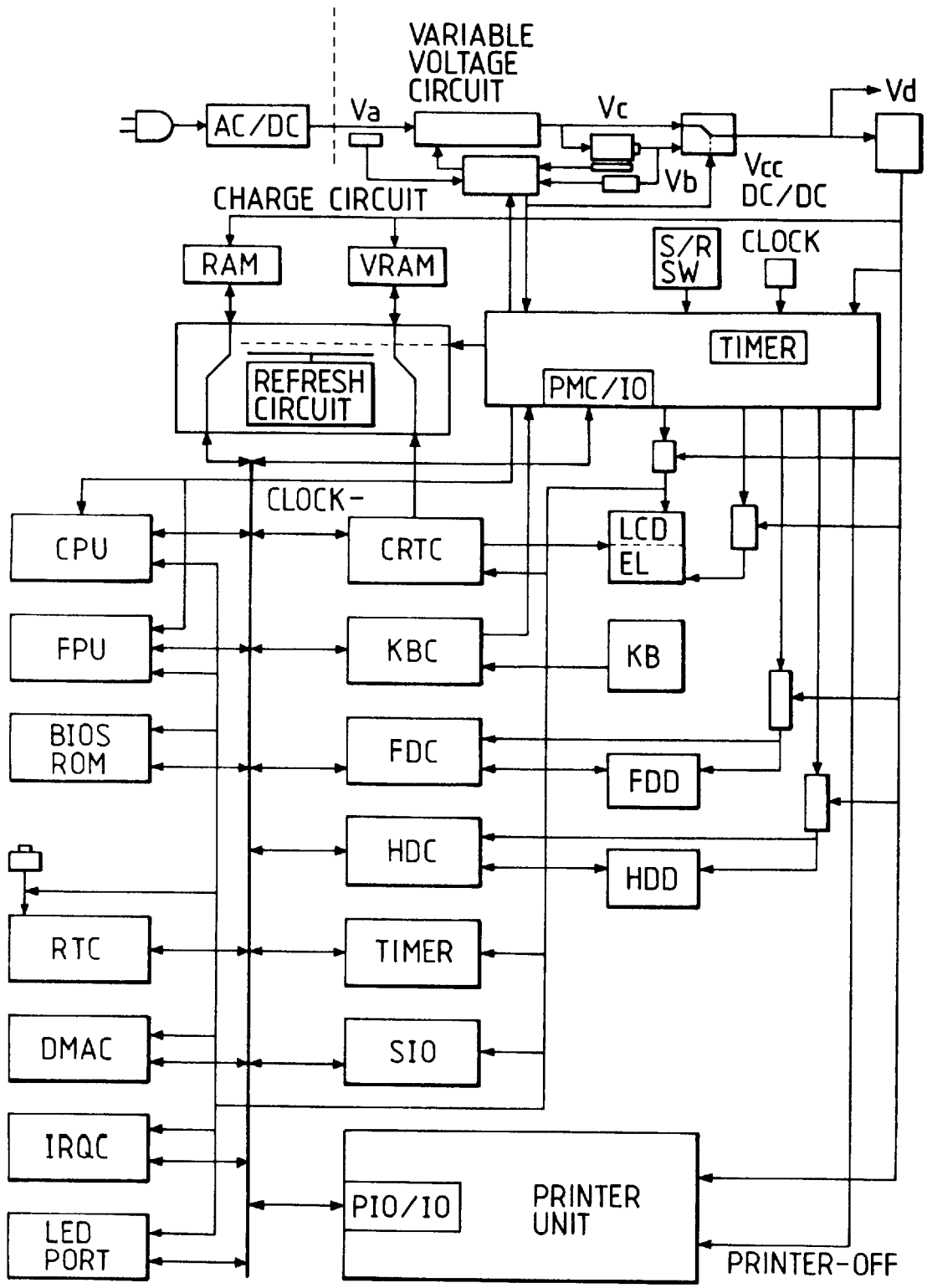
FIG. 34 is a schematic block diagram of the circuits between the host computer and the printer.

FIG. 34 is a schematic block diagram of the host computer and the printer.

In the host computer, the main control is conducted by a central processing unit (CPU) 340, of which basic control is instructed by a BIOS ROM (basic input/output system ROM) 341. Application programs are read from a floppy disk drive (FDD) 342 or a hard (rigid) disk drive (HDD) 343 through a floppy disk controller (FDC) 344 or a rigid disk controller (HDC) 345, and said programs are executed, utilizing a system memory (RAM) 346. Characters etc. are displayed on the liquid crystal display (LCD) 347 through a liquid crystal display controller (LCDC), and the inputs through the keyboard (KB) 348 are made through a keyboard controller (KBC) 349. A figure processing unit (FPC) 350 supports the CPU in arithmetic calculations. A real-time clock (RTC) 351 indicates the elapsed time, and is activated by an exclusive battery even when the power supply to the entire system is turned off. A DMA controller (DMAC) 352 effects high speed data transfer between memories, between memory and I/O or between I/O's, without the intervention of the CPU. An interruption request controller (IRQC) 353 receives the interruption from the I/O's, and processes said interruptions according to their priorities. A timer (TIMER) 354, including several free-running timers, effect various time controls. There are further provided a serial interface (SIO) 355 and an extension port (PORT) 356 for connection to the exterior, and LED's for informing the user of the operation status.

In addition to the above-mentioned control common to the personal computers, the notebook-sized personal computer is required to work at least on the AC adaptor and on the battery. Particularly the power saving at the battery operation is required, and, for this purpose, there are provided a host power management unit (host PM unit) for effecting time controls on on-off operation of the EL inverter circuit, power supply to FDD, power supply to HDD, turning-off of the printer, and power supply to various devices excluding RAM and VRAM, also effecting clock control for the CPU etc. and controlling the power supply sequence in the suspended/resume modes; a refreshing controller for refreshing RAM and VRAM in different manner in the suspended mode and in the clock-operated state of the CPU, according to the instruction signal from the host PM unit; and a charging controller enabling the host computer to operate while charging the secondary battery.

The printer is connected to the host computer through a general parallel interface and exchanges the data at the level of the I/O port registers, so that the mode of connection is equivalent to that for an external printer.

[Configuration of printer driver]

Figure 35:
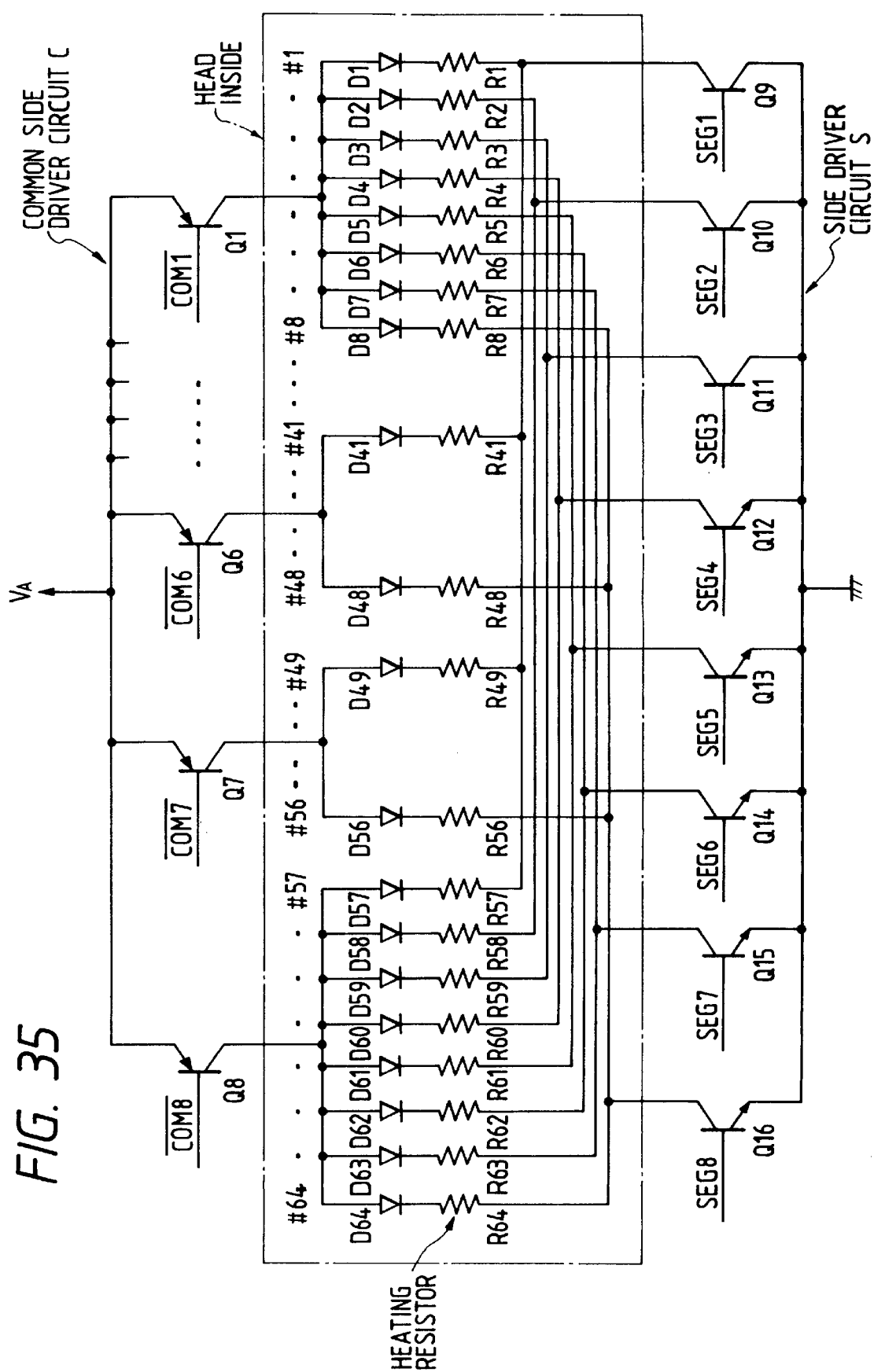
FIG. 35 is a circuit diagram of a recording head and a head driver.

FIG. 35 shows the configuration of the recording head and the head driver.

In the present embodiment, the recording head has 64 discharge openings, and #1–#64 indicate the positions of the discharge openings. Heat-generating resistors R1–R64, respectively corresponding to the discharge openings #1–#64, are divided into blocks, each containing 8 resistors, and switching transistors Q1–Q8 of common-side driver circuits are connected respectively to said blocks. Said transistors Q1–Q8 turn on and off the current paths, in response to control signals COM1–COM8. Diodes D1–D64 are provided respectively in the current paths of the resistors R1–R64, for blocking inverse currents.

Each of transistors Q9–Q16 of segment side driver circuits is connected to the heat-generating resistors in mutually corresponding positions of the different blocks, and said transistors Q9–Q16 turn on and off the current path to said resistors, in response to control signals SEG1–SEG8.

Figure 36:
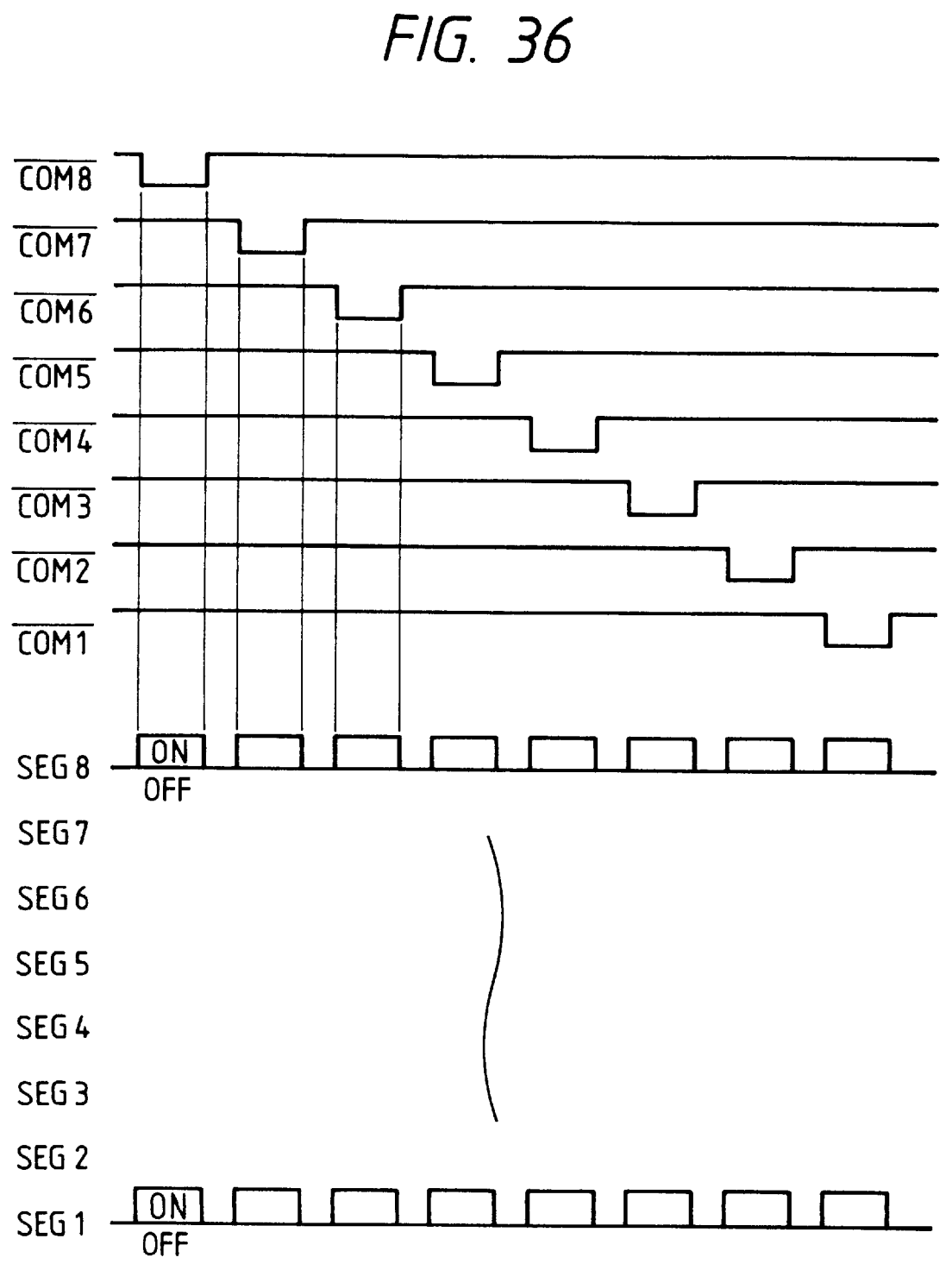

FIG. 36 is a timing chart of head driver in such configuration. In a certain position on the head scanning direction, the common-side control signals COM8–COM1 are turned on in succession. In each on-state a block is selected for energization, and in said selected block the segment-side control signals SEG8–SEG1 are turned on and off, corresponding to the image to be recorded, whereby the heat-generating resistors are selectively energized, and the ink is discharged corresponding to heat generation to achieve dot recording.

Figure 37:
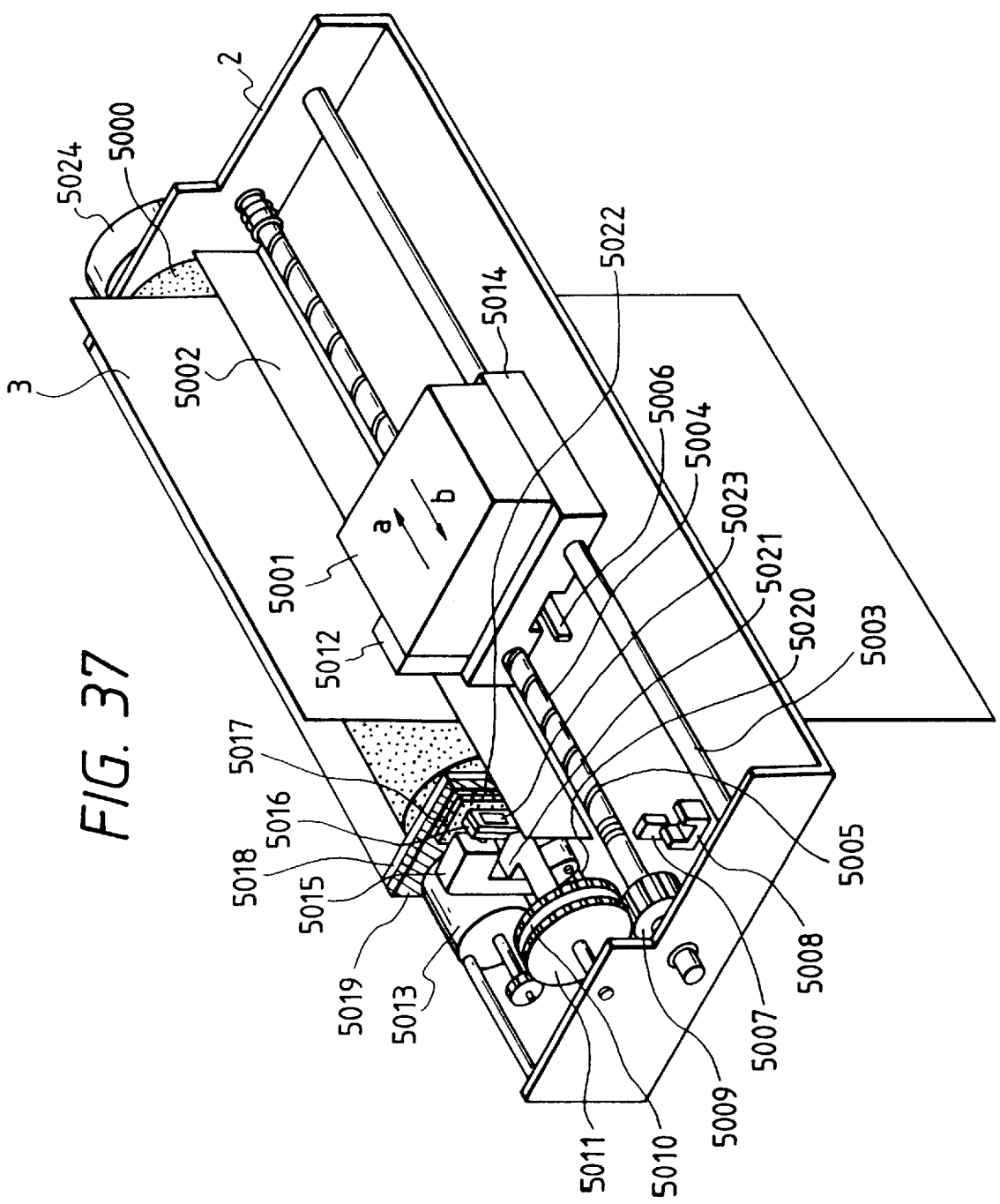
FIG. 37 is a perspective view of a printer internal unit.

FIG. 37 is a perspective view, showing the internal structure of the printer unit 2 employing the ink jet recording method of the present invention. An ink tank 5001 and a recording head 5012 coupled thereto, constitute an integrally replaceable cartridge, which is mounted on a cartridge 5014. A guide 5003 guides said cartridge in the sub scanning direction.

A platen roller 5001, moving the recording sheet in the main scanning direction, is rotated by a sheet feeding motor 5024. The carriage 5014 is connected, through a flexible cable (not shown) for supplying signal currents for driving the recording head 5012 and for supplying a current for head temperature control, to a printed circuit board (not shown) with circuits for printer control.

There will be given more detailed explanation on the printer unit 2 of the above-mentioned structure. The cartridge 5014 engages, by a pin (not shown), with a spiral groove 5004 of a lead screw 5005 rotated by the motor 5013 through transmission gears 5011, 5009, and is reciprocated in the directions a, b. A pressure plate 5002 presses the recording sheet to the platen 5000, over the moving direction of the carriage. Photocouplers 5007, 5008 constitute home position detecting means, serving to detect a lever 5006 of the carriage 5014 and switching the rotating direction of the motor 5013. A capping member 5022 for capping the front face of the recording head is supported by a support member 5016. Suction means 5015 effects suction in the interior of said cap, and effects the recovery of ink discharge function, by suction, of the recording head 5012 through an aperture 5023 in the cap.

A cleaning blade 5017 is retractably supported by a support member 5019, and these members are supported by a support plate 5018 of the main body. Said blade is not limited to this form, but any known cleaning blade may naturally be applied to this embodiment. A lever 5021, for starting the suction for the discharge recovery operation, moves, along with the movement of a cam 5020, which engages with the carriage 5014 and is controlled by the driving motor through known transmission means such as a clutch.

More specifically, by inversely rotating the driving motor 5013 from the home position of the carriage 5014, the transmission gear 5011 is switched to 5010 (not shown), whereby the driving force of said motor 5013 is transmitted through the cam 5020 to the lever 5021, thereby effecting the capping, cleaning and recovery by suction of the recording head 5012.

[Block diagram of printer]

Figure 38:
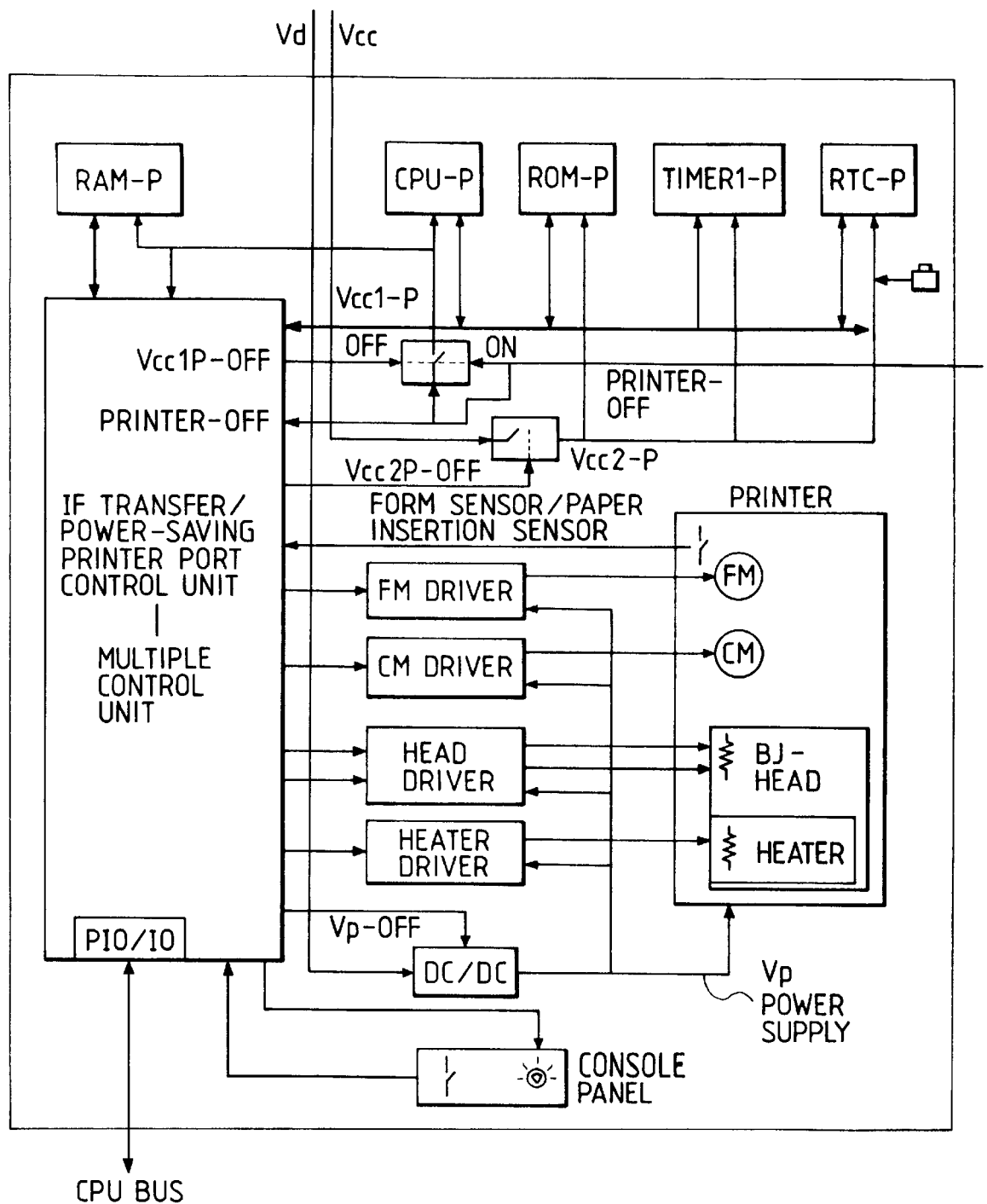
FIG. 38 is a block diagram of a printer interface.

FIG. 38 is a block diagram of an example of the control system of the printer unit.

A microprocessor CPU-P 380, effecting the main control of the printer unit, executes the desired process according to the printer commands and data obtained from the host computer through a parallel interface to be explained later. A read-only memory ROM-P 381 stores programs corresponding to the recording control sequence to be executed by the CPU-P 380, a character generator (CG) and other fixed data. A random access memory RAM-P 382 has a work area used as registers, a line buffer area for storing print data of a line, a dot development buffer for the data developed into dots, a reception buffer for the data received from the parallel interface etc. A timer TIMER1-P 383 serves to measure the elapsed time of the head recovery operation. A read time clock RTC-P 384 serves to obtain the phase drive time for the sheet feeding motor (FM), heater etc. Also a multiple control unit 385, for IF transfer control, power saving control, RAM access control and printer control is connected to the bus of the CPU-P. Said multiple control unit 385 releases various printer control signals, which are converted to driver signals for FM, CM, recording head, heater etc. by the FM driving circuit 386, CM driving circuit 387, head driver 388 and heater driver 389. The multiple control unit has power-saving control signals Vcc1P-off/Vcc2P-off/Vp-off, and receives an input signal Printer-off and other input signals from printer sensors and operation panel. In response only to the change from active to inactive state of the Printer-off signal, there is supplied the power source Vcc1-P only to the multiple control unit 385, CPU-P 380 and RAM-P 382. The Vcc1P-off signal can cut off the power supply Vcc1P at a modified timing, in response to the Printer-off signal and according to the driving state of the printer. More specifically, the power is not cut off while the recording head is uncapped, so that the head is protected from fatal damage.

Figure 39:
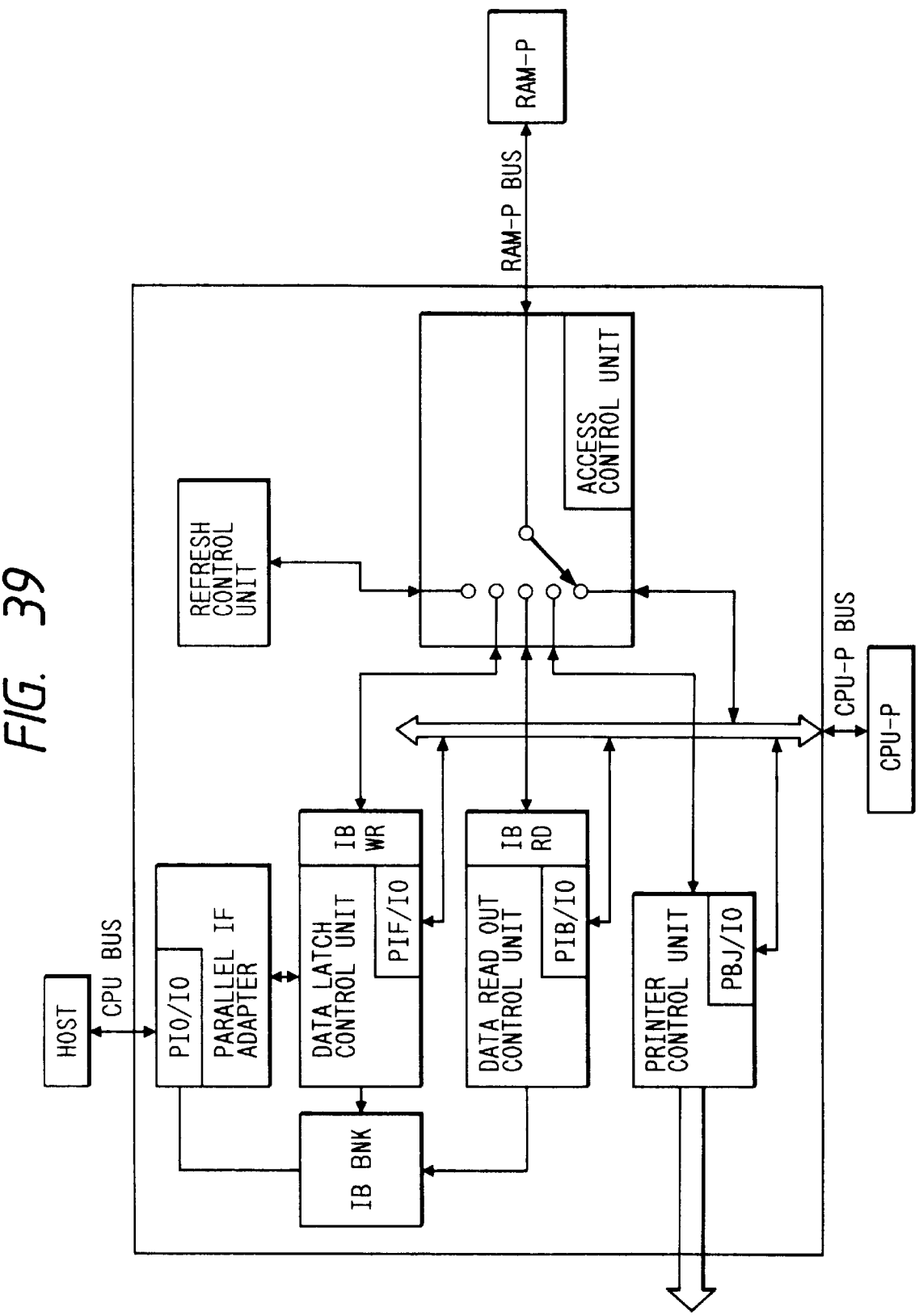
FIG. 39 is a block diagram of a composite control unit.

FIG. 39 is a block diagram showing the configuration of the multiple control unit, composed of a parallel IF adaptor 390 for data exchange between the host computer and the printer; an IF data latch control unit 391 for storing the IF data in the reception buffer (IB) on the RAM-P 392 through the parallel IF adaptor 390; an IB data read-out control unit 393 for reading of the IF data, stored in IB, by the CPU-P 394; a refreshing control unit 395 for generating refreshing signals for the RAM-P; a printer control unit 396 for for reading dot-developed data of a line from the printer buffer (PB) on the RAM-P, generating head driving signals and controlling the carriage motor, thereby driving the FM, heater, LED etc; and a RAM access control unit 397 for controlling the accesses according to the priority to the IF data latch control unit, IB data read-out control unit, refreshing control unit, printer control unit and CPU-P.

Figure 40:
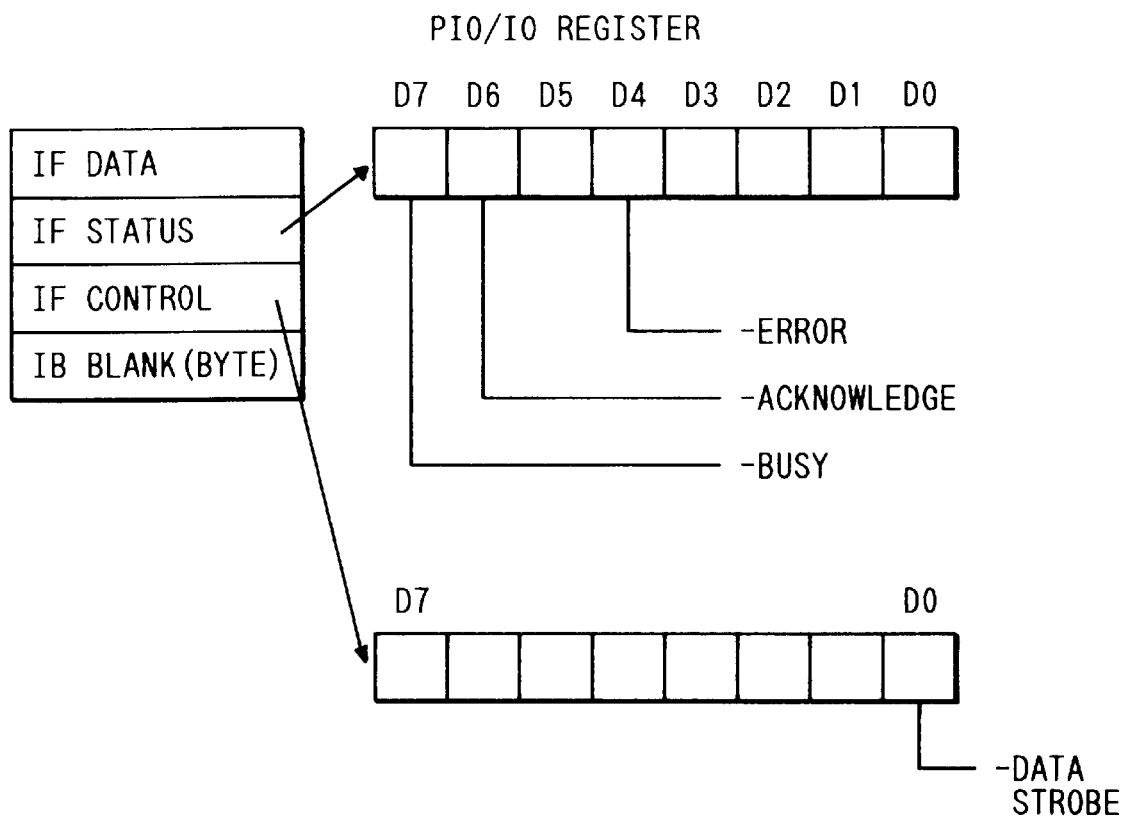
FIG. 40 is a view showing the structure of a PIO/IO register.

FIG. 40 shows the structure of the parallel IF adaptor (PIO/IO), composed of registers IFdata, IFstatus, IFcontrol and IFblank, which constitute I/O register areas which can be written or read both from the host computer and the printer.

IFdata is a data register used for sending the print control commands and print dot data from the host computer to the printer, and effects data transfer in the unit of 8 bits (1 byte).

IFstatus is a status register for indicating, from the printer to the host computer, the data reception state of IFdata, and has a signal Busy/Ack for handshake of 1 byte unit, and a signal Error indicating a printer error.

IF control is a control register for sending IFdata from the host computer to the printer, and has a data strobe signal for handshake with a unit of one byte.

IBblank is a register indicating the empty area in the number of bytes in the reception data buffer area.

Figure 41:
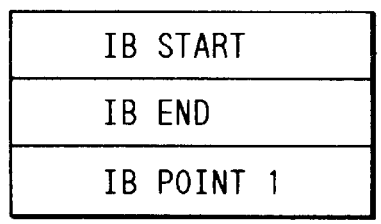
FIG. 41 is a view showing the structure of a PIF/IO register.

FIG. 41 shows the configuration of the IO register PIF/IO, seen from the printer side, in the IF data latch control unit. Said register is composed of registers IBstart, IBend and IBpoint1.

Figure 42:
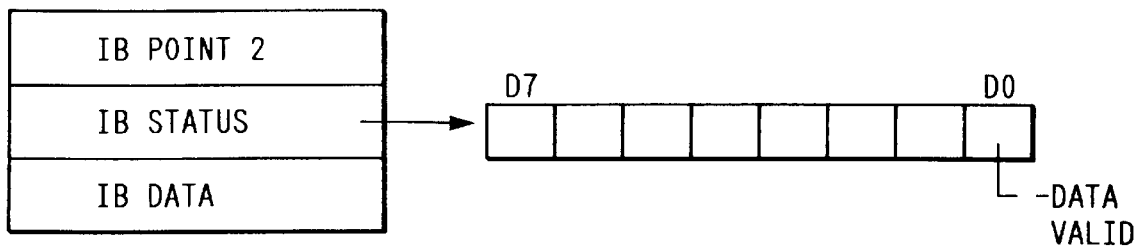
FIG. 42 is a view showing the structure of a PIB/IO register.

FIG. 42 shows the configuration of the IO register PIB/IO, seen from the printer side, in the IB data read-out control unit. Said register is composed of registers IBpoint2, IBstatus and IBdata.

Figure 43:
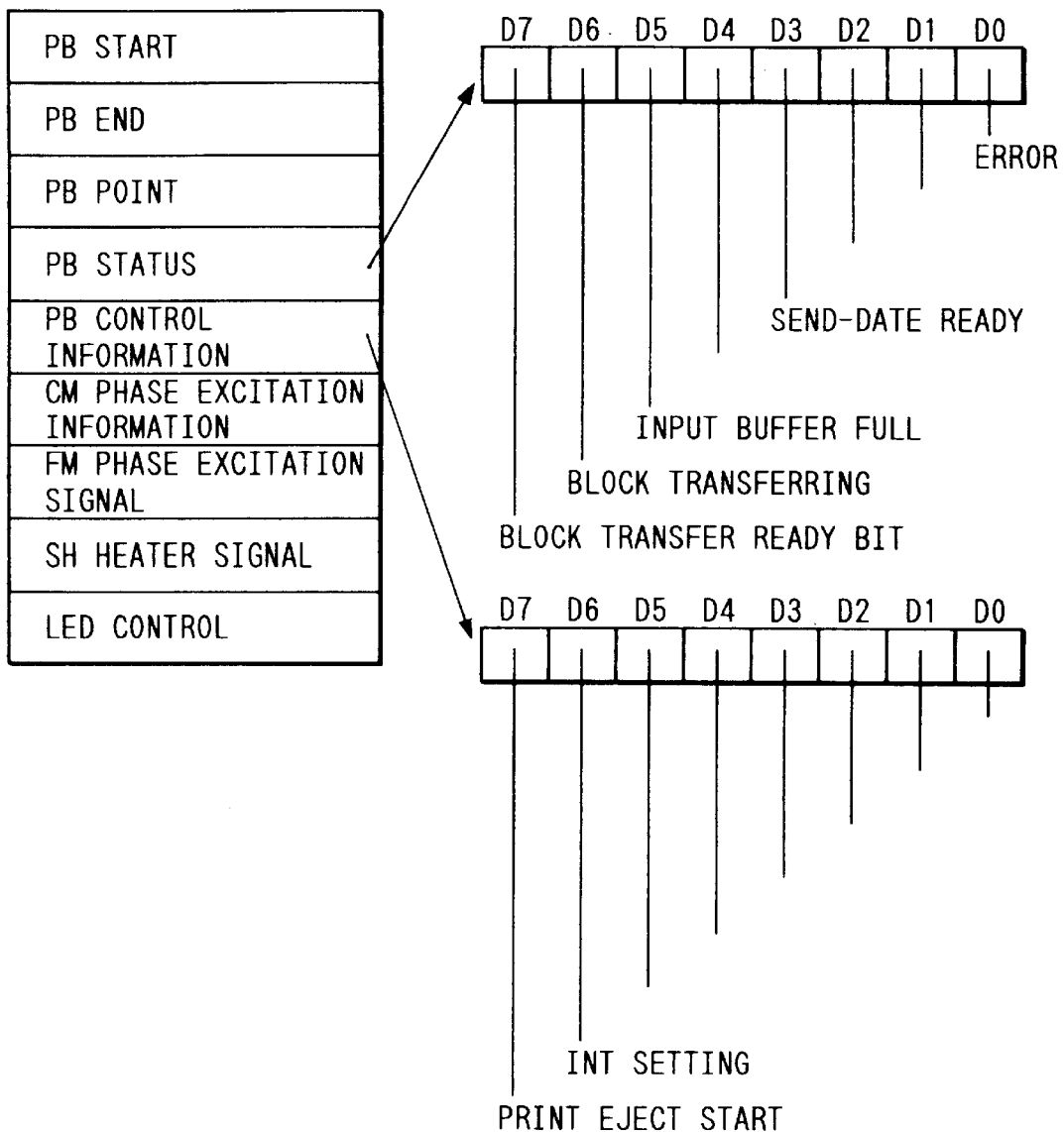
FIG. 43 is a view showing the structure of a PBJ/IO register.

FIG. 43 shows the configuration of the IO register PBJ/IO, seen from the printer side, in the printer control unit.

Said register is composed of registers PBstart, PBend, PBpoint, PBstatus, PBcontrol information, CBphase excitation signal, FMphase excitation, SHheater signal and LED-control signal.

Figure 44:
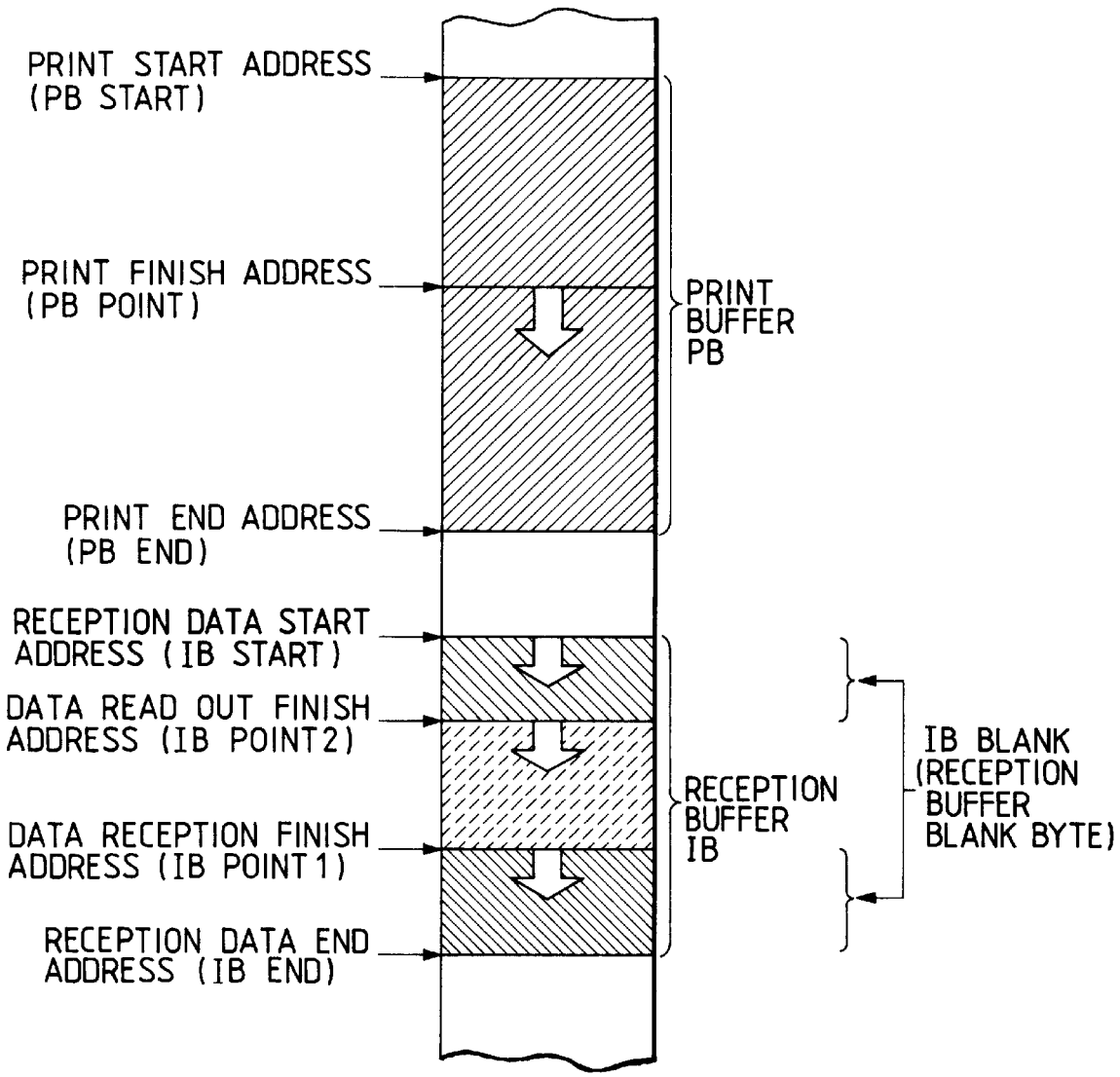
FIG. 44 is a view showing RAM-P address map.

FIG. 44 shows the arrangement, on the RAM-P shown in FIG. 38, of the address area of the print buffer (PB) controlled by the printer control unit, and of the reception buffer (IB) controlled by the IF data latch control unit and by the IB data read-out control unit.

The print buffer area is to set the data area required for printing, and said setting can be achieved by the PBJ/IO register shown in FIG. 43. In response to the setting of a start address (PBstart) and an end address (PBend), the printer control unit reads the print data in succession from said start address to said end address and effects printing by sending the control signals to the head driver. The print data address pointer (PBpoint) indicates the address of the data under current transmission.

Similarly the reception buffer area is to set the data area required for reception, and said setting can be achieved by the PIF/IO register shown in FIG. 41. In response to the setting of a start address (IBstart) and an end address (IBend), the IF data latch control unit writes the data (IFdata), supplied from the host computer, in succession from said start address to said end address into the RAM-P, and, after passing said end address, it repeats the writing operation again from the start address. The IBpoint1 indicates the address of the data which has been received and is being written last.

At the same time the CPU-P of the printer reads the IBdata register based on the information of PIB/IO shown in FIG. 42, whereby the IB data readout control unit reads the reception data, fetched in the reception buffer, in succession from the start address to the end address, and, upon passing said end address, it repeats the reading operation again from the start address, while the CPU-P converts the read reception data into print data and writes said print data into the print buffer area.

In this operation, IBpoint2 indicates the address of the reception data which has been already read by the IB data read-out control unit, and the reading operation is conducted until it exceeds the value of IBpoint1.

Whether the read data is effective or not is indicated by a Data Valid flag of the status register IBstatus. Said flag, when "1", indicates that the IBdata is ineffective and that there are no remaining reception data. The Data Valid flag can be confirmed simultaneously with the data read-out, by reading the IBstatus on word access basis, at the same time with the IBdata.

IBblank is one of the PIO/IO registers shown in FIG. 40, and indicates the number of empty bytes not occupied by the reception data, in the reception buffer area set by IBstatus and IBend.

More specifically, since the reception data are stored in the areas from IBpoint1 to IBpoint2, the value of IBblank is equal to the set reception buffer area minus the area occupied by the reception data.

Figure 45:
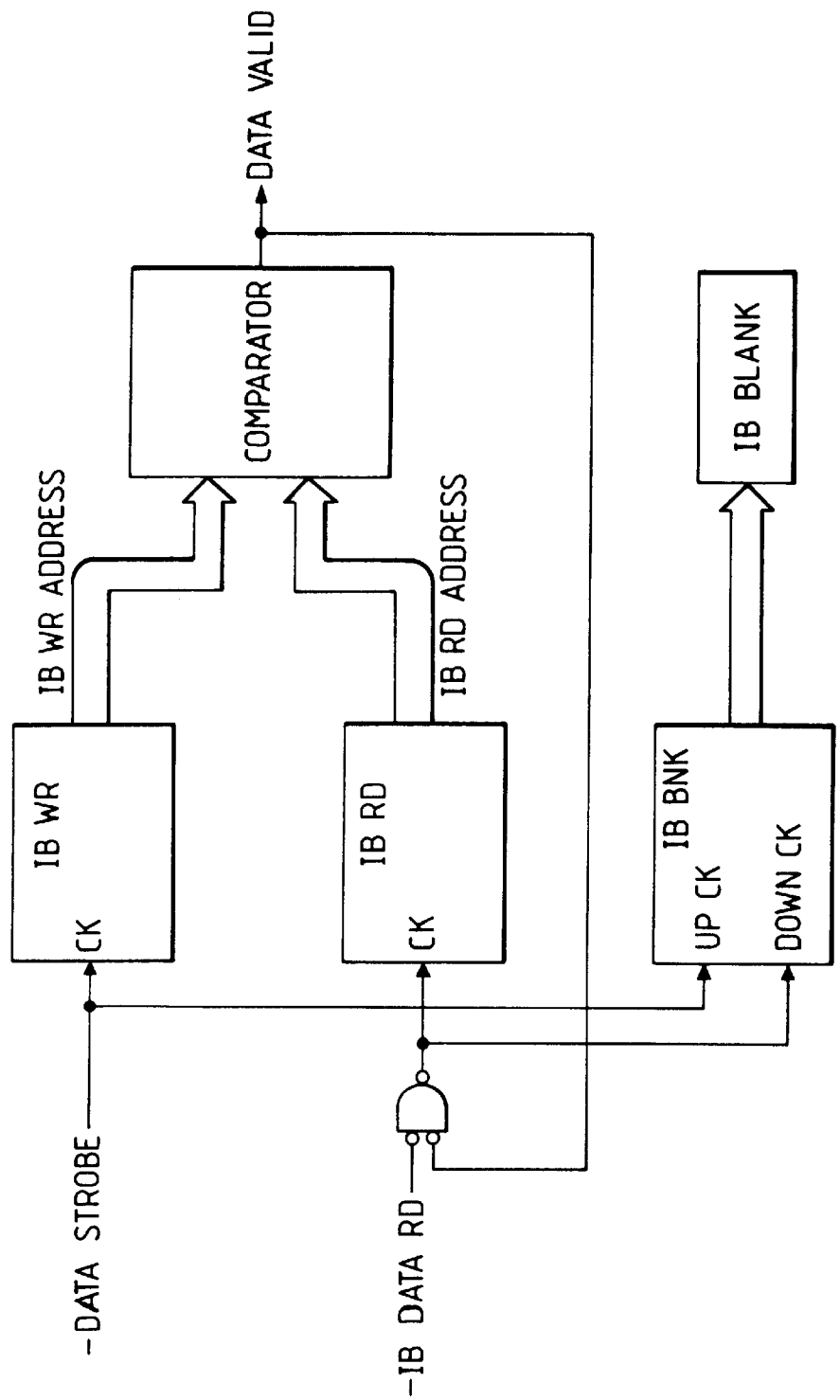
FIG. 45 is a block diagram of a circuit for calculating IB access address and IB blank.

FIG. 45 is a view showing a block generating the IB access address and a block calculating the value of the IBblank register, which are composed of an IBWR counter 450 for generating the IBWR address for writing the reception data into IB, an IBRD counter 450 for generating the IBRD address for reading the data writing in IB, a comparator 452 for discriminating the presence of remaining data, through comparison of the IBWR address and the IBRD address, and an IBBNK counter for calculating the area not occupied by the reception data.

The IBWR address is up-counted by a Data Strobe signal of the IFcontrol register, while the IBRD address is up-counted by the read-out access of IBdata, and the IBWR address and IBRD address are accessed by RAM-P according to the priority through the RAM access control unit.

The comparator output constitutes the Data Valid flag in the IBstatus register, which assumes a value "1" when the value of IBpoint2 exceeds that of IBpoint1, thereby prohibiting the read-out of IBdata and informing the CPU-P that the read data are ineffective.

The IBBNK counter effects up-counting in response to the Data Strobe signal and down-counting in response to the IBdataRD signal, and is so adjusted that, when both addresses are equal, the number of empty bytes in the IB area can be calculated by subtracting the address of IBstart from IBend.

As the value of IBBNK is directly supplied to the IBblank register, the host computer can determine the amount of data transfer according to the value of IBblank, thereby transferring the print data by the unit of block at a time.

Figure 46:
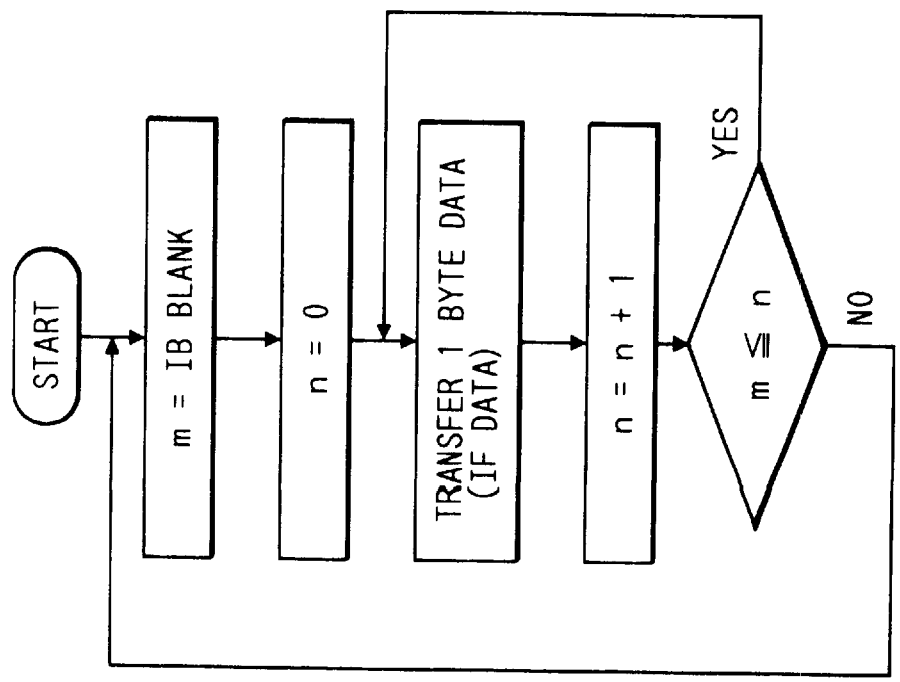
FIG. 46 is a flow chart of data transfer in the host computer.

FIG. 46 is a flow chart of data transfer process of the host computer. At first the value of the IBblank register is read to comprehend the empty capacity, and then the data of a preset number of bytes are transferred at a time to the printer.

Thus the host computer need not to confirm the status of the printer in the byte unit, but can determine the amount of transfer according to the empty capacity of the reception buffer, thereby transferring the data of a large amount at a time.

The present invention has been explained by an embodiment relating to the data memory for ink jet recording, but it will be apparent that the present invention is not limited by the kind of printer or of recording method.

Also said embodiment has been limited to a configuration in which the host equipment and the printer are integrated, but the present invention is likewise applicable to a separated configuration in which the host equipment and the printer are driven by a common battery.

Furthermore, in the foregoing, the host equipment has been assumed as a personal computer, but the present invention is applicable to any equipment in which the printer is independently controllable and the host equipment can communicate with the printer, for example by data transfer through an external interface connection or data transfer through a bus, such as a Japanese word processor or an electronic system note.

[2nd embodiment]

Figure 47:
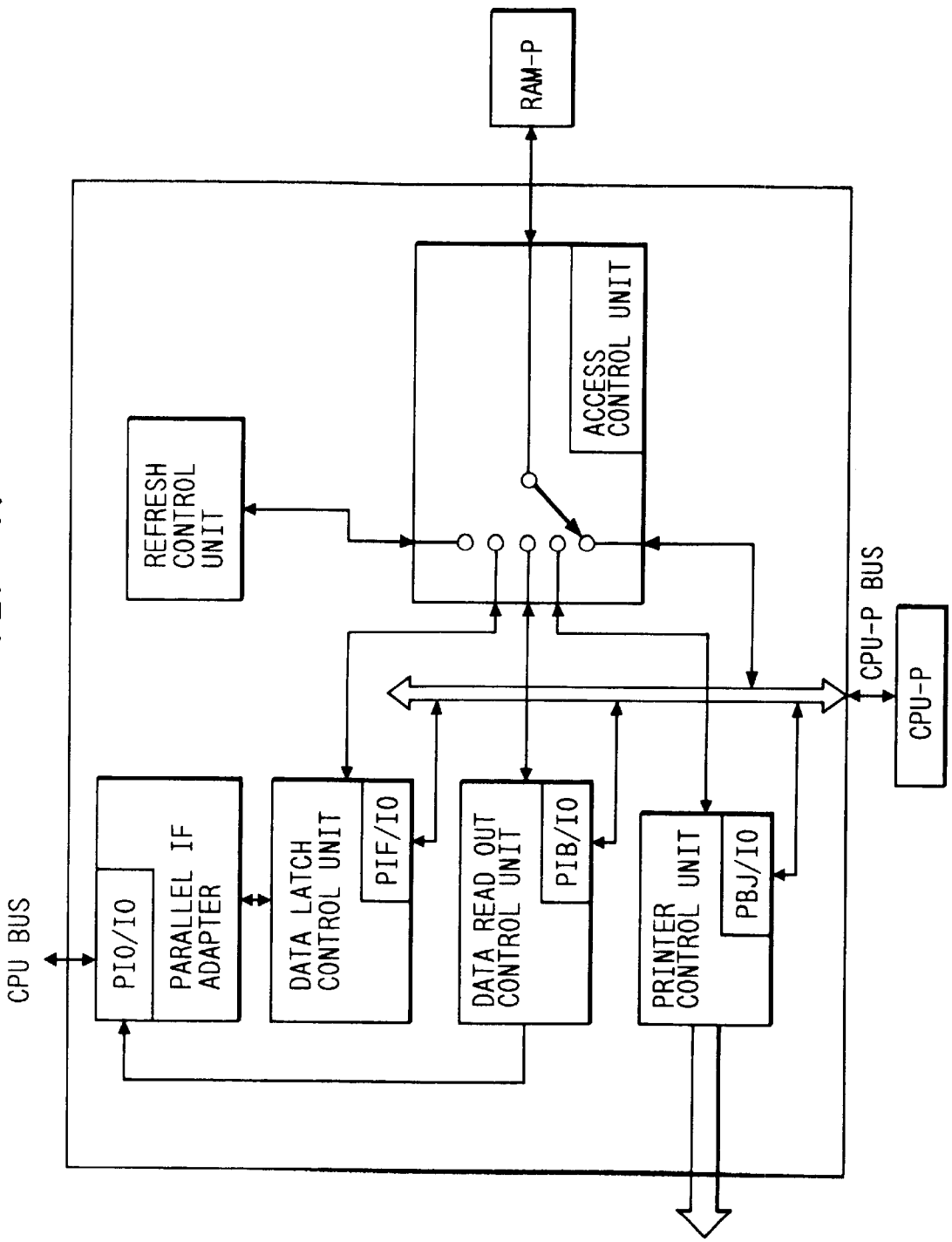
FIG. 47 is a block diagram of a composite control unit.

FIG. 47 shows a 2nd embodiment in which the detection of remaining capacity is executed by a software, utilizing the CPU for printer control.

Figure 48:
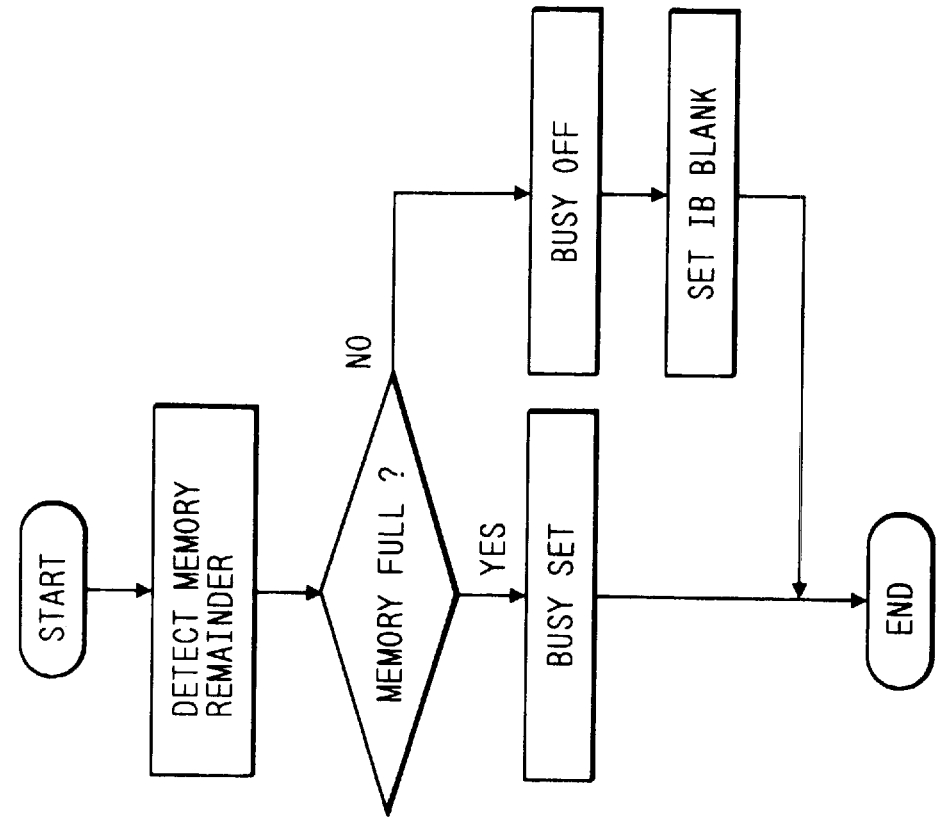
FIG. 48 is a flow chart for detecting the remaining capacity.

There can be realized a data transfer system, without the detector hardware, by adding a detection routine in FIG. 48 to the printer control program.

The conventional printer counter CPU has monitored the capacity of the printer buffer, in order to generate the Busy bit.

This 2nd embodiment utilizes this capacity information, and the subroutine shown in FIG. 48 is to write said capacity information into the IBblank register.

[3rd embodiment]

Figure 49:
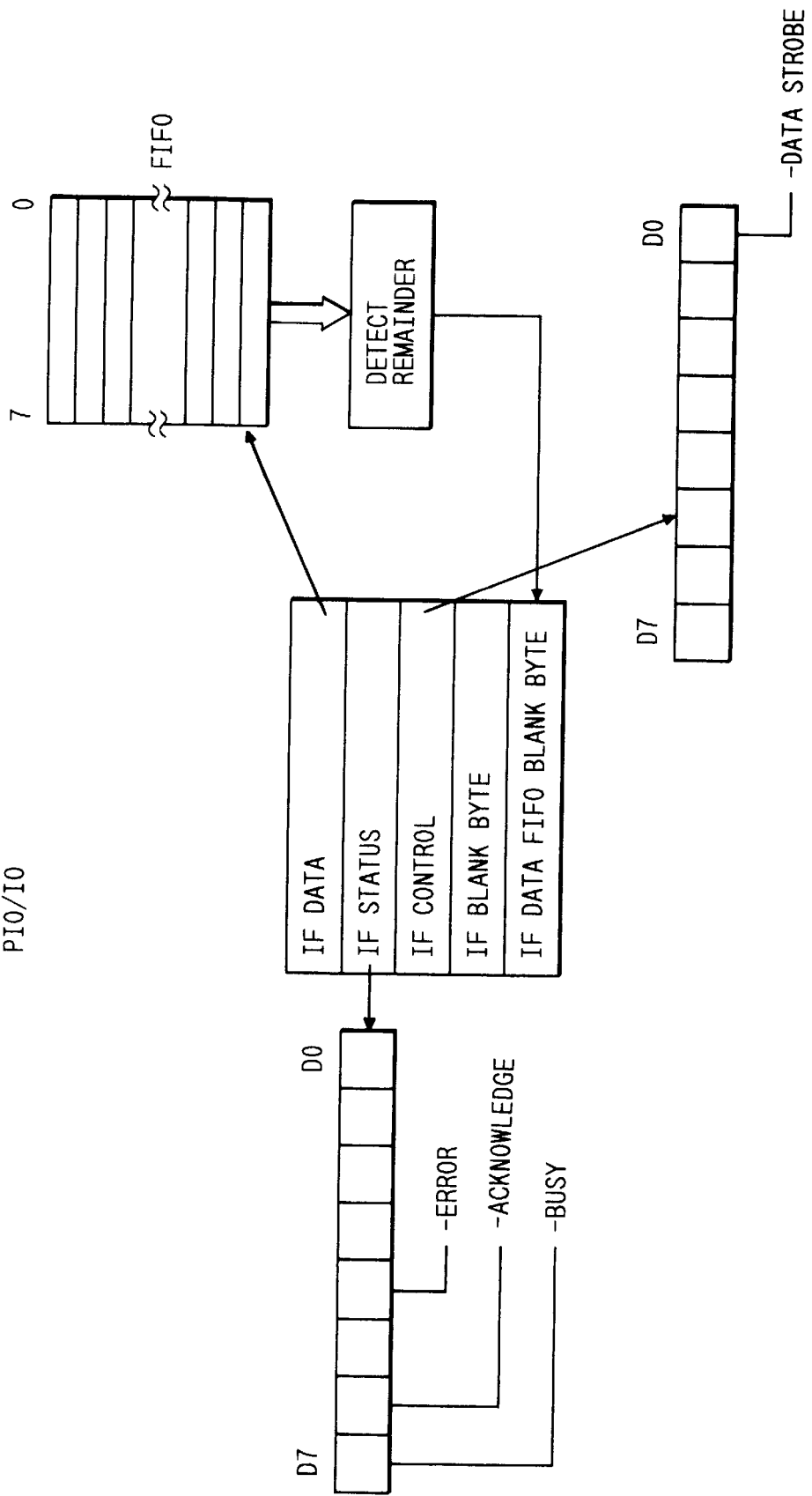
FIG. 49 is a view showing the structure of a PIO/IO register utilizing a FIFO.

FIG. 49 shows the PIO/IO register in a 3rd embodiment. In this embodiment, the IFdata register in the PIO/IO of the first embodiment shown in FIG. 39 is changed to the FIFO structure, and the remaining capacity detecting function is extended to the register of the interface circuit.

In case the printer control unit is capable of high-speed processing, there is not required handshake for every byte, so that unnecessary CPU cycles can be dispensed with and high-speed data transfer is made possible.

[4th embodiment]

Figure 50:
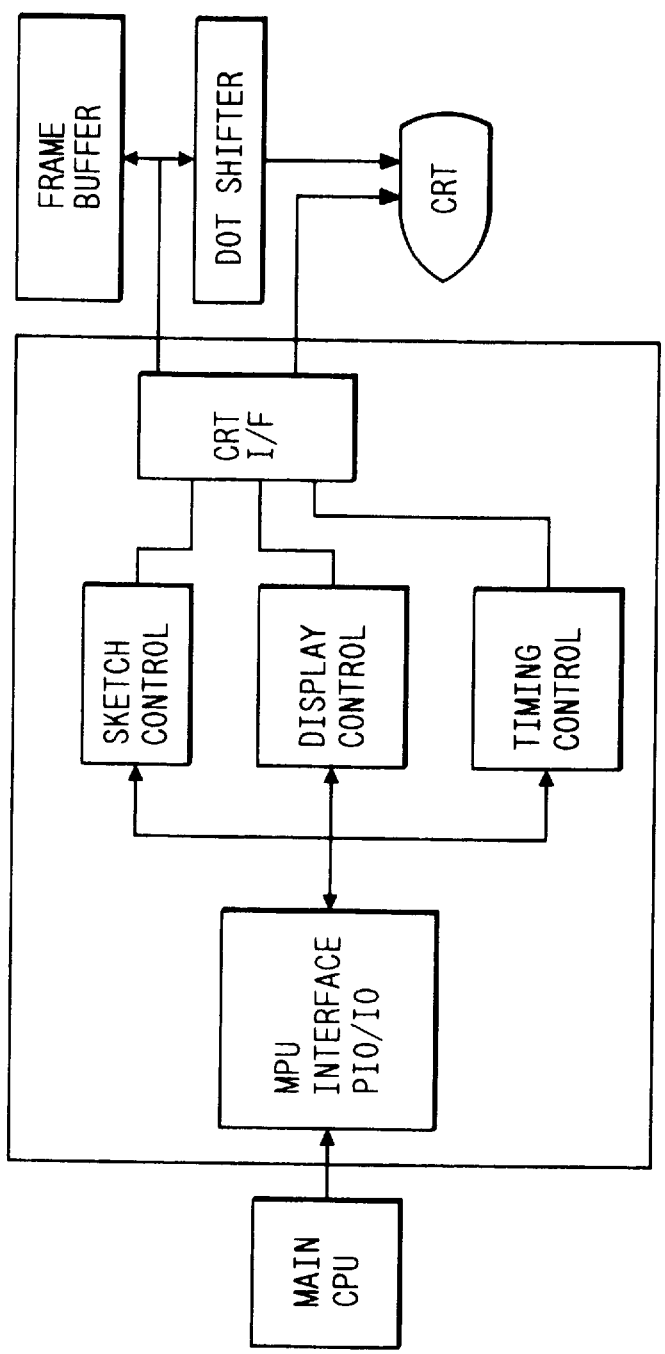
FIG. 50 is a block diagram of a CRT system.

FIG. 50 illustrates a 4th embodiment applied to the interface of a display device. A main CPU 501 controlling the entire system controls the display device CRT 502 through an MPU interface PIO/IO 503.

Figure 51:
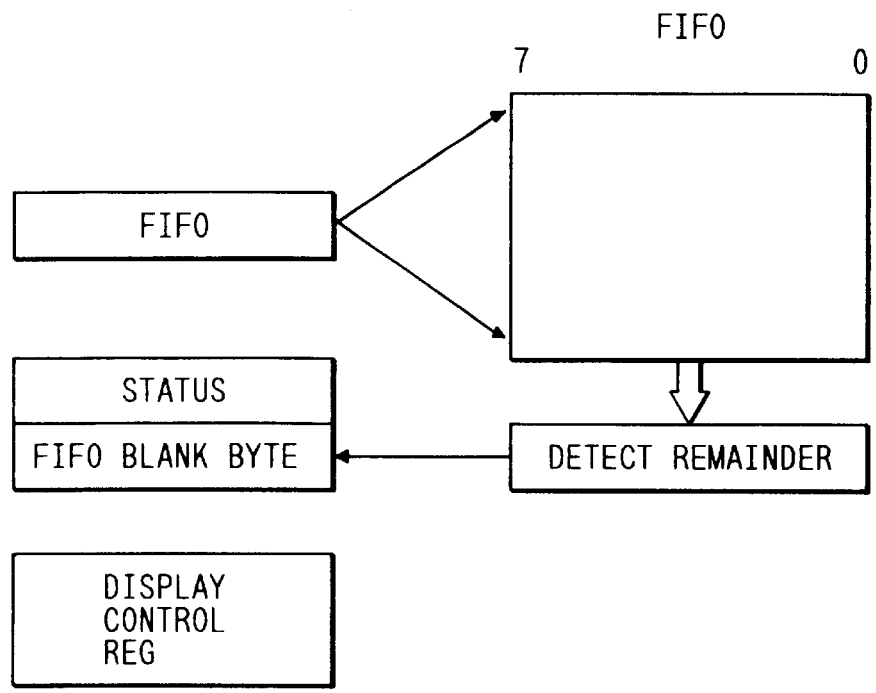
FIG. 51 is a view showing the structure of a PIO/IO control register for the CRT system.

FIG. 51 shows the structure of the PIO/IO shown in FIG. 50, composed of a FIFO 510 for receiving image data and commands, a status register 511 for indicating the state of the display device and the display controller, a FIFOblank register 512 indicating the remaining capacity of FIFO, and a DISPLAYcontrol register 513 for controlling the timing of the display device.

These registers control a sketch controller for transformation or calculation of the display data, a display controller for controlling the image frame division or the cursor, and a timing controller for controlling the synchronization signals of CRT.

A CRT I/F synthesizes the signals of the above-mentioned controllers and controls the CRT or the like, in cooperation with a frame buffer for memorizing the display image and a dot shifter.

In such system, the main CPU is required to transfer a large amount of commands and graphic data to the FIFO register, but, by knowing the information on the limited remaining capacity of FIFO from the FIFOblank register, it is rendered possible to improve the efficiency of CPU and to achieve high-speed data transfer.

[5th embodiment]

Figure 52:
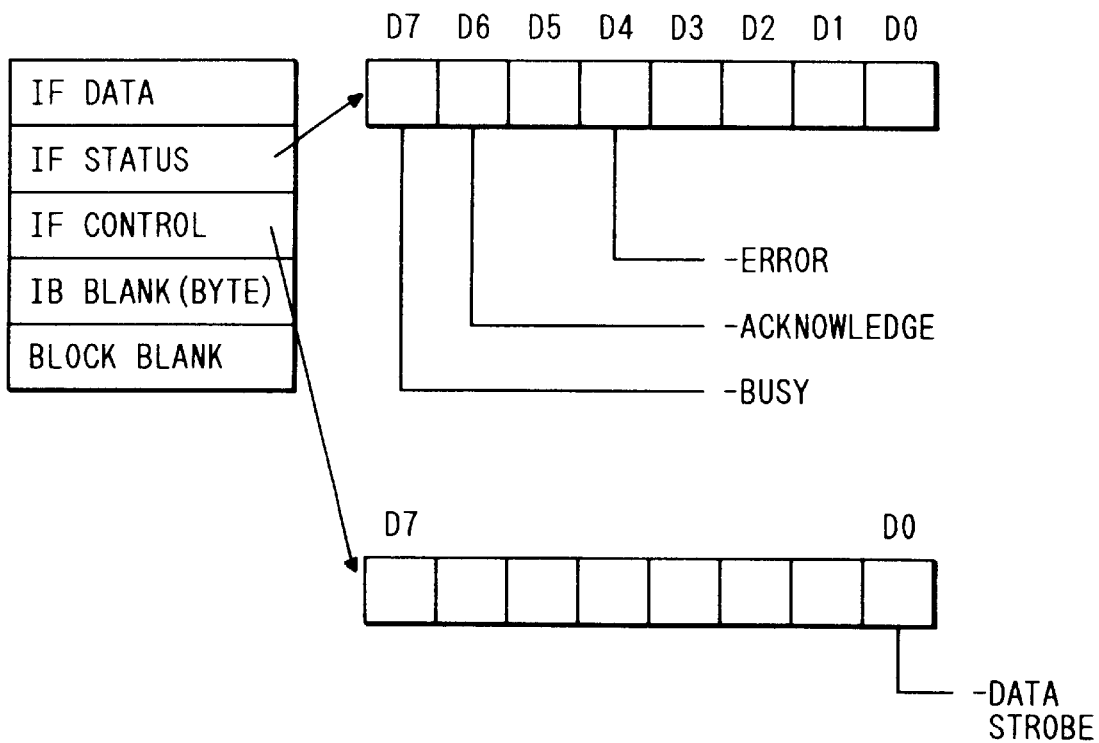
FIG. 52 is a view showing the structure of a PIO/IO register with BLOCK function.

FIG. 52 shows a 5th embodiment in which, when the remaining capacity information is formed into a block, the block size is rendered variable.

A BLOCKblank register 524 can be written and read from both directions, as in other registers in the first embodiment.

Figure 53:
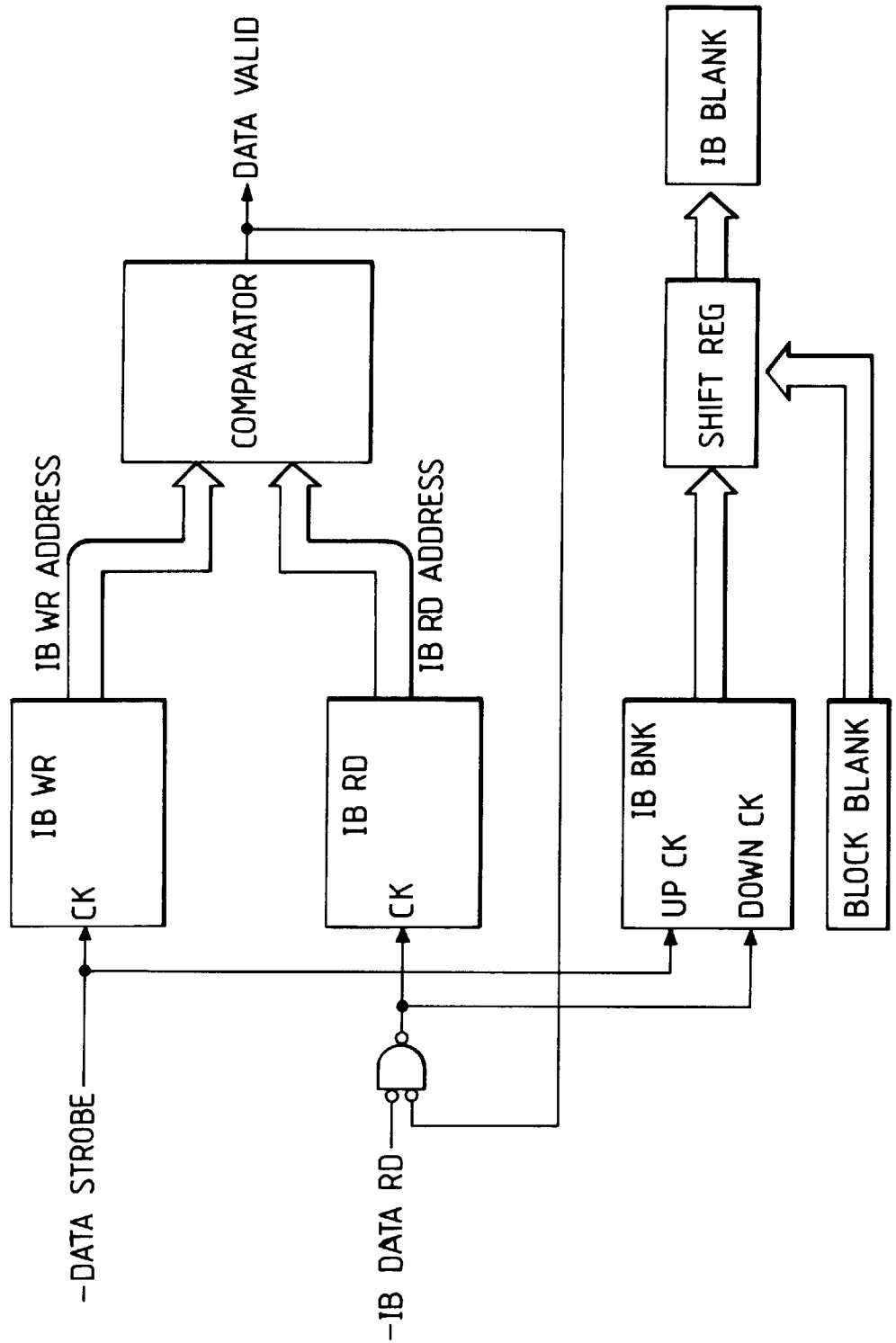
FIG. 53 is a block diagram of a composite control unit with BLOCK function.
Figure 1:
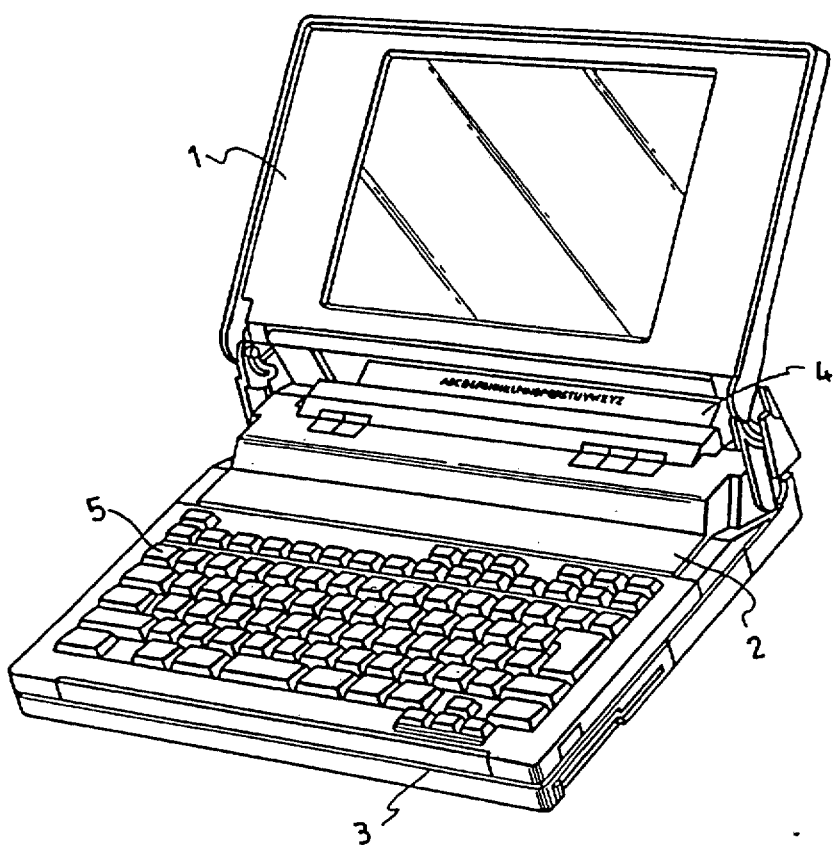
Figure 4:
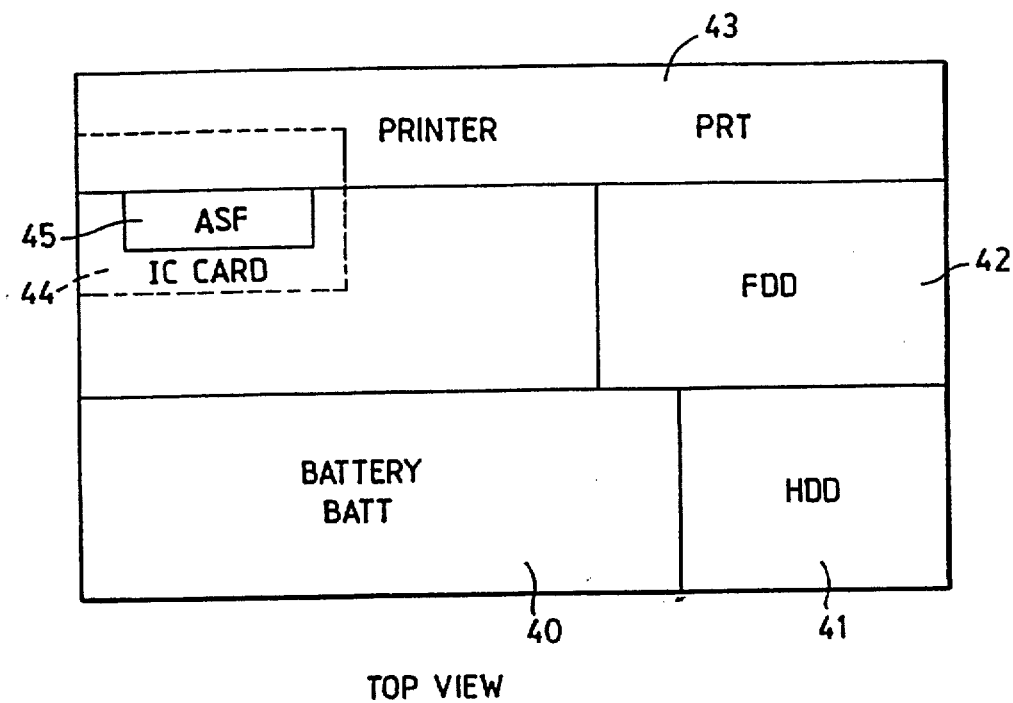
Figure 5:
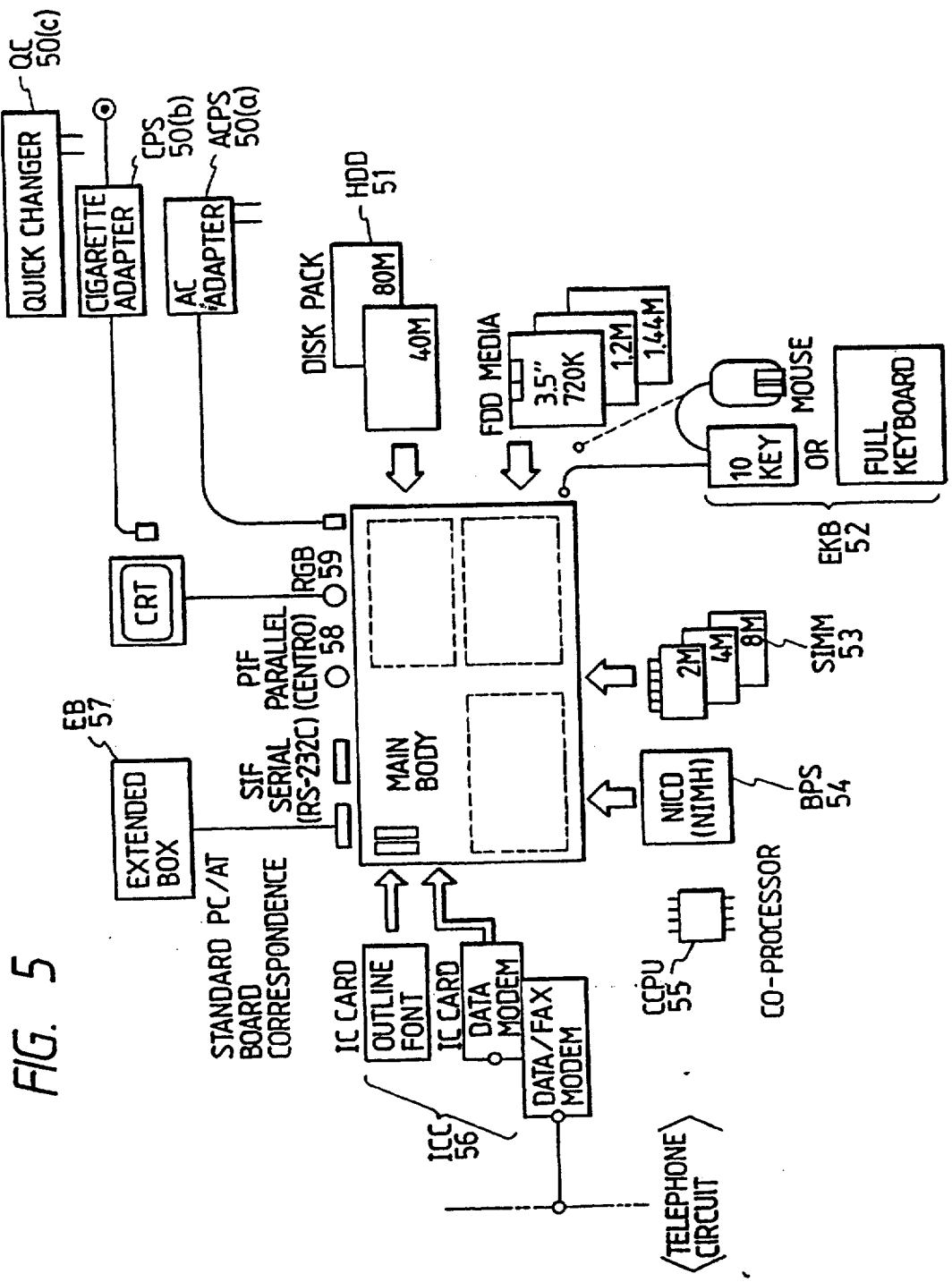
Figure 6:
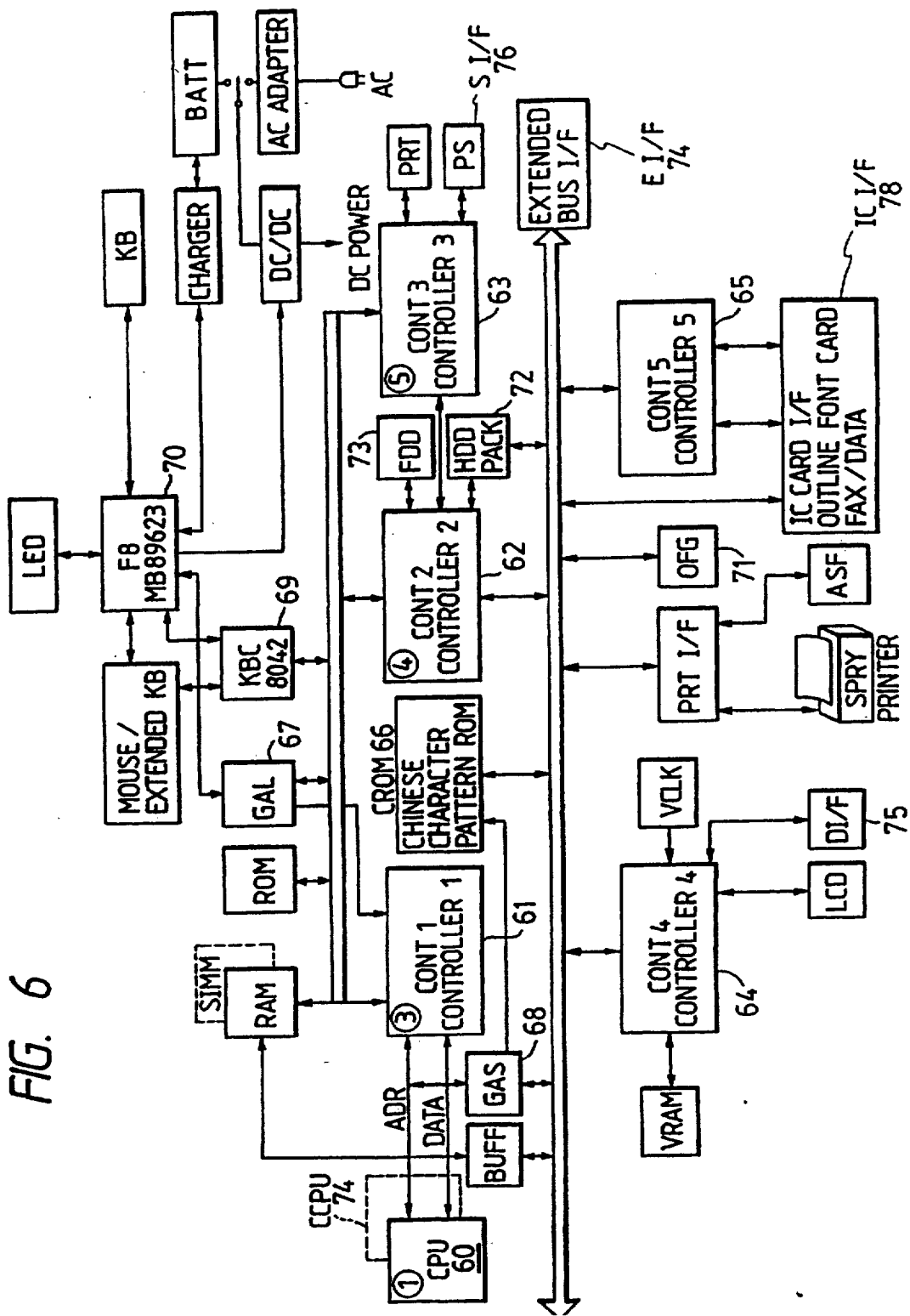
Figure 7:
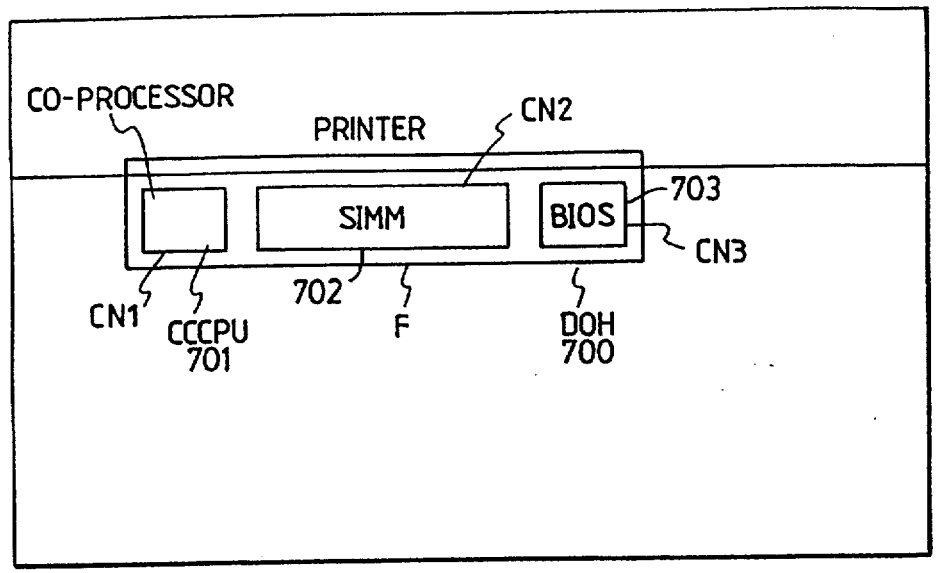
Figure 8:
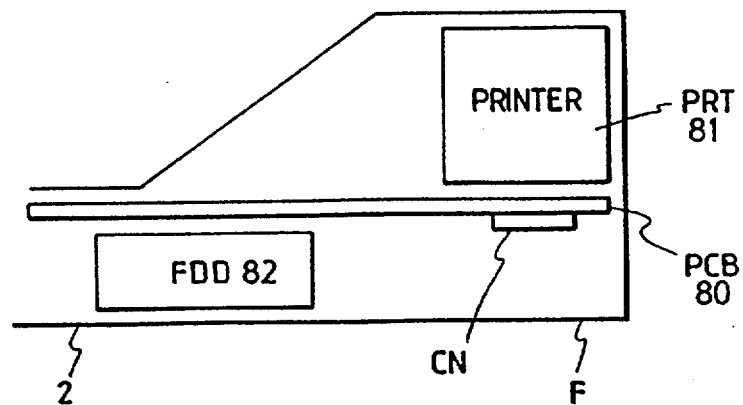
Figure 9:
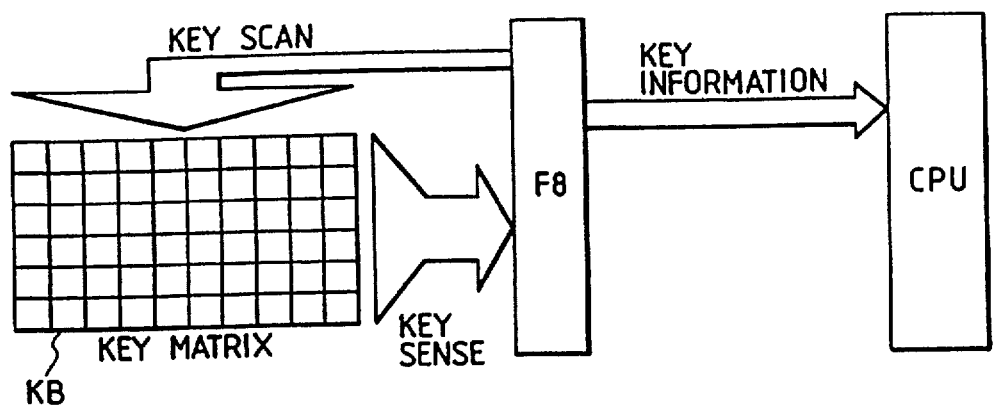
Figure 10:
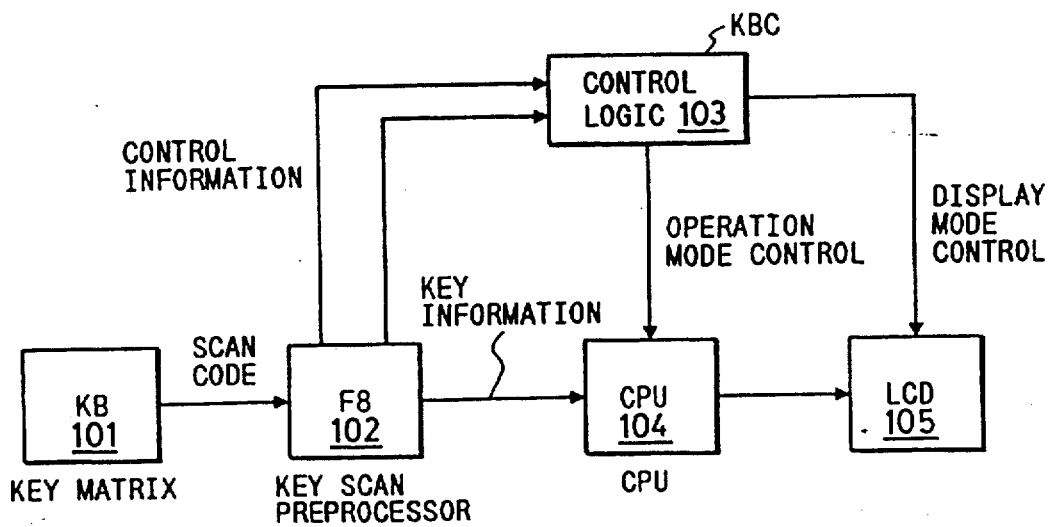

As shown in FIG. 53, a shift register 530 is controlled, and the remaining capacity information is shifted according to the content of the BLOCKblank register 531. When data N is written in this register, the shifted data (remaining capacity information) indicates the remaining amount represented in the unit of a block of $2^N$.

By writing said remaining amount in the unit of said block into the IBblank register 532, it is possible to indicate the converted remaining capacity information to the main control unit.

By providing a register for the block unit information and a shift register 530 as explained above, it is rendered possible to arbitrarily convert the remaining capacity information and to form a block of transferred information according to the converted information.

As a result, improvement in the efficiency of the CPU, and high-speed transfer of data can be achieved.

As detailedly explained in the foregoing, the present invention provides an information processing apparatus provided with information signal means for main control and print control means for printing, comprising transfer means for transferring commands and data between said main control means and said print control means, memory means for temporarily storing the data transferred to said print control means, and detection means for detecting the remaining capacity in said data memory means, wherein said remaining capacity information is supplied to said main control means thereby improving the execution efficiency of said main control means and achieving high-speed input and output, and the present invention also provides a corresponding data transfer method.

What is claimed is:

1. A portable information processing apparatus comprising:

a foldable common case for housing therein a display portion and a body portion, a keyboard located at an upper side of the body portion for inputting data, a processor located in the body portion for processing input data, a display located at a front side of the display portion for displaying processed data, and an internal printer located at a back side of the body portion;

a slot, located under the keyboard and in front of the body portion, for inserting a printing medium;

a transfer path, located under the keyboard, extending to the internal printer from said slot, for transferring the printing medium from said slot to the internal printer;

an automatic sheet feeding means for feeding the printing medium from said slot to the internal printer through said transfer path automatically in response to the insertion of the printing medium into said slot; and control means for serially printing the processed data on a plurality of sheets of the printing medium fed by said automatic sheet feeding means.

2. An information processing apparatus according to claim 2, wherein the body portion further comprises power supply control means for controlling a power supply for supplying electric power to the processor, said power supply control means controlling a battery as a power supply.

3. The information processing apparatus according to claim 1, wherein the body portion further comprises switching means for switching a power supply of the internal printer from ON to OFF if the processor sends no signal to the internal printer in a predetermined period.

4. An information processing apparatus according to claim 1, wherein the body portion further comprises printer interface means for connecting to an external printer detachably connected to the body portion.

5. An information processing apparatus according to claim 4, wherein the body portion further comprises selection means for selecting the internal printer or the external printer.

6. An information processing apparatus according to claim 1, wherein the body portion further comprises a connector for connecting to at least one co-processor.

7. An information processing apparatus according to claim 1, wherein the body portion further comprises a hard disk for storing data processed by the processor.

8. An information processing apparatus according to claim 1, wherein the body portion further comprises a socket for inserting an insertion medium, recognizing means for recognizing a kind of the insertion medium inserted into the socket, and access means for obtaining access to the inserted medium on the basis of the recognized kind.

9. An information processing apparatus according to claim 8, wherein the insertion medium is a floppy disk.

10. An information processing apparatus according to claim 8, wherein the insertion medium is an IC card.

11. An information processing apparatus according to claim 1, wherein the body portion further comprises keyboard interface means for connecting to an external keyboard detachably connected to the body portion.

* * * * *

UNITED STATES PATENT AND TRADEMARK OFFICE
CERTIFICATE OF CORRECTION

PATENT NO. : 5,845,144

DATED : December 1, 1998

INVENTOR(S) : JIRO TATEYAMA ET AL.

It is certified that error appears in the above-identified patent and that said Letters Patent is hereby corrected as shown below:

In the Drawings:

SHEETS 1, 3, 4, 5, 6, 7, 12, 17, 18, 20, 22, 23, 25, 28, 29, 33, 34, 38, 40, 42, 43 AND 44 RESPECTIVELY

Replace FIGS. 1, 4, 5, 6, 7, 8, 10, 17, 22, 23, 25, 27, 28, 30, 33, 34, 39, 45, 47, 50, 51, 52, and 53 with the corresponding figures on the attached drawing sheets.

COLUMN 2

Line 13, "processing-apparatus" should read --processing apparatus--.

COLUMN 8

Line 33, "EI/F" should read --EI/F77--.

COLUMN 10

Line 62, "examples" should read --example--.

COLUMN 11

Line 34, "into-a" should read --into a--.
Line 39, "each" should read --with each--.

UNITED STATES PATENT AND TRADEMARK OFFICE
CERTIFICATE OF CORRECTION

PATENT NO. : 5,845,144

DATED : December 1, 1998

INVENTOR(S) : JIRO TATEYAMA ET AL.

It is certified that error appears in the above-identified patent and that said Letters Patent is hereby corrected as shown below:

COLUMN 11 CONTINUED

Line 62, "234," should read --250,--.
   Line 66, "selection." should read --selection--.

COLUMN 14

Line 2, "battery-charging" should read --battery charging--.

COLUMN 15

Line 43, "unit 103" should read --unit 333--.
   Line 61, "unit 103" should read --unit 333--.

COLUMN 17

Line 61, "through-a" should read --through a--.

COLUMN 18

Line 33, "for for" should read --for--.

UNITED STATES PATENT AND TRADEMARK OFFICE
CERTIFICATE OF CORRECTION

PATENT NO. : 5,845,144

DATED : December 1, 1998

INVENTOR(S) : JIRO TATEYAMA ET AL.

It is certified that error appears in the above-identified patent and that said Letters Patent is hereby corrected as shown below:

COLUMN 19

Line 62, "IBRD counter 450" should read
       --IBRD counter 451--.

COLUMN 22

Line 27, "claim 2," should read --claim 1,--.

Signed and Sealed this

Fifteenth Day of May, 2001

Attest:

NICHOLAS P. GODICI

*Attesting Officer*     *Acting Director of the United States Patent and Trademark Office*

TOP VIEW